US012802452B2

(12) United States Patent
Lee

(10) Patent No.: US 12,802,452 B2
(45) Date of Patent: Nov. 17, 2026

(54) PROVIDING CONTENT VIEWING STATISTICS DATA

(71) Applicant: SpaceVision AI Inc., Seoul (KR)

(72) Inventor: Dongwook Lee, Seoul (KR)

(73) Assignee: SpaceVision AI Inc., Seoul (KR)

( * ) Notice: Subject to any disclaimer, the term of this patent is extended or adjusted under 35 U.S.C. 154(b) by 0 days.

(21) Appl. No.: 19/446,660

(22) Filed: Jan. 12, 2026

(65) Prior Publication Data

US 2026/0141725 A1 May 21, 2026

Related U.S. Application Data

(63) Continuation of application No. PCT/US2024/058497, filed on Dec. 4, 2024.

(30) Foreign Application Priority Data

Dec. 4, 2023 (KR) ........................ 10-2023-0173762
Jan. 3, 2024 (KR) ........................ 10-2024-0001013
(Continued)

(51) Int. Cl.
*G06V 20/52* (2022.01)
*G06Q 30/0242* (2023.01)
(Continued)

(52) U.S. Cl.
CPC ......... *G06V 20/53* (2022.01); *G06Q 30/0246* (2013.01); *G06T 7/73* (2017.01);
(Continued)

(58) Field of Classification Search
CPC ........ G06V 20/53; G06V 20/49; G06V 10/25; G06V 10/774; G06V 10/82; G06V 40/10;
(Continued)

(56) References Cited

U.S. PATENT DOCUMENTS 5,247,250 A 9/1993 Rios
10,852,349 B2 12/2020 Liu et al.
(Continued)

FOREIGN PATENT DOCUMENTS

JP WO2007135796 A1 10/2009
JP 2015055924 A 3/2015
(Continued)

OTHER PUBLICATIONS

Deane et al., Deep-SAGA: a deep-learning-based system for automatic gaze annotation from eye-tracking data, 2022, Behavior Research Methods (2023) 55: 1372-1391. (Year: 2022).*
(Continued)

*Primary Examiner* — Kathleen M Broughton
(74) *Attorney, Agent, or Firm* — K&L Gates LLP

(57) ABSTRACT

Providing content viewing statistics data is offered by acquiring content viewership statistical data based on a first image captured by Signage—this first image is intended to assess interactions between the content displayed by the Signage and the people within the image—and providing a First User Interface that includes the content viewership statistical data. In addition, the First User Interface may feature: a First Area that displays a first graph, which includes a First Axis representing the playback time of the content, a Second Axis representing the relative attention level of the content, and a first graph object (graph object) representing the relative attention level at each playback time; a Second Area that displays text describing the first graph.

27 Claims, 30 Drawing Sheets

(30) Foreign Application Priority Data

| | | | |
|---|---|---|---|
| Jan. 3, 2024 | (KR) | ........................ | 10-2024-0001014 |
| Jan. 3, 2024 | (KR) | ........................ | 10-2024-0001109 |
| Jan. 3, 2024 | (KR) | ........................ | 10-2024-0001110 |
| Jan. 25, 2024 | (KR) | ........................ | 10-2024-0011874 |

(51) Int. Cl.

| | |
|---|---|
| ***G06T 7/73*** | (2017.01) |
| ***G06V 10/25*** | (2022.01) |
| ***G06V 20/40*** | (2022.01) |
| ***G06V 40/10*** | (2022.01) |
| *G06V 10/774* | (2022.01) |
| *G06V 10/82* | (2022.01) |

(52) U.S. Cl.

CPC .............. *G06V 10/25* (2022.01); *G06V 20/49* (2022.01); *G06V 40/10* (2022.01); *G06T 2207/10016* (2013.01); *G06T 2207/20081* (2013.01); *G06T 2207/20084* (2013.01); *G06T 2207/30201* (2013.01); *G06T 2207/30232* (2013.01); *G06T 2207/30242* (2013.01); *G06V 10/774* (2022.01); *G06V 10/82* (2022.01)

(58) Field of Classification Search

CPC .................. G06Q 30/0246; G06T 7/73; G06T 2207/10016; G06T 2207/20081; G06T 2207/20084; G06T 2207/30201; G06T 2207/30232; G06T 2207/30242

See application file for complete search history.

(56) References Cited

U.S. PATENT DOCUMENTS

| | | | | |
|---|---|---|---|---|
| 11,182,597 | B2 | 11/2021 | Najafirad et al. | |
| 2008/0004953 | A1 | 1/2008 | Ma et al. | |
| 2013/0231060 | A1 | 9/2013 | Ozaki et al. | |
| 2016/0171532 | A1 | 6/2016 | Goyal et al. | |
| 2018/0007431 | A1* | 1/2018 | Sidhu ..................... | H04H 60/33 |
| 2018/0113868 | A1 | 4/2018 | Liu | |
| 2018/0293754 | A1 | 10/2018 | Ahuja et al. | |
| 2020/0134295 | A1 | 4/2020 | Kaliouby et al. | |
| 2021/0190855 | A1 | 6/2021 | Shiota et al. | |
| 2021/0190856 | A1 | 6/2021 | Shiota et al. | |
| 2021/0194601 | A1 | 6/2021 | Shiota et al. | |

FOREIGN PATENT DOCUMENTS

| | | | |
|---|---|---|---|
| JP | 2018097412 | A | 6/2018 |
| JP | 2020123884 | A | 8/2020 |
| JP | 2021167994 | A | 10/2021 |
| JP | 2022087982 | A | 6/2022 |
| JP | 2023016848 | A | 2/2023 |
| JP | 2023163743 | A | 11/2023 |
| KR | 20140102276 | A | 8/2014 |
| KR | 20170136160 | A | 12/2017 |
| KR | 20180096418 | A | 8/2018 |
| KR | 20190113245 | A | 10/2019 |
| KR | 20210133036 | A | 11/2021 |
| KR | 20220026810 | A | 3/2022 |
| KR | 20220039871 | A | 3/2022 |
| KR | 102478149 | B1 | 12/2022 |
| KR | 102493920 | B1 | 1/2023 |
| KR | 20230053269 | A | 4/2023 |
| KR | 20230137529 | A | 10/2023 |
| KR | 20240009069 | A | 1/2024 |
| KR | 20240018281 | A | 2/2024 |
| WO | 2008088980 | A2 | 7/2008 |
| WO | 2021211666 | A1 | 10/2021 |

OTHER PUBLICATIONS

Holm et al, Eye Movements during Dynamic Scene Viewing are Affected by Visual Attention Skills and Events of the Scene: Evidence from First-Person Shooter Gameplay Videos, 2021, J Eye Mov Res, 14(2): 1-32 (Year: 2021).*

Levordashka et al, Measuring real-time cognitive engagement in remote audiences, 2023, Scientific Reports, (2023) 13: 1-10. (Year: 2023).*

PCT/US2024/058497—International Search Report and Written Opinion mailed on Jan. 24, 2025, 12 pages.

Kikuchi et al., "Socket Design and Handler Integration for High-Volume Over the Air Testing of 5G Applications", Test ConX, May 3-7, 2021, 34 pages.

Fan et al., "Over-the-air Radiated Testing of Millimeter-Wave Beam-steerable Devices in a Cost-Effective Measurement Setup", IEEE Communications Magazine, vol. 56, Issue 7, Jan. 2018, 9 pages.

Human-Valid Audience Impressions—A Proposal for Cross-Platform Viewability, Sep. 4, 2019, retrieved on Jan. 8, 2026, Retrieve from Internet URL: https://quividi.com/human-valid-audience-impressions-a-proposal-for-cross-platform-viewability/, 11 pages.

Aggregate ad exposure population, Beyond the Data, addd, Add's tech, retrieved on Jan. 8, 2026, Retrieve from Internet URL: https://addd.co.kr/page/technology, 11 pages.

Tim Baker et al., "What does AI mean for digital signage and why does it matter?", Published on May 22, 2024, retrieved on Jan. 8, 2026, Retrieve from Internet URL: https://www.meldcx.com/blogs/what-does-ai-mean-for-digital-signage-and-whydoes-it-matter-video, 10 pages.

Yuri Garmider, "How DISPL Visitor Insights works with various types of hijab"; Mar. 27, 2024, Retrieved on Jan. 8, 2026, Retrieve from Internet URL: https://displ.com/blog/how-displ-visitor-insightsworks-with-various-types-of-hijab, 11 pages.

* cited by examiner

PROVIDING CONTENT VIEWING STATISTICS DATA

INCORPORATION BY REFERENCE TO ANY PRIORITY APPLICATIONS

Any and all applications for which a foreign or domestic priority is identified in the Application Data Sheet or any document as filed with the present application The present disclosure claims priority to International Patent Application No.: PCT/US24/58497, Korean Patent Application No.: 10-2023-0173762. Korean Patent Application No.: 10-2024-0001013 Korean Patent Application No.: 10-2024-0001014, Korean Patent Application No.: 10-2024-0001109, Korean Patent Application No.: 10-2024-0001110, and Korean Patent Application No.: 10-2024-0011874, all of which are incorporated herein by reference.

FIELD

This disclosure pertains to a method and apparatus designed to provide contents viewing statistics data, specifically for outdoor advertising content.

BACKGROUND

In the advertising market, the advent of the commercial internet introduced the first form of online advertising: banner ads. Comprising static images and simple text, these banner ads were typically displayed at the top of web pages or adjacent to content. Over time, various advertising formats, including video and flash ads, have emerged. The rise of social media further popularized social media advertising, enhancing interactions between user-generated content and advertisements. More recently, the mobile advertising market has experienced significant growth due to widespread smartphone use and technological advancements, leading to a diversification of advertising platforms within mobile apps.

Concurrently, the outdoor advertising sector has evolved to keep pace with technological advancements. Previously dominated by static billboards and posters, the industry has transitioned to digital outdoor advertising, known as DOOH (Digital Out of Home). Utilizing LED or LCD screens, digital signage can now effectively deliver dynamic and varied content. This transition to digital formats has transformed the viewing experience, enabling viewers to not only watch but also interact with and participate in advertisements, thus creating an engaging environment.

Patent Document: Republic of Korea Registered Patent 10-1490437 (Jan. 30, 2015) may be instructive.

SUMMARY

One aspect of the disclosure provides a method for determining a level of attention to a video. The method comprises: displaying a video content on at least one display screen at least once, wherein the video content comprises a plurality of segments; for each time of displaying of the video content, capturing, with at least one camera, at least one observation video featuring individuals (or "persons") who are situated to see the video content displayed on the at least one display screen; processing data comprising the at least one observation video to identify at least part of the individuals who are featured therein (hereinafter "identified individual(s)"); processing data comprising the at least one observation video, time information relating to displaying of the video content, and time information relating to capturing of the at least one observation video, to select, from the at least one observation video, at least one image captured during display of one of the plurality of segment of the video content, processing the at least one image selected for each of at least part of the plurality of segments to determine line-of-sight information for each identified individual featured in the at least one selected image as specific to that corresponding segment for which the at least one image is selected to thereby indicate whether the at least one display screen is within a predetermined angular range from a line of sight of each identified individual at the time of capturing the at least one image selected for the corresponding one of the plurality of segments; and processing the determined line-of-sight information for at least part of the identified individuals to determine an individual level of attention specific to one of the plurality segments for each of at least part of the identified individuals.

Another aspect of the disclosure provides an apparatus comprising at least one processor, at least one memory, and at least one communication interface. The at least one memory stores an executable program. The at least one communication interface is configured to receive information relating to displaying of a video content on at least one display screen, receive at least one observation video featuring people who are situated to see the video content displayed on the at least one display screen, and receive information relating to capturing of the at least one observation video. The at least one processor is configured to communicate with the at least one communication interface and the at least one memory and further configured to execute the executable program to perform the foregoing method.

Another aspect of the disclosure provides a system comprising the foregoing apparatus, at least one display screen configured to display a video content; and at least one camera configured to capture the at least one observation video featuring people who are situated to see the video content displayed on the at least one display screen.

In any of the foregoing method, in combination with any features discussed in any of the foregoing paragraphs, whether or not it is part of an apparatus or system, the at least one image is specific to the segment of the video content such that a first image captured during display of a first one of the plurality of segments is selected specific to the first segment and such that a second image captured during display of a second one of the plurality of segments is selected specific to the second segment;

In any of the foregoing method, in combination with any features discussed in any of the foregoing paragraphs, whether or not it is part of an apparatus or system, the line-of-sight information may be determined such that the determined line-of-sight information for a first identified individual featured in the first image is specific to the first segment for which the first image is selected, such that the determined line-of-sight information for a second identified individual featured in the first image is specific to the first segment for which the first image is selected, such that the determined line-of-sight information for a third identified individual featured in the first image is specific to the first segment for which the first image is selected, such that the determined line-of-sight information for the first identified individual featured in the second image is specific to the second segment for which the second image is selected, such that the determined line-of-sight information for the second identified individual featured in the second image is specific to the second segment for which the second image is selected, and such that the determined line-of-sight information for a fourth identified individual featured in the second image is specific to the second segment for which the second image is selected.

In any of the foregoing method, in combination with any features discussed in any of the foregoing paragraphs, whether or not it is part of an apparatus or system, the line-of-sight information may be determined such that the determined line-of-sight information for the first identified individual specific to the first segment indicates whether the at least one display screen is within the predetermined angular range from a line of sight of the first identified individual at the time of capturing the first image selected for the first segment, such that the determined line-of-sight information for the second identified individual specific to the first segment indicates whether the at least one display screen is within the predetermined angular range from a line of sight of the second identified individual at the time of capturing the first image selected for the first segment, such that the determined line-of-sight information for the third identified individual specific to the first segment indicates whether the at least one display screen is within the predetermined angular range from a line of sight of the third identified individual at the time of capturing the first image selected for the first segment, such that the determined line-of-sight information for the first identified individual specific to the second segment indicates whether the at least one display screen is within the predetermined angular range from a line of sight of the first identified individual at the time of capturing the second image selected for the second segment, such that the determined line-of-sight information for the second identified individual specific to the second segment indicates whether the at least one display screen is within the predetermined angular range from a line of sight of the second identified individual at the time of capturing the second image selected for the second segment, and such that the determined line-of-sight information for the fourth identified individual specific to the second segment indicates whether the at least one display screen is within the predetermined angular range from a line of sight of the fourth identified individual at the time of capturing the second image selected for the second segment.

In any of the foregoing method, in combination with any features discussed in any of the foregoing paragraphs, whether or not it is part of an apparatus or system, the individual level of attention may be determined such that for the first identified individual, the individual level of attention specific to the first segment is determined using the line-of-sight information for the first identified individual specific to the first segment, such that for the first identified individual, the individual level of attention specific to the second segment is determined using the line-of-sight information for the first identified individual specific to the second segment, such that for the second identified individual, the individual level of attention specific to the first segment is determined using the line-of-sight information for the second identified individual specific to the first segment, such that for the second identified individual, the individual level of attention specific to the second segment is determined using the line-of-sight information for the second identified individual specific to the second segment, such that for the third identified individual, the individual level of attention specific to the first segment is determined using the line-of-sight information for the third identified individual specific to the first segment, and such that for the fourth identified individual, the individual level of attention specific to the second segment is determined using the line-of-sight information for the fourth identified individual specific to the second segment.

One aspect of the present disclosure provides a method for determining a level of attention to a video. The method comprises: displaying a video content on at least one display screen at least once, wherein the video content comprises a plurality of segments; for each time of displaying of the video content, capturing, with at least one camera, at least one observation video featuring people who are situated to see the video content displayed on the at least one display screen; processing data comprising the at least one observation video to identify individuals who are featured therein (hereinafter "identified individual(s)"); processing data comprising the at least one observation video, time information relating to displaying of the video content, and time information relating to capturing of the at least one observation video, to select, from the at least one observation video, at least one image captured during display of one of the plurality of segment of the video content, in which the at least one image is specific to the segment of the video content such that a first image captured during display of a first one of the plurality of segments is selected specific to the first segment and such that a second image captured during display of a second one of the plurality of segments is selected specific to the second segment; processing the at least one image selected for each of at least part of the plurality of segments to determine line-of-sight information for each identified individual featured in the at least one selected image as specific to that corresponding segment for which the at least one image is selected, such that the determined line-of-sight information for a first identified individual featured in the first image is specific to the first segment for which the first image is selected, such that the determined line-of-sight information for a second identified individual featured in the first image is specific to the first segment for which the first image is selected, such that the determined line-of-sight information for a third identified individual featured in the first image is specific to the first segment for which the first image is selected, such that the determined line-of-sight information for the first identified individual featured in the second image is specific to the second segment for which the second image is selected, such that the determined line-of-sight information for the second identified individual featured in the second image is specific to the second segment for which the second image is selected, and such that the determined line-of-sight information for a fourth identified individual featured in the second image is specific to the second segment for which the second image is selected, wherein the determined line-of-sight information for each identified individual as specific to one segment indicates whether the at least one display screen is within a predetermined angular range from a line of sight of each identified individual at the time of capturing the at least one image selected for the specific one of the plurality of segments, such that the determined line-of-sight information for the first identified individual specific to the first segment indicates whether the at least one display screen is within the predetermined angular range from a line of sight of the first identified individual at the time of capturing the first image selected for the first segment, such that the determined line-of-sight information for the second identified individual specific to the first segment indicates whether the at least one display screen is within the predetermined angular range from a line of sight of the second identified individual at the time of capturing the first image selected for the first segment, such that the determined line-of-sight information for the third identified individual specific to the first segment indicates whether the at least one display screen is within the predetermined angular range from a line of sight of the third identified individual at the time of capturing the first image selected for the first segment, such that the determined line-of-sight information for the first identified individual specific to the second segment indicates whether the at least one display screen is within the predetermined angular range from a line of sight of the first identified individual at the time of capturing the second image selected for the second segment, such that the determined line-of-sight information for the second identified individual specific to the second segment indicates whether the at least one display screen is within the predetermined angular range from a line of sight of the second identified individual at the time of capturing the second image selected for the second segment, and such that the determined line-of-sight information for the fourth identified individual specific to the second segment indicates whether the at least one display screen is within the predetermined angular range from a line of sight of the fourth identified individual at the time of capturing the second image selected for the second segment; and processing the determined line-of-sight information for at least part of the identified individuals to determine an individual level of attention specific to one of the plurality segments for each of at least part of the identified individuals such that for the first identified individual, the individual level of attention specific to the first segment is determined using the line-of-sight information for the first identified individual specific to the first segment, such that for the first identified individual, the individual level of attention specific to the second segment is determined using the line-of-sight information for the first identified individual specific to the second segment, such that for the second identified individual, the individual level of attention specific to the first segment is determined using the line-of-sight information for the second identified individual specific to the first segment, such that for the second identified individual, the individual level of attention specific to the second segment is determined using the line-of-sight information for the second identified individual specific to the second segment, such that for the third identified individual, the individual level of attention specific to the first segment is determined using the line-of-sight information for the third identified individual specific to the first segment, and such that for the fourth identified individual, the individual level of attention specific to the second segment is determined using the line-of-sight information for the fourth identified individual specific to the second segment.

In any of the foregoing method, in combination with any features discussed in any of the foregoing paragraphs, whether or not it is part of an apparatus or system, at least part of the steps may be performed real time with displaying of the video content, wherein processing of one of the steps involving of one of the plurality of segments may be performed later than processing of the same step involving another one of the plurality of segments.

In any of the foregoing method, in combination with any features discussed in any of the foregoing paragraphs, whether or not it is part of an apparatus or system, at least part of the steps may be performed subsequent to completion of capturing the at least one observation video.

In any of the foregoing method, in combination with any features discussed in any of the foregoing paragraphs, whether or not it is part of an apparatus or system, each of the plurality of segments of the video content may be predetermined at the time of displaying the video content, wherein each segment corresponds to a specific time frame relative to a start of the video content and corresponds to specific information displayed in the specific time frame, wherein each segment extends for a period that may or may not be the same length for the plurality of segments.

In any of the foregoing method, in combination with any features discussed in any of the foregoing paragraphs, whether or not it is part of an apparatus or system, each of the plurality of segments of the video content may be undetermined at the time of displaying the video content and is determined while processing data comprising time information relating to displaying of the video content, wherein once determined each segment corresponds to a specific time frame relative to a start of the video content and corresponds to specific information displayed in the specific time frame, wherein each segment extends for a period that may or may not be the same length for the plurality of segments.

In any of the foregoing method, in combination with any features discussed in any of the foregoing paragraphs, whether or not it is part of an apparatus or system, the predetermined angular range from the line of sight may be horizontally about 40-80 degrees to the left and about 40-80 degrees to the right for an associated individual.

In any of the foregoing method, in combination with any features discussed in any of the foregoing paragraphs, whether or not it is part of an apparatus or system, the predetermined angular range from the line of sight may be vertically about 40-80 degrees upward and about 40-80 degrees downward for an associated individual.

In any of the foregoing method, in combination with any features discussed in any of the foregoing paragraphs, whether or not it is part of an apparatus or system, a plurality of observation videos may be obtained for displaying the video content at least once, in which each of the plurality of observation videos corresponds to one time displaying of the video content.

In any of the foregoing method, in combination with any features discussed in any of the foregoing paragraphs, whether or not it is part of an apparatus or system, the video content may be displayed multiple times, and the at least one observation video may comprise a plurality of observation videos, wherein the multiple times of displaying of the video content may comprise displaying of the video content on one display screen multiple times or displaying of the video content on more than on display screen.

In any of the foregoing method, in combination with any features discussed in any of the foregoing paragraphs, whether or not it is part of an apparatus or system, the method may further comprise assigning an individual identification code to each of the identified individuals and assigning a segment identification code to each of the plurality of segments.

In any of the foregoing method, in combination with any features discussed in any of the foregoing paragraphs, whether or not it is part of an apparatus or system, determining the line-of-sight information may comprise determining either or both of orientation and posture of a head of an associated individual featured on at least one image.

In any of the foregoing method, in combination with any features discussed in any of the foregoing paragraphs, whether or not it is part of an apparatus or system, a plurality of images captured during display of one segment may be selected from the at least one observation video such that each of the plurality of images is specific to the one segment, wherein each of the plurality of images may be processed to determine the line-of-sight information for each identified individual featured in the processed one of the plurality of images.

In any of the foregoing method, in combination with any features discussed in any of the foregoing paragraphs, whether or not it is part of an apparatus or system, the determined line-of-sight information for each identified individual featured in the processed image is specific to the specific image that is specific to the segment, wherein the individual level of attention is determined for each identified individual featured in the processed image with regard to each processed image such that a plurality of individual levels of attention is provided for each identified individual for the segment during which the plurality of images is or was captured.

In any of the foregoing method, in combination with any features discussed in any of the foregoing paragraphs, whether or not it is part of an apparatus or system, the method may further comprise processing data comprising the determined individual levels of attention specific to each of the plurality of segments for one of the identified individuals to determine a level of attention to the entire video content by the one identified individual.

In any of the foregoing method, in combination with any features discussed in any of the foregoing paragraphs, whether or not it is part of an apparatus or system, the method may further comprise processing data comprising the determined individual levels of attention specific to each of the plurality of segments for one of the identified individuals to compute a cumulative time of attention to the plurality of segments by the one identified individual and to determine if the cumulative time of attention is greater or smaller than a predetermined reference period.

In any of the foregoing method, in combination with any features discussed in any of the foregoing paragraphs, whether or not it is part of an apparatus or system, the cumulative time of attention to any of the plurality of segments is computed by adding time corresponding to those segments in which the line-of-sight information for the one identified individual indicates that the at least one display screen is within the predetermined angular range from a line of sight of the one identified individual.

In any of the foregoing method, in combination with any features discussed in any of the foregoing paragraphs, whether or not it is part of an apparatus or system, the method may further comprise processing data comprising the determined individual levels of attention to determine a crowd level of attention specific to one of at least part of the plurality of segments such that the crow level of attention for the first segment is determined with processing data comprising the individual level of attention determined for the first identified individual specific to the first segment, the individual level of attention determined for the second identified individual specific to the first segment, and the individual level of attention determined for the third identified individual specific to the first segment, and such that the crow level of attention for the second segment is determined with processing data comprising the individual level of attention determined for the first identified individual specific to the second segment, the individual level of attention determined for the second identified individual specific to the second segment, and the individual level of attention determined for the fourth identified individual specific to the second segment.

In any of the foregoing method, in combination with any features discussed in any of the foregoing paragraphs, whether or not it is part of an apparatus or system, determining the crowd level of attention to one segment may comprise: providing the number of identified individuals featured in the at least one selected image for the segment; providing the number of identified individuals whose individual level of attention is attention or no attention to the segment based on the individual levels of attention of the identified individuals.

In any of the foregoing method, in combination with any features discussed in any of the foregoing paragraphs, whether or not it is part of an apparatus or system, the individual level of attention for one identified individual is "attention" or its equivalent to one of the plurality of segments if the line-of-sight information of the one identified individual indicates that the at least one display screen is within the predetermined angular range from a line of sight of the one identified individual at the time of capturing the at least one image that is during display of the one segment, wherein the individual level of attention for the one identified individual is "no attention" or its equivalent to the one segment if the line-of-sight information of the one identified individual indicates that the at least one display screen is outside the predetermined angular range from the line of sight of the one identified individual at the time of capturing the at least one image that is during display of the one segment.

In any of the foregoing method, in combination with any features discussed in any of the foregoing paragraphs, whether or not it is part of an apparatus or system, identifying system, identifying individuals may comprise excluding at least one individual who is featured in the plurality of observation videos such that not everyone featured in the plurality of observation videos is identified.

In any of the foregoing method, in combination with any features discussed in any of the foregoing paragraphs, whether or not it is part of an apparatus or system, at least one of the identified individuals is not featured in the at least one image selected for one of the plurality of segments, wherein processing the at least one image to determine line-of-sight information does not provide line-of-sight information for an identified individual who is not featured in the at least one image.

In any of the foregoing method, in combination with any features discussed in any of the foregoing paragraphs, whether or not it is part of an apparatus or system, for the identified individual who is not featured in the at least one image and no line-of-sight information is provided, the individual level of attention is not determined.

In any of the foregoing method, in combination with any features discussed in any of the foregoing paragraphs, whether or not it is part of an apparatus or system, the first, second and third segments have the same length or substantially the same length in time, wherein the second segment and the third segment are not identical to each other such that the second segment does not overlap in time with the third segment or such that a portion of the second segment overlaps in time with a portion of the third segment, wherein the first segment and the third segment are not identical to each other such that the third segment does not overlap in time with the first segment or such that a portion of the third segment overlaps in time with a portion of the first segment.

Another aspect of the present disclosure provides a method for determining a level of attention to a video. The method comprises: displaying a video content on at least one display screen; capturing, with at least one camera, at least one observation video featuring people who are situated to see the video content displayed on the at least one display screen; processing data comprising at least one observation video, time information relating to displaying the video content and time information relating to capturing the at least one video, wherein processing data may comprise: identifying a plurality of portions in each of the plurality of observation videos such that each of the plurality of portions is or was captured during display one of a plurality of segments of the video content and corresponds to the one segment; identifying a plurality of groups of individuals for the plurality of segments such that each of the plurality of groups of individuals is identified among those who are featured in a portion of the plurality of observation videos that corresponds to the segment; determining line-of-sight information for each identified individual with processing of one or more images belong to a portion of the plurality of observation videos that features the individual and indicates whether the at least one display screen is within a predetermined angular range from a line of sight of the individual during display of the segment of the video content that corresponds to the portion comprising the one or more images such that the determined line-of-sight information for each individual corresponds to one of the plurality of segments of the video content that corresponds to one of the plurality of portions; and determining, for each of at least part of the identified individuals, an individual level of attention to one of the plurality of segments of the video content using the line-of-sight information.

In any of the foregoing method, in combination with any features discussed in any of the foregoing paragraphs, whether or not it is part of an apparatus or system, a plurality of portions may comprise a first portion, a second portion and a third portion, wherein the plurality of segments may comprise a first segment corresponding to the first portion, a second segment corresponding to the second portion, and a third segment corresponding to the third portion, and wherein the plurality of groups may comprise a first group corresponding to the first portion of the plurality of observation videos, a second group corresponding to the second portion of the plurality of observation videos, a third group corresponding to the third portion of the plurality of observation videos.

In any of the foregoing method, in combination with any features discussed in any of the foregoing paragraphs, whether or not it is part of an apparatus or system, the method may further comprise determining a group level of attention to one of the plurality of segments using the individual levels of attention of the individuals to the segment.

In any of the foregoing method, in combination with any features discussed in any of the foregoing paragraphs, whether or not it is part of an apparatus or system, the group level of attention is determined such that the group level of attention to the first segment is determined using the individual levels of attention to the first segment determined for the individuals of the first group, wherein the group level of attention to the second segment is determined using the individual levels of attention to the second segment determined for the individuals of the second group, and wherein the group level of attention to the third segment is determined using the individual levels of attention to the third segment determined for the individuals of the third group.

In any of the foregoing method, in combination with any features discussed in any of the foregoing paragraphs, whether or not it is part of an apparatus or system, the first portion in each observation video is or was captured during display of the first segment of the video content and corresponds to the first segment, wherein the portion in each observation video is or was captured during display of the second segment of the video content and corresponds to the second segment, and wherein the third portion in each observation video is or was captured during display of the third segment of the video content and corresponds to the third segment.

In any of the foregoing method, in combination with any features discussed in any of the foregoing paragraphs, whether or not it is part of an apparatus or system, the first group of individuals is identified among those who are featured in the first portion of any of the plurality of observation videos, wherein the second group of individuals is identified among those who are featured in the second portion of any of the plurality of observation videos, and wherein the third group of individuals is identified among those who are featured in the third portion of any of the plurality of observation videos, wherein the first group may comprise at least one individual featured in the first portion of one of the plurality of observation videos and at least one individual featured in the first portion of another one of the plurality of observation videos.

In any of the foregoing method, in combination with any features discussed in any of the foregoing paragraphs, whether or not it is part of an apparatus or system, the line-of-sight information of each individual of the first group is determined with processing of one or more images belonging to the first portion of the plurality of observation videos and indicates whether the at least one display screen is within a predetermined angular range from a line of sight of the individual during display of the first segment of the video content, wherein the line-of-sight information of each individual of the second group is determined with processing of one or more images belonging to the second portion of the plurality of observation videos and indicates whether the at least one display screen is within the predetermined angular range from a line of sight of the individual during display of the second segment of the video content, wherein the line-of-sight information of each individual of the third group is determined with processing of one or more images belonging to the third portion of the plurality of observation videos and indicates whether the at least one display screen is within the predetermined angular range from a line of sight of the individual during display of the third segment of the video content.

In any of the foregoing method, in combination with any features discussed in any of the foregoing paragraphs, whether or not it is part of an apparatus or system, the individual level of attention to the first segment is determined for each individual of the first group using the determined line-of-sight information for the individual, wherein the individual level of attention to the second segment is determined for each individual of the second group using the determined line-of-sight information for the individual, and wherein the individual level of attention to the third segment is determined for each individual of the third group using the determined line-of-sight information for the individual.

In any of the foregoing method, in combination with any features discussed in any of the foregoing paragraphs, whether or not it is part of an apparatus or system, the video content is displayed on the at least one display screen at least once, which provides a plurality of observation videos, wherein each of the plurality of observation videos corresponds to one of the multiple times of displaying of the video contents.

This disclosure aims to provide a first user interface that includes content viewing statistics data. Specifically, the goal is to provide a first user interface that incorporates content viewing statistics data generated based on a first image. This image serves as the basis for assessing interactions between individuals within the image and the content displayed by signage.

This disclosure further addresses the challenge of acquiring tracking information for multiple objects from signage broadcasting content for outdoor advertising. Specifically, it aims to gather tracking information for multiple objects located in the target area where the content is displayed. This includes obtaining feature vectors corresponding to each object, along with characteristic information and content viewing data for each object.

This disclosure further addresses a challenge that emerged from the background technology described herein, specifically focusing on obtaining content viewing statistics data from signage that broadcasts outdoor advertising content. The goal is to acquire these statistics based on the gaze information of each object within the target area exposed to the content.

This disclosure further addresses the challenge of determining the broadcast frequency for multiple pieces of content. Specifically, it focuses on determining the broadcast frequency for each piece of content based on the probability distribution of the attention each content receives.

This disclosure further addresses the challenge of acquiring of content viewing statistics data for outdoor advertising content. Specifically, this disclosure aims to solve the problem of obtaining first content viewing statistics data for the first content displayed by the first signage and second content viewing statistics data for the second content displayed by the second signage, based on merged tracking information.

According to one aspect of this disclosure, a method for acquiring content viewing statistics data for outdoor advertising content, performed by a computing device, is provided. This method includes several steps: acquiring tracking information for each of multiple first objects based on a first image captured by the first signage; acquiring tracking information for each of multiple second objects based on a second image captured by the second signage; merging the tracking information of the multiple first objects with that of the multiple second objects based on the identification of identical objects among them; and, based on this merged tracking information, acquiring first content viewing statistics data for the first content displayed by the first signage and second content viewing statistics data for the second content displayed by the second signage. Additionally, the first image is used to assess interactions between the first content displayed by the first signage and the multiple first objects within that image, while the second image is used to assess interactions between the second content displayed by the second signage and the multiple second objects within that image.

In one embodiment, the tracking information for each object includes a feature vector corresponding to that object. The process of merging the tracking information involves assessing the presence of identical objects between the two groups based on the vector similarity between the feature vectors of the multiple first objects and those of the multiple second objects. Once identical objects are identified, their corresponding tracking information is merged by matching these identified objects, thus integrating the tracking information of each of the multiple first objects with that of the multiple second objects.

In one embodiment, the tracking information for each object includes its location information. The process for merging the tracking information of each of the multiple first objects with that of the multiple second objects involves converting the location information from the tracking data of each first object from the coordinate system of the first signage to an absolute coordinate system. Similarly, the location information for each of the second objects is converted from the coordinate system of the second signage to the same absolute coordinate system. Using the converted location information of both groups of objects, the method then assesses whether there are identical objects between the two groups. If identical objects are identified, their tracking information is merged by matching these objects across the first and second groups.

In one embodiment, the tracking information for each of the multiple first objects includes the location information for each object as it appears in sequential third images that include the first image. Similarly, the tracking information for each of the multiple second objects includes the location information for each object as it appears in sequential fourth images that include the second image. Furthermore, the method includes a step to acquire motion information for each of the multiple first objects based on their location information from each of the sequential third images—this motion information encompasses the objects'movement paths, speeds, and directions. Additionally, the method involves acquiring motion information for each of the multiple second objects based on their location information from each of the sequential fourth images.

In one embodiment, both the first and second content are identical, and the process to determine their broadcast start times includes acquiring the location information of the first and second signage. The broadcast start times for the first and second content are then determined based on this location information, as well as the motion information from the multiple first and second objects.

In one embodiment, based on the location information from either the first or the second signage, the first interaction type between the identical object and the first content and the second interaction type between the identical object and the second content are linked, although these interaction types may differ from each other.

In one embodiment, the tracking information for the object includes gaze information, which comprises the yaw angle, pitch angle, and roll angle of the face. The steps to acquire the first and second content viewing statistics data involve using the gaze information from each of the multiple first and second objects, based on the merged tracking information, to obtain the viewing statistics for both the first and second content.

In one embodiment, the first content viewing statistics data includes the number of first objects within the first target area of the first image where the first content is exposed, the number of first viewers who watched the first content, the number of second viewers who watched the first content for a reference time period or longer, and the attention level of the first content. Similarly, the second content viewing statistics data includes the number of second objects within the second target area of the second image where the second content is exposed, the number of third viewers who watched the second content, the number of fourth viewers who watched the second content for a reference time period or longer, and the attention level of the second content.

In one embodiment, if the first and second content are identical, the method includes a step to aggregate the first and second content viewing statistics data into a single set of content viewing statistics data. This aggregated data set would comprise the total number of first and second objects as the third number of objects, the combined total of first and third viewers as the fifth number of viewers, the combined total of second and fourth viewers as the sixth number of viewers, and the combined attention levels of the first and second content as the third content attention level.

In one embodiment, the number of first viewers is calculated based on the gaze information from each of the multiple first objects, which is obtained from the first image. Similarly, the number of third viewers is calculated based on the gaze information from each of the multiple second objects, obtained from the second image. This gaze information may include the yaw angle, pitch angle, and roll angle of the face.

In one embodiment, the number of first viewers is determined based on whether each of the multiple first objects is focused on the content, and the number of third viewers is determined based on whether each of the multiple second objects is focused on the content. This determination is made by checking if at least one of the yaw or pitch angles of the objects meets a predefined first condition for assessing viewership.

In one embodiment, the first condition stipulates that the yaw angle of an object must be within a predefined first standard angle range, and the pitch angle must be within a predefined second standard angle range.

In one embodiment, the signage includes a display unit that outputs content and a camera unit that captures the target area where the content displayed by the display unit is exposed. The predefined first and second standard angle ranges are determined based on at least one of the following: the position of the display unit, the size of the display unit, or the position of the camera unit.

In one embodiment, the number of second viewers is determined based on the gaze information from each of the multiple first objects, which is gathered from a series of images including the first image. Similarly, the number of fourth viewers is determined based on the gaze information from each of the multiple second objects, collected from a series of images including the second image. This gaze information typically includes the yaw angle, pitch angle, and roll angle of the face.

In one embodiment, the number of second viewers is calculated based on the intense focus each of the multiple first objects maintains on the content, while the number of fourth viewers is calculated based on the intense focus each of the multiple second objects maintains on the content. The determination of whether an object is intensely focused on the content is based on whether at least one of the yaw or pitch angles of the object meets a predefined second condition designed to assess intense content focus.

In one embodiment, this second condition requires that the yaw angle of the object be within a predefined third standard angle range, and the pitch angle be within a predefined fourth standard angle range.

In one embodiment, the number of first viewers is calculated based on the degree of content attention exhibited by each of the multiple first objects, and the number of third viewers is based on the degree of content attention exhibited by each of the multiple second objects. The determination of whether an object is paying attention to the content depends on whether at least one of the object's yaw or pitch angles satisfies a first condition designed to assess content attention. Additionally, the number of second viewers is calculated from the intense focus demonstrated by each of the multiple first objects toward the content, and the number of fourth viewers is derived from the intense focus demonstrated by each of the multiple second objects. This evaluation of intense focus utilizes the gaze information of the objects, specifically checking if at least one of their yaw or pitch angles meets a second condition aimed at evaluating concentrated attention. The first condition specifies that the yaw angle of an object must fall within a predefined first standard angle range, and the pitch angle must fall within a predefined second standard angle range. The second condition requires that the yaw angle be within a narrower third standard angle range, and the pitch angle within a narrower fourth standard angle range, where the third standard angle range is more restrictive than the first, and the fourth standard angle range is more restrictive than the second.

In one embodiment, the number of second viewers is calculated by recording the duration each of the multiple first objects spends watching the content, as well as the duration they spend not watching (non-watching time), in a designated queue for each of these first objects. This method involves applying both a first and a second time window to each queue, which allows for the calculation of cumulative durations of watched time within these time windows. If the cumulative watched time in either the first or second time window exceeds a predefined reference time period, the object associated with that queue is included in the count of second viewers. Notably, both the first and second time windows are of the same size and are configured to overlap at least partially.

According to one aspect of this disclosure, a computing device designed to acquire content viewing statistics data for outdoor advertising content is provided. This device comprises at least one processor and a memory unit. The processor is responsible for acquiring tracking information for each of multiple first objects based on a first image captured by the first signage. Similarly, it acquires tracking information for each of multiple second objects based on a second image captured by the second signage. The processor then merges the tracking information from the multiple first objects with that from the multiple second objects, based on whether identical objects are identified among them. Utilizing this merged tracking information, the processor generates first content viewing statistics for the first content displayed by the first signage and second content viewing statistics for the second content displayed by the second signage. The first image serves to assess interactions between the first content displayed by the first signage and the multiple first objects within that image, while the second image is used to evaluate interactions between the second content displayed by the second signage and the multiple second objects within that image.

According to one aspect of this disclosure, a computer-readable storage medium is provided, storing a computer program. When executed by one or more processors, this program directs the processors to perform a series of actions to acquire content viewing statistics data for outdoor advertising content. These actions include acquiring tracking information for each of multiple first objects based on a first image captured by the first signage and acquiring tracking information for each of multiple second objects based on a second image captured by the second signage. Additionally, the tracking information from the multiple first and second objects is merged based on the identification of identical objects among them. Subsequently, using the merged tracking information, the program calculates the first content viewing statistics data for the content displayed by the first signage and the second content viewing statistics data for the content displayed by the second signage. Furthermore, the first image is specifically used to assess interactions between the first content displayed by the first signage and the multiple first objects within that image, while the second image is used to assess the interactions between the second content displayed by the second signage and the multiple second objects within that image.

In addition, the technical challenges addressed by this disclosure are not confined to those previously mentioned. Various technical challenges, which should be apparent to those skilled in the art from the content described below, are also included.

Developed in response to the described background technology, this disclosure proposes a method and apparatus designed to provide content viewing statistics data.

According to one aspect of this disclosure, a method performed by a computing device for providing content viewing statistics data for outdoor advertising content is proposed. The method involves acquiring content viewing statistics data based on a first image captured by signage—the first image is intended to assess interactions between individuals within the image and the content displayed by the signage. It also includes providing a first user interface that incorporates this content viewing statistics data. Moreover, this first user interface may feature a first area displaying a first graph, which includes a first axis indicating the playback time of the content, a second axis showing the relative attention to the content, and a first graph object illustrating the relative attention at various playback times. In addition, a second area displays text that describes the first graph.

In one embodiment, the first area may show the values on the first axis and the second axis that correspond to the lowest point of relative attention, and it may also display the first scene of the content associated with the lowest point of relative attention at various playback times.

In one embodiment, the first area may display the values on the first axis and the second axis that correspond to the highest rise point of relative attention during playback. Furthermore, it may display the second scene of the content that corresponds to the highest rise point of relative attention.

In one embodiment, the first area displays the values on the first axis and the second axis that correspond to the highest point of relative attention. In addition, the third scene of the content, which corresponds to this highest point of relative attention, may also be displayed.

In one embodiment, if a first point within the first area corresponds to a user's selection input on the first graph object, the values on the first axis and the second axis corresponding to this first point are displayed. Furthermore, the fourth scene of the content that corresponds to this first point may be output.

In one embodiment, the content viewing statistics data may include the number of people within the target area in the first image, which encompasses the area where the content is displayed; the number of second viewers who watched the content for a reference time period; and the level of attention to the content. The level of attention is calculated as the ratio of the number of second viewers to the number of people within the target area.

In one embodiment, the content viewing statistics data includes the number of first viewers who initially watched the content; the number of second viewers who watched the content for longer than a reference time period; and the level of attention to the content. The level of attention is calculated as the ratio of the number of second viewers to the number of first viewers.

In one embodiment, the content viewing statistics data includes the relative attention at various playback times of the content. The relative attention at each playback time is calculated as the ratio of the attention at each playback time to the average attention across all playback times.

In one embodiment, the method further includes providing a second user interface that incorporates content viewing statistics data. This second user interface features a third area dedicated to displaying the content viewing statistics data, and a fourth area that presents a second graph. This graph includes a third axis representing the publication dates of the content, a fourth axis detailing the content viewing statistics, and a second graph object that illustrates these statistics by publication date.

In one embodiment, the content viewing statistics data may include: the number of playback instances of the content; the number of people within the target area in a sequence of images that include the target area where the content is displayed (these sequential images include the first image); the number of first viewers who watched the content; the number of second viewers who watched the content for a reference time period or longer; and the attention level to the content. In addition, the third area may display the number of playback instances, the number of people, the number of first viewers, the number of second viewers, and the attention level to the content.

In one embodiment, the fourth axis may display the number of people within the target area across a sequence of images, including the target area where the content is displayed—these sequential images incorporate the first image. In addition, this axis shows the number of first viewers who watched the content on each publication date and the number of second viewers who watched the content for a reference time period or longer on each publication date. This axis includes a sub-axis (4-1 axis) representing the numbers mentioned above, and another sub-axis (4-2 axis) representing the attention level to the content on each publication date.

In one embodiment, the second graph object could include graph objects representing the number of people on each publication date, the number of first viewers on each publication date, the number of second viewers on each publication date, and the attention level to the content on each publication date.

In one embodiment, if a user selection area within the fourth area, corresponding to a second user selection input, aligns with the second graph object, a third graph may be displayed in the fifth area of the second user interface. This third graph includes a fifth axis representing the publication times of the content on the publication dates, a sixth axis representing the content viewing statistics data, and a third graph object illustrating the content viewing statistics data by publication times.

In one embodiment, the sixth axis displays the number of people at each publication time of the content within the target area, shown across a sequence of images that includes the target area where the content is displayed—these sequential images include the first image. In addition, it shows the number of first viewers at each publication time who watched the content, and the number of second viewers at each publication time who watched the content for a reference time period or longer. This axis comprises a sub-axis (6-1 axis) that represents these figures, and another sub-axis (6-2 axis) that indicates the attention level to the content at each publication time.

In one embodiment, the third graph object includes graph objects that represent the number of people at each publication time, the number of first viewers at each publication time, the number of second viewers at each publication time, and the attention level to the content at each publication time.

In one embodiment, the second user interface also features a sixth area that displays a button object for receiving user inputs. In addition, the step of providing the first user interface includes a procedure based on user input to provide the first user interface.

In one embodiment, the content viewing statistics data includes the number of first viewers who watched the content. This number is calculated through a process that begins by extracting multiple facial landmarks corresponding to each individual from the acquired first image. Subsequently, gaze information, which includes the yaw angle, pitch angle, and roll angle of the face, is obtained for each individual based on these facial landmarks. The assessment of whether each individual is watching the content is made by verifying if at least one of their yaw or pitch angles meets a predetermined first condition for determining content viewership. The number of first viewers is then calculated based on this assessment.

In one embodiment, the content viewing statistics data includes the number of second viewers who watched the content for a reference time period or longer. This number is determined by extracting multiple facial landmarks corresponding to each person from a sequence of images, including the acquired first image. Gaze information for each person, which includes the yaw angle, pitch angle, and roll angle of the face, is then obtained based on these facial landmarks. The determination of whether each person is watching the content is made by checking if at least one of their yaw or pitch angles satisfies a second predetermined condition for assessing content viewership. The number of second viewers is calculated based on this determination.

According to one aspect of this disclosure, a computing device designed to provide content viewing statistics data for outdoor advertising content is available. This device includes at least one processor and memory. The processor is tasked with acquiring content viewing statistics data based on a first image captured by signage—the first image is specifically targeted to assess interactions between people within the image and the content displayed by the signage. In addition, the computing device provides a first user interface that incorporates this content viewing statistics data. The first user interface features a first area that displays a graph, which includes a first axis indicating the playback times of the content, a second axis representing the relative attention to the content, and a graph object that illustrates the relative attention to the content at various playback times. There is also a second area that displays text describing the first graph.

According to one aspect of this disclosure, a computer-readable storage medium storing a computer program may be provided. When executed by one or more processors, this computer program enables the processors to perform operations for providing content viewing statistics data for outdoor advertising content. These operations involve acquiring content viewing statistics data based on a first image captured by signage—the first image is specifically designed to assess interactions between people within the image and the content displayed by the signage. Furthermore, the operations include providing a first user interface that incorporates this content viewing statistics data. This interface features a first area displaying a graph, which includes a first axis indicating the playback times of the content, a second axis representing the relative attention to the content, and a graph object illustrating the relative attention at various playback times. In addition, there is a second area that displays text describing the first graph.

According to one aspect of this disclosure, signage designed for tracking multiple objects can be provided. This signage includes: a control unit that manages operations related to content distribution; a memory that incorporates a tracking database; a display unit that outputs content; and a camera unit that captures a first image, which includes a target area where the displayed content is visible. The control unit, using the acquired first image, obtains bounding boxes corresponding to each of the multiple objects, acquires feature vectors based on these bounding boxes, retrieves feature information based on the feature vectors for each object, gathers viewing information for the content based on the outputted content, and stores tracking information for each object—including the feature vectors, feature information, and content viewing information—in the tracking database. The first image is subsequently deleted from the memory. In addition, the feature information may include at least one of the preset feature items, such as gender, age, and clothing.

In one embodiment, the camera unit includes an AI (Artificial Intelligence) camera that uses a pre-trained image processing model to extract a first feature map corresponding to the first image. The control unit can then acquire bounding boxes for each of the multiple objects from this extracted feature map.

In one embodiment, to obtain feature vectors for each of the multiple objects, a pre-trained object detection model is employed to extract bounding boxes from the first image for each object. In addition, a pre-trained facial landmark extraction model is used to identify multiple facial landmarks for each object from the same image. A pre-trained pose estimation model is also utilized to detect multiple body keypoints for each object from the first image. Based on these bounding boxes, facial landmarks, and body keypoints, feature vectors corresponding to each object are compiled. These feature vectors are then used to gather feature information, gaze information, and pose information for each object. Moreover, the tracking information for each object may include the pose information for each object.

In one embodiment, the control unit acquires feature vectors for each of the multiple objects by using a pre-trained object detection model to obtain bounding boxes for each object from the first image. It also employs a pre-trained facial landmark extraction model to derive multiple facial landmarks for each object from their respective bounding boxes, and a pre-trained pose estimation model to secure multiple body keypoints for each object from their bounding boxes. Based on these bounding boxes, facial landmarks, and body keypoints, the control unit compiles feature vectors for each object. Furthermore, it uses these feature vectors to gather feature information, gaze information, and pose information for each object. The tracking information for each object may also include their pose information.

In one embodiment, to acquire feature vectors for each of the multiple objects, the control unit uses a pre-trained object detection model to identify centroids for each object from the acquired first image. Based on these centroids, it then retrieves bounding boxes, multiple facial landmarks, and multiple body keypoints for each object. Using these bounding boxes, facial landmarks, and body keypoints, it compiles feature vectors for each object. Subsequently, the control unit uses these feature vectors to gather feature information, gaze information, and pose information for each object. In addition, the tracking information for each object can include their pose information.

In one embodiment, the control unit uses a pre-trained object detection model to obtain bounding boxes for each of the multiple objects from a series of sequential images, including the first image. Based on these bounding boxes, the unit determines the position information for each object across the sequential images. Furthermore, using this position information, the control unit calculates movement information for each object, which includes their movement paths, speeds, and directions. The tracking information for each object may also include this movement information.

In one embodiment, the target area includes at least one boundary line corresponding to an entrance, which encompasses the entrance's own boundary line. Based on the movement information of each of the multiple objects and the boundary line of the entrance, the control unit can determine whether each object has entered or exited through the entrance.

In one embodiment, the target area includes multiple sub-areas, such as entry and access areas. The position information for each of the multiple objects specifies the particular sub-area where each object is located. In addition, using the movement information for each object, the control unit determines whether each object has moved from the access area to the entry area or from the entry area to the access area.

In one embodiment, the control unit evaluates whether each object has moved from the access area into the entry area or from the entry area back into the access area. This evaluation is based on the bounding boxes and movement information for each object, which enable the control unit to track the movement paths of each object's centroid. Based on these paths, the control unit then determines whether each object has entered the entry area from the access area or exited from the entry area back into the access area.

In one embodiment, the control unit uses a pre-trained pose estimation model to determine whether each of the multiple objects has entered from the access area into the entry area or exited from the entry area to the access area. This model acquires multiple body keypoints from the bounding boxes corresponding to each object. Specifically, the control unit tracks the movement paths of the body keypoints related to the feet of each object, using these keypoints along with the objects'movement information. Based on these paths, the control unit can ascertain if each object has entered the entry area from the access area or exited to the access area from the entry area.

In one embodiment, the control unit calculates the distance between each of the multiple objects and the signage, based on the position information of each object from each sequential image. In addition, the control unit collects content viewing information for each object by determining whether at least one of the movement information or the distance information meets the conditions for assessing content viewing. The content viewing information for each object may include details about their engagement with the content.

In one embodiment, the control unit utilizes the movement information for each of the multiple objects derived from sequential images to determine changes in their movement speeds. The conditions for content viewing include cases where the movement speed of each object decreases by a preset amount or more, and the distance from the signage is less than a preset distance.

In one embodiment, the control unit determines the movement direction for each of the multiple objects based on their movement information obtained from sequential images. The conditions for content viewing include scenarios where each object's movement direction changes by a preset angle toward the signage, their movement speed decreases by a preset amount or more, and their distance from the signage is less than a preset distance.

In one embodiment, the control unit acquires position information for each object based on the bounding boxes corresponding to each object. It also determines whether each object belongs to one of several preset groups, based on their feature and position information. The control unit then collects group information for each object, depending on whether they are part of these preset groups, which may include mixed-gender, same-gender, or family groups. The tracking information for each object includes their position and group information.

In one embodiment, the bounding boxes are visible bounding boxes, which include only the portions of the objects visible in the first image. The control unit utilizes a pre-trained pose estimation model to acquire multiple body keypoints for each object from their respective bounding boxes. If the bounding box corresponding to the first object includes only keypoints for the lower body, the tracking information for this object can be deleted from the tracking database.

In one embodiment, the control unit calculates the body orientation angles for each of the multiple objects based on their respective feature vectors. It then generates feature vectors that correspond to these body orientation angles based on both the initial feature vectors and the body orientation angles of each object. The tracking information for each object can include the feature vectors related to their body orientation angles.

In one embodiment, the control unit identifies at least one non-trackable object, predetermined not to be tracked, based on the feature information of the multiple objects. It can then delete the tracking information for at least one non-trackable object, obtained from the first image, from the tracking database.

In one embodiment, the control unit identifies at least one non-trackable object predetermined not to be tracked among multiple objects, based on their attire.

According to one aspect of this disclosure, a method for tracking multiple objects using signage is provided. This method includes several steps: acquiring a first image that includes a target area where the content outputted by the signage is displayed; obtaining bounding boxes corresponding to each of the multiple objects from the acquired first image; using these bounding boxes to obtain feature vectors for each object; using these feature vectors to derive feature information for each object; obtaining content viewing information for each object based on the displayed content; storing in a tracking database the tracking information for each object, which includes their feature vectors, feature information, and content viewing information; and deleting the first image from the signage's memory. In addition, the feature information may include at least one of the preset feature items such as gender, age, and attire.

According to one aspect of this disclosure, a computer program stored on a computer-readable storage medium is provided. When executed by one or more processors, this computer program enables the processors to perform operations for tracking multiple objects. These operations include acquiring a first image that features a target area where content outputted by the signage is displayed; obtaining bounding boxes corresponding to each of the multiple objects from this first image; using these bounding boxes to derive feature vectors for each object; using these feature vectors to gather feature information for each object; obtaining content viewing information for each object based on the displayed content; storing tracking information in a database for each object, which includes their feature vectors, feature information, and content viewing information; and deleting the first image from the signage's memory. In addition, the feature information may include at least one preset feature item such as gender, age, and attire.

According to one aspect of this disclosure, there is provided signage for broadcasting content (contents) specifically for outdoor advertising. This signage includes a control unit that manages operations related to content broadcasting, a memory, a display unit that outputs content, and a camera unit that captures a first image including a target area (target area) where the displayed content is visible. The control unit is capable of obtaining the gaze (gaze) information of each object from this first image—this gaze information includes the yaw, pitch, and roll angles of the face. Based on the gaze information from each of the multiple objects, the control unit can gather content viewing statistics data about the displayed content.

In one embodiment, the control unit, in its effort to acquire the gaze information of each of the multiple objects, uses a pre-trained facial landmark extraction model. This model allows the control unit to extract multiple facial landmarks corresponding to each object from the acquired first image. Using these facial landmarks, the control unit can then obtain the gaze information for each object.

In one embodiment, the pre-trained facial landmark extraction model is an artificial intelligence model trained on a labeling method that categorizes facial landmarks in training images as visible or invisible (at least partially non-visible), depending on their visibility in the images. Utilizing this model, the control unit can extract multiple facial landmarks from the first image, including at least one visible or invisible landmark, corresponding to each of the multiple objects. This allows the control unit to acquire the gaze information of each object.

In one embodiment, the control unit calculates the number of objects within the target area of the first image. Based on the gaze information of each object, it determines the number of first viewers who are actively watching the content. It also calculates the number of second viewers who have watched the content for a reference time period or longer, based on the gaze information from sequential images that include the first image. The content viewing statistics data thus may include counts of the objects, first viewers, and second viewers.

In one embodiment, to determine the number of first viewers, the control unit assesses whether at least one of the yaw angle or pitch angle of each object satisfies a first condition indicative of watching the content. Based on this assessment, the control unit decides if each of the multiple objects is watching the content and accordingly determines the number of first viewers.

In one embodiment, the first condition stipulates that the yaw angle of each object must fall within a predefined first standard angle range, and the pitch angle must fall within a predefined second standard angle range.

In one embodiment, these predefined first and second standard angle ranges are determined based on at least one of the following factors: the position of the display unit, the size of the display unit, or the position of the camera unit.

In one embodiment, the control unit determines the number of second viewers by assessing whether at least one of the yaw or pitch angles of each object meets a second condition. This condition is used to judge whether the objects are intently focusing on the content. Based on this assessment, the control unit then determines the number of second viewers.

In one embodiment, the second condition requires that the yaw angle of each object is within a predefined third standard angle range, and the pitch angle is within a predefined fourth standard angle range.

In one embodiment, the control unit determines the number of first viewers by assessing whether at least one of the yaw or pitch angles of each object meets the first condition based on their gaze information. This condition evaluates whether the objects are paying attention to the content. If the objects meet this first condition, the control unit confirms their attention to the content and calculates the number of first viewers accordingly. Similarly, to determine the number of second viewers, the control unit checks if at least one of the yaw or pitch angles of each object satisfies the second condition, which is also based on their gaze information. This second condition assesses whether the objects are intensely focusing on the content. Based on this intense focus, the number of second viewers is determined. The first condition requires that the yaw angle of each object falls within a predefined first standard angle range and the pitch angle within a predefined second standard angle range. The second condition stipulates that the yaw angle must be within a narrower predefined third standard angle range, and the pitch angle within a narrower predefined fourth standard angle range compared to the second.

In one embodiment, the control unit calculates the number of second viewers by assessing whether each of the multiple objects watched the content for periods longer than a predefined reference time period, segmented into units of a first time period. The control unit then determines the number of second viewers based on the cumulative time each object spent watching the content within this first time period unit, provided that the total exceeds the reference time period.

In one embodiment, the control unit calculates the number of second viewers by tracking the attentive (watching) and non-attentive (not watching) durations for each of the multiple objects in corresponding queues. It applies a first time window and a second time window to these queues, obtaining the cumulative attentive durations within both time windows. If the cumulative duration in either window exceeds the reference time period, the object associated with that queue is included in the count of second viewers. Both the first and second time windows are of the same size and can partially overlap.

In one embodiment, the reference time period is determined based on the location where the signage is installed.

In one embodiment, the content comprises both first and second content types. The control unit, to obtain content viewing statistics, gathers broadcasting information that includes the start and end times, as well as the playback duration for each of these content types. Based on the gaze information from each of the multiple objects, along with this broadcasting information, the control unit acquires viewing statistics for both the first and second content.

In one embodiment, the control unit, in acquiring the gaze information for each of the multiple objects, employs a pre-trained first head vector extraction model. This model extracts the head vectors from each object using the initially acquired image. Using these head vectors, the control unit then determines the gaze information for each object. The pre-trained first head vector extraction model is an artificial intelligence model that has been developed using a 3D learning image dataset, where head vectors are labeled on the faces of the objects.

In one embodiment, the control unit, for acquiring the gaze information of each object, utilizes a pre-trained second head vector extraction model. This model extracts the head vectors of each object from the initially acquired image. Using these head vectors, the control unit determines the gaze information for each object. In addition, this pre-trained second head vector extraction model is an artificial intelligence model that has been developed through a process where the facial landmarks in a learning image dataset are marked, transformed into head vectors, and subsequently used for training.

According to one embodiment of this disclosure, a method for broadcasting content designed for outdoor advertising is provided. This method includes several steps: acquiring a first image that encompasses the target area where the content displayed on the signage is visible; acquiring gaze information from each of multiple objects based on this first image—this gaze information encompasses the yaw angle, pitch angle, and roll angle of each object's face; and using the gaze information from each object to gather content viewing statistics data for the displayed content.

According to one embodiment of this disclosure, a computer-readable storage medium is provided that stores a computer program. When executed by one or more processors, this program instructs the processors to perform operations related to broadcasting content for outdoor advertising. These operations include: acquiring a first image that includes the target area where the content displayed on the signage is exposed; acquiring gaze information from each of multiple objects from the acquired first image—this gaze information includes the yaw angle, pitch angle, and roll angle of each object's face; and using this gaze information to compile content viewing statistics data for the displayed content.

According to one aspect of this disclosure, a method for determining the broadcast frequency of outdoor advertising content is provided, which is performed by a computing device. The method involves acquiring content viewing statistics for each piece of content based on a first image captured by signage. This first image is used to assess the interactions between the various pieces of content displayed by the signage and multiple objects within the image. In addition, the method includes calculating the probability distribution of attention for each piece of content based on the content viewing statistics, and determining the broadcast frequency for each piece of content based on their respective probability distributions of attention.

In one embodiment, the process of calculating the probability distribution of content attention for each of the multiple pieces of content involves several steps: acquiring content viewing statistics data for each content during the first broadcast period; calculating the average values and standard deviations of content attention for each content based on these statistics; and then calculating the probability distributions of content attention for each piece of content based on these average values and standard deviations. The probability distributions of content attention for each content correspond to the first broadcast period.

In one embodiment, the process of calculating the probability distribution of content attention for each of the multiple pieces of content includes: acquiring content viewing statistics data for each piece of content; calculating the average values and standard deviations of content attention for each content based on this data; and then calculating the probability distributions of content attention for each piece of content based on these average values and standard deviations. These probability distributions of content attention are associated with the location where the signage is installed.

In one embodiment, the step of determining the broadcast frequency for each of the multiple pieces of content involves determining the broadcast frequency for each content based on the average value of content attention for that particular content.

In one embodiment, the content viewing statistics data may include the number of objects located within the target area captured in the first image, the number of first viewers who focused on the content, the number of second viewers who maintained their focus on the content for at least a minimum standard time period, and the level of attention the content received.

In one embodiment, the number of first viewers is calculated based on the gaze information of each object obtained from the first image. This gaze information includes the yaw angle, pitch angle, and roll angle of each object's face.

In one embodiment, the number of first viewers is determined by assessing whether each object meets a first condition based on at least one of their yaw or pitch angles to ascertain if the object is focusing on the content; the number of first viewers is then calculated based on whether the objects are actively watching the content.

In one embodiment, the first condition stipulates that the yaw angle of each object must fall within a preset first standard angle range and the pitch angle within a preset second standard angle range.

In one embodiment, the preset first and second standard angle ranges are determined based on at least one of the following: the position of the display part of the signage, the size of the display part, or the position of the camera part included in the signage.

In one embodiment, the number of second viewers is calculated based on the gaze information of each object obtained from a sequence of images, including the first image. This number represents the viewers who maintained their focus on the content for a specified reference time period or longer. The gaze information for each object includes the yaw angle, pitch angle, and roll angle of each face.

In one embodiment, the number of second viewers is determined by assessing whether at least one of the yaw or pitch angles of each object meets a second condition designed to judge whether the content is being attentively watched. The number of second viewers is then calculated based on whether the objects are determined to be attentively watching the content.

In one embodiment, the second condition stipulates that the yaw angle of each object must fall within a preset third standard angle range, and the pitch angle must fall within a preset fourth standard angle range.

In one embodiment, the number of first viewers is determined by assessing whether each of the multiple objects meets a first condition based on at least one of their yaw or pitch angles to assess if they are watching the content. After this assessment, the number of first viewers is calculated based on whether the objects are indeed watching the content. Similarly, the number of second viewers is determined by checking if each object meets a second condition based on at least one of their yaw or pitch angles to assess if they are attentively watching the content. After this assessment, the number of second viewers is calculated based on whether the objects are attentively watching the content. The first condition stipulates that the yaw angle of each object must be within a preset first standard angle range and the pitch angle within a preset second standard angle range. The second condition requires that the yaw angle of each object must be within a preset third standard angle range, which is narrower than the first standard angle range, and the pitch angle within a preset fourth standard angle range, which is narrower than the second standard angle range.

In one embodiment, the number of second viewers is calculated by recording both the attentive time spent watching the content and the non-attentive time not watching the content for each of the multiple objects in their respective queues. This process involves applying both a first and a second time window to each queue to obtain the total attentive time within the first time window and the total attentive time within the second time window. An object is included in the count of second viewers if at least one of these total attentive times exceeds a specified reference time period. Both time windows are of the same size and may partially overlap.

In one embodiment, content attention is calculated as the number of second viewers divided by the total number of objects.

In one embodiment, content attention is calculated as the number of second viewers divided by the number of first viewers.

In one embodiment, content attention is calculated as the number of first viewers divided by the total number of objects.

In one embodiment, the content viewing statistics data may include at least one of the following: gender ratio, age group, primary attire, or main group of the multiple objects. The step of determining the broadcast frequency for each piece of content involves using the probability distribution of content attention, along with the gender ratio, age group, primary attire, or main group of the objects, to decide the broadcast frequency for each piece of content.

According to one aspect of this disclosure, a computing device for determining the broadcast frequency of outdoor advertising content (contents) is provided. The computing device includes at least one processor and a memory. The at least one processor is configured to acquire content viewing statistics data for each of the multiple contents based on a first image captured by signage. This first image is used to assess the interactions between each of the multiple contents displayed by the signage and the multiple objects within the image. Based on the content viewing statistics data for each content, the processor calculates the probability distribution of content attention for each content and determines the broadcast frequency for each content based on its respective probability distribution of attention.

According to one aspect of this disclosure, a computer program stored on a computer-readable storage medium is provided. When executed by one or more processors, this computer program enables the processors to perform operations for determining the broadcast frequency of outdoor advertising content (contents). These operations include acquiring content viewing statistics data for each of the multiple contents based on a first image captured by signage. This first image is used to evaluate the interactions between each of the multiple contents displayed by the signage and the multiple objects within the image. The program also involves calculating the probability distribution of content attention for each content based on the content viewing statistics data and determining the broadcast frequency for each content based on its respective probability distribution of attention.

According to several embodiments of this disclosure, a first user interface can be provided that includes content viewing statistics data generated based on the first image, which is aimed at assessing interactions between people within the image and the content displayed by the signage.

According to several embodiments of this disclosure, it is possible to acquire tracking information for each of the multiple objects located in the target area where content is displayed. This tracking information includes feature vectors corresponding to each object, their respective feature information, and content viewing information.

According to several embodiments of this disclosure, content viewing statistics data can be acquired based on the gaze information of each of multiple objects present in the target area where the content is displayed.

According to several embodiments of this disclosure, the broadcast frequency for each of the multiple contents can be determined based on the probability distribution of content attention for each content.

According to several embodiments of this disclosure, it is possible to acquire first content viewing statistics data for the first content displayed by the first signage and second content viewing statistics data for the second content displayed by the second signage, using merged tracking information.

The effects achieved by this disclosure are not limited to those mentioned above. Additional effects, not explicitly mentioned, may also be clearly understood by those skilled in the relevant field, based on the descriptions provided below.

BRIEF DESCRIPTION OF THE DRAWINGS

Various aspects are now described with reference to the drawings, where similar reference numbers denote substantially similar components. In the explanations below, numerous specific details are provided to offer a comprehensive understanding of one or more aspects. However, it will be clear that these aspects can be implemented without these specific details. In some instances, well-known structures and devices are depicted in block diagram form to aid in the description of one or more aspects.

DETAILED DESCRIPTION

Figure 1:
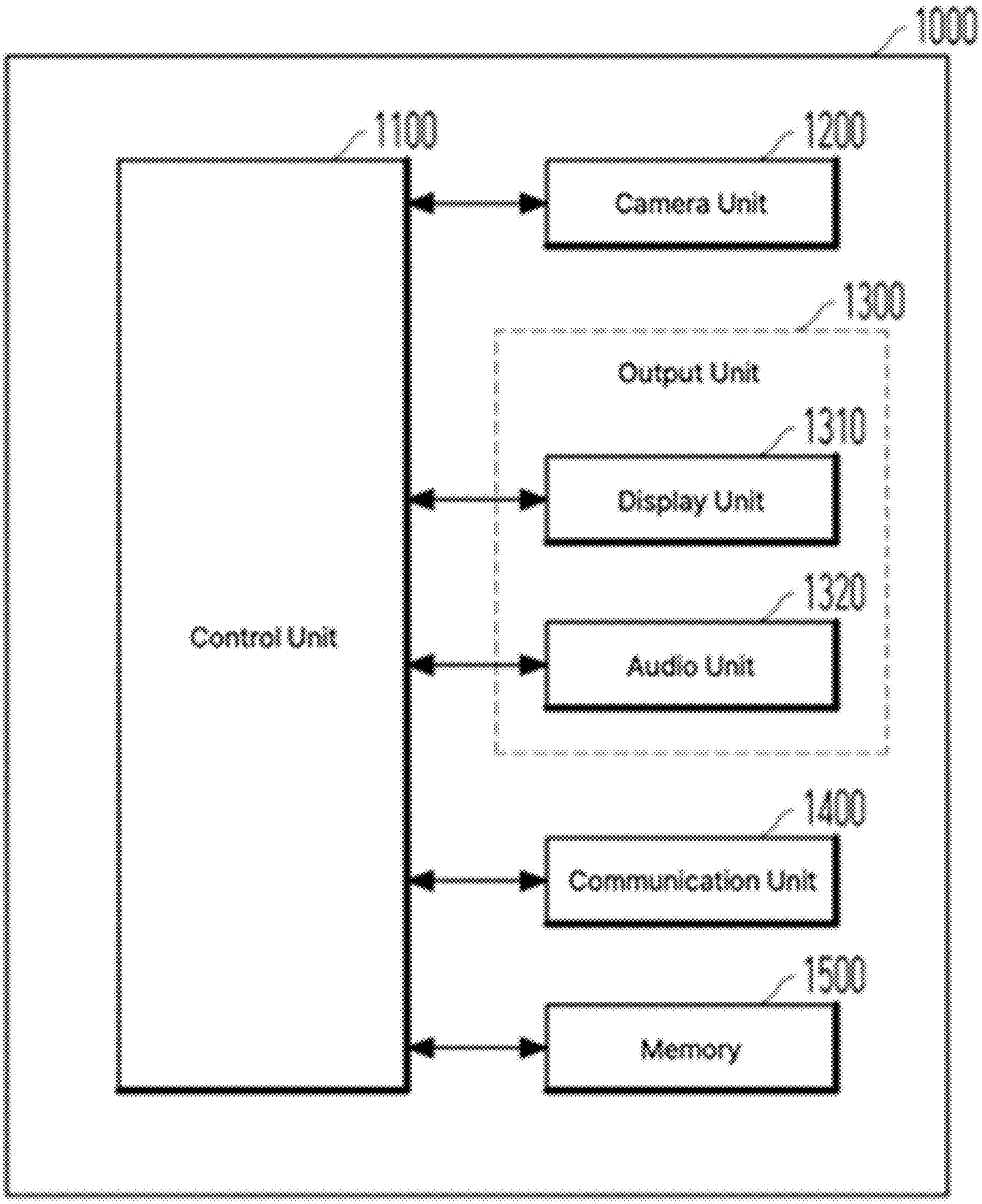
FIG. 1 is a block diagram of signage according to an embodiment of this disclosure, designed for broadcasting content for outdoor advertising.

Various embodiments are now described with reference to the drawings. In this specification, numerous details are provided to facilitate an understanding of the disclosure. However, it is evident that these embodiments can be implemented without these specific details.

Terms such as "component," "module," "system," etc., used in this specification, refer to computer-related entities, including hardware, firmware, a combination of software and hardware, or software that is executing. For instance, a component could be a process running on a processor, a processor itself, an object, an execution thread, a program, or a computer. An application running on signage, as well as the signage itself, can both be considered components. One or more components can reside within a processor and/or execution threads. A component can be localized within one computer or distributed among two or more computers. In addition, these components can execute from various computer-readable media containing diverse data structures. Components can communicate through local and/or remote processes via any data or signals, including data packets, with a component from another system, within a local system, a distributed system, or across networks such as the internet.

Furthermore, the term "or" is intended to mean an inclusive "or" rather than an exclusive "or." That is, unless specified otherwise or clear from the context, the phrase "X uses A or B" implies any natural inclusive disjunction. Thus, X may use A; X may use B; or X may use both A and B, making "X uses A or B" applicable to any of these scenarios. In addition, the term "and/or" as used in this specification is meant to encompass any and all possible combinations of one or more of the listed items.

In addition, the terms "comprises" and/or "comprising" should be understood to indicate the presence of the stated features and/or components. These terms do not exclude the presence or addition of one or more other features, components, and/or groups thereof. Furthermore, unless specified otherwise or it is clear from the context that only the singular is intended, the singular forms used in this specification and claims should generally be interpreted as meaning "one or more."

The phrase "at least one of A or B" should be interpreted to include any of the following possibilities: only A, only B, or a combination of both A and B.

Persons skilled in the art should recognize that the various exemplary logical blocks, configurations, modules, circuits, tools, logic, and algorithmic steps described in connection with the embodiments disclosed herein may be implemented as electronic hardware, computer software, or combinations of both. To clearly illustrate the interchangeability of hardware and software, various exemplary components, blocks, configurations, tools, logic, modules, circuits, and steps have been generally described in terms of their functionality. Whether such functionality is implemented as hardware or software depends upon the specific application and design constraints imposed on the overall system. Skilled artisans can implement the described functionality in various ways for each particular application, but such implementation decisions should not be interpreted as deviating from the scope of the present disclosure.

The descriptions of the presented embodiments are provided to enable those of ordinary skill in the technical field of this disclosure to use or implement the invention. Various modifications to these embodiments will be apparent to those skilled in the field. The general principles outlined here may be applied to other embodiments without departing from the scope of this disclosure. Accordingly, this invention is not intended to be limited to the embodiments described herein. Instead, it should be interpreted within the broadest scope consistent with the principles and novel features disclosed.

In this disclosure, the terms "network functions," "artificial neural networks," and "neural networks" may be used interchangeably.

In this disclosure, the phrases "an object observing Signage (1000)," "watching a display part," and "viewing content output from Signage (1000)" are used interchangeably. In addition, "content output from Signage (1000)" and "content displayed on the display part" refer to the same content.

FIG. 1 is a block diagram of Signage (1000) according to an embodiment of this disclosure, illustrating a device designed to broadcast content for outdoor advertising.

The configuration of Signage (1000) shown in FIG. 1 is a simplified example. In an embodiment of this disclosure, Signage (1000) may include other configurations to broadcast content for outdoor advertising, and only some of the disclosed configurations may constitute Signage (1000).

In the context of this disclosure, "signage" refers to an electronic billboard designed to provide visual or auditory information. This signage represents a media device configured to output specific information to an unspecified number of users and is typically installed at specific indoor or outdoor locations.

Signage (1000) may include a Control Unit (1100), Camera Unit (1200), Output Unit (1300), Communication Unit (1400), and Memory (1500). In this disclosure, Signage (1000) refers to an advertising device intended to broadcast content for outdoor advertising.

The Control Unit (1100) is responsible for managing the overall operations performed by Signage (1000). For example, the Control Unit (1100) can control the processes required for Signage (1000) to acquire content viewing statistics data based on the gaze information of multiple objects. The Control Unit (1100) may consist of one or more cores and can include processors such as a central processing unit (CPU), a general-purpose graphics processing unit (GPGPU), or a tensor processing unit (TPU) designed for managing the operations of Signage (1000) and performing deep learning tasks.

In one embodiment, the Control Unit (1100) can read a computer program stored in Memory (1500) to perform data processing for machine learning in accordance with this disclosure. According to an embodiment, the Control Unit (1100) can execute computations required for training a neural network model. These computations include processing input data for training in deep learning (DL), extracting features from the input data, calculating errors, and updating the weights of the neural network model using backpropagation. At least one of the CPU, GPGPU, or TPU in the processor (1100) can handle the training of the neural network model. For instance, the CPU and GPGPU may work together to process the training of the neural network model and classify data using the model. In addition, in one embodiment, the processors of multiple computing devices may collaboratively train the neural network model and classify data using the model. Furthermore, the computer program executed by Signage (1000), according to one embodiment of this disclosure, may be designed to run on a CPU, GPGPU, or TPU.

In one embodiment, the Control Unit (1100) can control the Display Unit (1310) to output content. In addition, the Control Unit (1100) can control the Audio Unit (1320) to output audio associated with the content displayed by the Display Unit (1310). Furthermore, the Control Unit (1100) can manage the Camera Unit (1200) to capture a first image that includes the target area where the content displayed by the Display Unit (1310) is visible. In this disclosure, the term "target area" refers to the area that Signage (1000) monitors to acquire content viewing statistics data. For example, if Signage (1000) is installed outdoors, the target area may represent the region visible to pedestrians where the Display Unit (1000) is in view. The Control Unit (1100) can also control the Communication Unit (1400) to facilitate communication with an external server or device. For instance, the Control Unit (1100) can manage the Communication Unit (1400) to transmit content viewing statistics data related to the content displayed on the Display Unit (1310) to an external server. In addition, the Control Unit (1100) can store images captured by the Camera Unit (1200) in Memory (1500). It can also save content viewing statistics data related to the content displayed by the Display Unit (1310) in Memory (1500).

In one embodiment, the Control Unit (1100) can acquire gaze information for each of the multiple objects from the obtained first image. For example, gaze information may include the yaw angle, pitch angle, and roll angle of the face. In other words, gaze information can encompass the head vector information of the object. In this disclosure, the head vector information of an object refers to the object's position information and the three-dimensional direction in which the object's gaze is oriented. The three-dimensional direction of an object's face is used interchangeably with the three-dimensional direction of the object's head. In this disclosure, the roll angle of the face is defined relative to an axis parallel to the imaging axis of the camera when the yaw, pitch, and roll angles of the face are all aligned at their central angles of 0 degrees. This central axis for the roll is referred to as the z-axis. The pitch angle of the face is defined as being perpendicular to the central axis of the roll and parallel to the ground, with its central axis referred to as the x-axis. The yaw angle of the face is defined as being perpendicular to the central axis of the roll and aligned with a vertical axis that is perpendicular to the ground, with its central axis referred to as the y-axis.

In one embodiment, the Control Unit (1100) can acquire content viewing statistics data related to the displayed content based on the gaze information of each object. In this disclosure, content viewing statistics data refers to statistical data provided to the content provider (e.g., an advertiser) and may include various statistics related to the viewing of the content. For example, the content viewing statistics data may include the number of objects within the target area in the first image, the number of first viewers who watched the content, and the number of second viewers who watched the content for a duration exceeding a reference time period. In this disclosure, the reference time period refers to the amount of time used to determine whether a viewer has sufficiently focused on the content. For example, the reference time period may be set to 1 second.

In one embodiment, the reference time period may be determined based on the location where Signage (1000) is installed. For instance, if Signage (1000) is installed in a crowded area with high pedestrian traffic, objects may need to focus on the content displayed by Signage (1000) for a relatively longer duration to sufficiently engage with it. In this case, Signage (1000) can set the reference time period to be relatively long. Conversely, if Signage (1000) is installed in a quiet area with low pedestrian traffic, objects may be able to engage with the content even if they watch it for a relatively short duration. In such a scenario, Signage (1000) can set the reference time period to be relatively short. As described above, in one embodiment of this disclosure, Signage (1000) can adjust the reference time period variably based on the pedestrian traffic information of its installation location.

In one embodiment, the reference time period may also be determined based on the type of content displayed by Signage (1000). For example, if scenes within the content change relatively quickly, Signage (1000) can set the reference time period to be relatively short. On the other hand, if scenes within the content change relatively slowly, Signage (1000) can set the reference time period to be relatively long. Determining the rate of scene changes within the content can involve calculating the rate of change between multiple images or frames that make up the content. The rate of change between images can be calculated by determining the difference in pixel values between the first image and the second image. As described above, in one embodiment of this disclosure, Signage (1000) can adjust the reference time period variably based on the dynamic level of the content being displayed.

In one embodiment, the Control Unit (1100) can control the Communication Unit (1400) to transmit the acquired content viewing statistics data to an external server.

The Camera Unit (1200) refers to any type of equipment designed to detect optical images and convert them into electrical signals, which are then transmitted to Signage (1000). For example, the Camera Unit (1200) may include at least one of a camera, scanner, LiDAR, and/or vision sensor. Signage (1000) may either include the Camera Unit (1200) or connect wirelessly or via a wired connection to an external Camera Unit (1200). The Camera Unit (1200) can capture images that include the target area where the content displayed by the Display Unit (1310) is visible.

In one embodiment, the Camera Unit (1200) may include an AI (Artificial Intelligence) camera. In this disclosure, an AI camera refers to a camera equipped with an artificial intelligence-based model. The AI camera may take the form of a single chip (System on Chip, SoC) and include memory, a processor, and an imaging module. The memory in the AI camera can store a pre-trained image processing model. In one embodiment, the pre-trained image processing model refers to an AI-based model trained to extract feature maps from images.

In one embodiment, the AI camera can use the pre-trained image processing model to extract a first feature map corresponding to the first image. From the first feature map extracted by the AI camera, Signage (1000) can obtain at least one of the following: feature vectors, bounding boxes, multiple facial landmarks, or multiple body keypoints corresponding to each of the multiple objects in the first image. For example, Signage (1000) may obtain bounding boxes for each of the multiple objects in the first image from the extracted first feature map. In another example, Signage (1000) may obtain both bounding boxes and multiple facial landmarks corresponding to each of the multiple objects in the first image from the extracted first feature map.

In one embodiment, the pre-trained image processing model corresponds to an artificial intelligence-based model that has been trained to extract feature vectors for each of the multiple objects included in an image. Signage (1000) can obtain at least one of the following from the feature vectors extracted by the AI camera: bounding boxes, multiple facial landmarks, or multiple body keypoints corresponding to each of the multiple objects in the image.

In one embodiment, the processor included in the AI camera can consist of one or more cores and may include processors for image processing and deep learning, such as a central processing unit (CPU), a general-purpose graphics processing unit (GPGPU), or a tensor processing unit (TPU). The processor in the AI camera processes images captured or scanned by the imaging module using the pre-trained image processing model. For example, the processor can use the pre-trained image processing model to extract a feature map corresponding to the image. Alternatively, the processor can use the pre-trained image processing model to extract feature vectors for each of the multiple objects in the image. The AI camera can then transmit the extracted feature map (or the feature vectors for each of the multiple objects) to the Control Unit (1100) of Signage (1000). Signage (1000) can acquire the feature map (or the feature vectors for each of the multiple objects) without storing any images that contain personal information in Memory (1500). This protects the personal information of the objects in the image while still allowing Signage (1000) to obtain information about the multiple objects.

The Output Unit (1300) is responsible for generating outputs related to vision, hearing, or touch, and can perform operations related to the output of content provided by Signage (1000). The Output Unit (1300) may include the Display Unit (1310) and the Audio Unit (1320).

The Display Unit (1310) is capable of outputting content that is received from the Communication Unit (1400) or stored in the Memory (1500). The Display Unit (1310) may include at least one of the following display types: Liquid Crystal Display (LCD), Thin Film Transistor-Liquid Crystal Display (TFT-LCD), Organic Light-Emitting Diode (OLED), flexible display, or 3D display. In one embodiment, the Display Unit (1310) may feature a transparent or light-transmissive display that allows external viewing, often referred to as a transparent display, with Transparent OLED (TOLED) being a prominent example.

In one embodiment, the Display Unit (1310) includes a light-transmissive touchpad layered over the display, forming a touchscreen. The touchpad is designed to convert physical interactions, such as pressure applied to specific areas of the Display Unit (1310) or changes in capacitance at these areas, into electrical input signals. It can detect not only the location and area of the touch but also the pressure exerted during the touch. When there is touch input on the touchpad, the corresponding signals are sent to a touch controller. This controller processes the signals and then transmits the corresponding data to the Control Unit (1100), which allows it to identify the touched area on the Display Unit (1310).

The Audio Output Unit (1320) can output audio data related to content received from the Communication Unit (1400) or stored in the Memory (1500) for output by the Signage (1000). In addition, the Audio Output Unit (1320) is capable of outputting audio signals associated with functions performed by the Signage (1000), such as guidance tones and touch sounds. The Audio Output Unit (1320) may include components like receivers, speakers, and buzzers.

The Communication Unit (1400) can receive content to be outputted by the Output Unit (1300) from an external server. In addition, it can transmit content viewing statistics data, acquired by the Control Unit (1100), to an external server. In one embodiment, the Communication Unit (1400) is also capable of transmitting feature vectors corresponding to each of the multiple objects extracted by the Control Unit (1100) to an external server.

In one embodiment, the Communication Unit (1400) can utilize any type of wired or wireless communication system.

In one embodiment, the Communication Unit (1400) can be configured to operate using any communication mode, including both wired and wireless, and can be integrated into various communication networks such as Personal Area Networks (PAN) and Wide Area Networks (WAN). In addition, the network may include the well-known World Wide Web (WWW), and may use wireless transmission technologies suitable for short-range communication, such as Infrared Data Association (IrDA) or Bluetooth. The technologies described herein can also be applied in other networks mentioned above.

The Memory (1500) can store any type of information generated or determined by the Control Unit (1100), as well as any type of information received by the Communication Unit (1400).

In one embodiment, the Memory (1500) can include at least one type of storage medium such as flash memory, hard disk, multimedia card micro type, card-type memory (e.g., SD or XD memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disks, or optical disks. The Signage (1000) may also operate in conjunction with web storage on the internet, which performs the storage function of the Memory (1500). The descriptions of the memory types provided are illustrative, and this disclosure is not limited to these types.

In one embodiment, Memory (1500) is capable of storing pre-trained artificial intelligence-based models. For example, it can store at least one of the following: a pre-trained object detection model, a pre-trained feature extraction model, a pre-trained object tracking model, a pre-trained facial landmark extraction model, or a pre-trained pose estimation model. In addition, Memory (1500) can store images captured by the Camera Unit (1200) and multiple pieces of content received from external servers via the Communication Unit (1400). It is also equipped to store content viewing statistics data acquired by the Control Unit (1100).

In one embodiment, Memory (1500) includes a tracking database (Database, DB). This database stores tracking information for each of the multiple objects derived from images captured by the Camera Unit (1200). Moreover, the tracking database may include a vector database that stores feature vectors for each of the multiple objects. Memory (1500) is configured to store this tracking information for each object in the tracking database.

Figure 2:
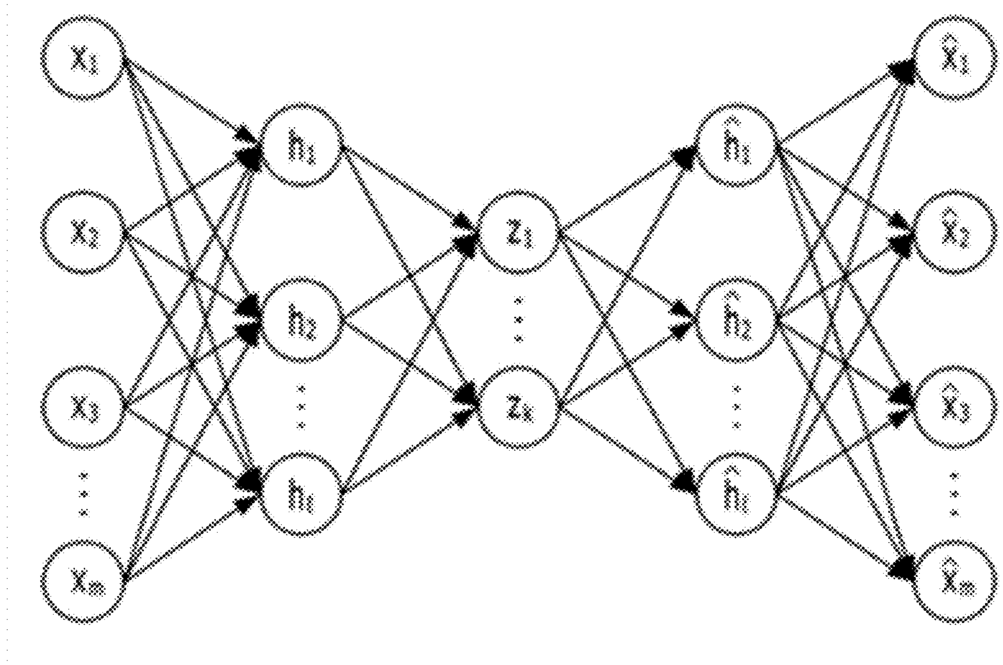
FIG. 2 is a schematic diagram representing network functions according to an embodiment of this disclosure.

FIG. 2 is a schematic diagram illustrating network functions according to one embodiment of this disclosure.

Throughout this specification, terms such as artificial intelligence models, AI-based models, computational models, neural networks, network functions, and neural networks are used interchangeably. A neural network typically consists of a collection of interconnected computational units, commonly referred to as nodes. These nodes may also be known as neurons. Each neural network comprises at least one or more nodes. The nodes (or neurons) within neural networks can be interconnected by one or more links.

Within a neural network, one or more nodes connected through links can establish relationships as either input or output nodes relative to each other. The designation of input and output nodes is relative; any node acting as an output node in relation to one node can act as an input node in relation to another, and vice versa. The relationship between input and output nodes can be formed around a link. One input node can connect to one or more output nodes through links, and this arrangement can be reversed.

In relationships between input and output nodes connected by a single link, the data for the output nodes is determined based on the data entered into the input nodes. The link connecting the input and output nodes may carry a weight. These weights can be variable and are adjustable by a user or an algorithm to enable the neural network to perform its desired functions. For example, if an output node is interconnected with one or more input nodes through respective links, the output node can determine its value based on the values entered into the connected input nodes and the weights assigned to the links corresponding to each input node.

As mentioned earlier, a neural network consists of one or more nodes interconnected by one or more links, forming networks of input and output node relationships. The characteristics of the neural network are defined by the number and configuration of nodes and links within the network, as well as by the values of the weights assigned to each link. For instance, if two neural networks have the same number of nodes and links but different weights on the links, these two networks would be recognized as distinct from each other.

A neural network can be composed of a collection of one or more nodes, where a subset of these nodes may form a layer. Some nodes within the neural network may constitute a layer based on their distances from the initial input node. For example, a group of nodes that are n links away from the initial input node might form the nth layer. This distance is determined by the minimum number of links that must be traversed to reach a given node. However, this definition of layers is used for explanatory purposes, and the actual organization of layers within the neural network can vary. For example, layers might also be organized based on their proximity to the final output node.

The term "initial input node(s)" refers to one or more nodes within the neural network where data enters directly without passing through any preceding links relative to other nodes. In the context of neural networks, this term could also denote nodes that do not receive input from other linked nodes due to their link relationships. Conversely, "final output node(s)" refers to one or more nodes within the neural network that do not pass output to any subsequent nodes. In addition, "hidden nodes" are those within the neural network that are neither initial input nodes nor final output nodes.

According to one embodiment of this disclosure, the neural network may have an equal number of nodes in the input layer as in the output layer. It could be a type of neural network where the number of nodes decreases from the input layer to the hidden layer and then increases again. In addition, in another embodiment, the neural network could have fewer nodes in the input layer than in the output layer, featuring a configuration where the number of nodes decreases from the input layer to the hidden layer. Furthermore, in yet another embodiment, the neural network could have more nodes in the input layer than in the output layer, with a configuration where the number of nodes increases from the input layer to the hidden layer. Another embodiment could involve a neural network that combines features of the networks mentioned above.

A Deep Neural Network (DNN), or deep neural network, refers to a neural network that includes multiple hidden layers in addition to the input and output layers. Using deep neural networks can help uncover the latent structures in data. This means they can identify the underlying structures of various forms of data such as photos, text, videos, voices, and music. For example, they can detect objects in photos, analyze the content and emotions in text, and decipher the content and emotions in voices. Deep neural networks may include technologies such as Convolutional Neural Networks (CNN), Recurrent Neural Networks (RNN), autoencoders, Generative Adversarial Networks (GAN), Restricted Boltzmann Machines (RBM), Deep Belief Networks (DBN), Q-networks, U-networks, Siamese networks, and other Generative Adversarial Networks (GAN). The descriptions of deep neural networks provided here are illustrative, and this disclosure is not limited to these examples.

In one embodiment of this disclosure, the network function may include an autoencoder. An autoencoder is a type of artificial neural network designed to output data similar to its input data. It can include at least one hidden layer, and an odd number of hidden layers may be positioned between the input and output layers. The number of nodes in each layer may decrease from the input layer to a bottleneck layer (encoding) and then expand symmetrically from the bottleneck layer to the output layer, which mirrors the input layer. Autoencoders are capable of performing nonlinear dimensionality reduction. The number of nodes in the input and output layers may correspond to the dimensions after preprocessing the input data. In the autoencoder structure, the number of nodes in the hidden layers within the encoder decreases as they move away from the input layer. The number of nodes in the bottleneck layer—the layer with the fewest nodes located between the encoder and decoder—should be sufficient to transmit adequate information, and thus may be maintained above a certain threshold (for example, more than half the number of nodes in the input layer).

Neural networks can be trained using at least one of the following methods: supervised learning, unsupervised learning, semi-supervised learning, or reinforcement learning. The process of training a neural network involves applying knowledge to enable the neural network to perform specific actions.

Neural networks can be trained to minimize the error in their outputs. During the training process, training data is repeatedly input into the neural network, the error between the neural network's output and the target is calculated, and this error is backpropagated from the output layer to the input layer to update the weights of each node within the network. In supervised learning, each piece of training data is labeled with the correct answer (i.e., labeled training data), while in unsupervised learning, the training data may not be labeled. For instance, in supervised learning focused on data classification, the training data consists of items, each labeled with a category. This labeled training data is input into the neural network, and errors are calculated by comparing the neural network's output (categories) with the training data's labels. Conversely, in unsupervised learning for data classification, errors can be calculated by comparing the neural network's output with the input training data. The calculated errors are then backpropagated within the neural network in the reverse direction (i.e., from the output layer towards the input layer), and the connection weights of each node in each layer are updated accordingly. The changes in each node's connection weights during updates are determined by the learning rate. The process of the neural network operating on the input data and the error backpropagation constitutes a training cycle (epoch). The learning rate can vary based on the number of repetitions in the neural network's training cycles. For example, a higher learning rate may be used at the start of training to quickly achieve a certain level of performance and enhance efficiency, while a lower learning rate may be used later to increase accuracy.

In neural network training, training data typically constitutes a subset of the actual data (i.e., the data that the trained neural network will process). As a result, there may be training cycles where errors decrease for the training data but increase for the actual data. This phenomenon, known as overfitting, occurs when a model is excessively trained on the training data, leading to increased errors when processing actual data. For example, a neural network trained only with images of yellow cats might fail to recognize cats of other colors, illustrating a case of overfitting. Overfitting can increase errors in machine learning algorithms. To combat overfitting, various optimization techniques can be employed, such as increasing the volume of training data, applying regularization, using dropout (which involves temporarily deactivating some nodes during training), or employing batch normalization layers.

In one embodiment, Signage (1000) can utilize a pre-trained object detection model to detect multiple objects from images that include a target area displayed by the Display Unit (1310). The pre-trained object detection model is an artificial intelligence model that has been trained to determine bounding boxes based on the location and size of multiple objects within an image. A bounding box is a rectangular area drawn around an object to help determine the object's location and size within the image. Alternatively, the pre-trained object detection model may also be trained to determine visible bounding boxes based on the location and size of the visible areas of multiple objects within an image. By focusing solely on the visible areas of objects, the pre-trained object detection model can more accurately extract the feature vectors of the objects.

In one embodiment, the pre-trained object detection model can correspond to an anchor-based artificial intelligence model that detects an object's bounding box using the anchor box method. In this context, an anchor box refers to predetermined candidate bounding boxes designated for each type of object, which can vary in aspect ratios and sizes. For example, for an object identified as a car, the anchor box might be wider than it is tall. Conversely, for an object identified as a person, the anchor box might be taller than it is wide. Examples of such pre-trained object detection models include the YOLO (You Only Look Once) model, the RetinaNet model, and the Faster R-CNN (Region-based CNN).

In one embodiment, the pre-trained object detection model can correspond to an anchor-free artificial intelligence model that detects an object's bounding box. This disclosure describes anchor-free detection as a method that extracts keypoints corresponding to an object and determines a bounding box centered around these keypoints, without the use of predefined anchor boxes. For instance, the pre-trained object detection model could include the CenterNet model. Here, the central point corresponding to an object is used interchangeably with the keypoint identified by the pre-trained object detection model. The method by which Signage (1000) utilizes the pre-trained object detection model to acquire bounding boxes corresponding to multiple objects is further elaborated with reference to FIGS. 10 through 12.

In one embodiment, Signage (1000) can utilize a pre-trained feature extraction model to extract feature vectors from the bounding boxes corresponding to multiple objects. This pre-trained feature extraction model is an artificial intelligence model specifically trained to extract feature vectors from bounding boxes associated with each object. For example, the pre-trained feature extraction model could be trained with a dataset comprising cropped images based on the bounding boxes of multiple objects in an image, where each cropped image is matched with the feature vectors of the corresponding objects.

In one embodiment, the pre-trained feature extraction model can be an artificial intelligence model trained to extract feature vectors from the bounding boxes of multiple objects. These vectors include those related to the position of each object's bounding box and those related to the appearance of each object. In addition, the pre-trained feature extraction model can extract feature vectors from the bounding boxes and facial landmarks of multiple objects, incorporating vectors related to the position of each object's bounding box, vectors related to the appearance of each object, and vectors related to gaze information. Furthermore, this model can also be trained to extract feature vectors from the bounding boxes, facial landmarks, and body keypoints of multiple objects, including vectors related to the position of each object's bounding box, vectors related to the appearance of each object, vectors related to gaze information, and vectors related to pose information.

In one embodiment, Signage (1000) can utilize a pre-trained object tracking model to track multiple objects from images that include a target area displayed by the Display Unit (1310). The pre-trained object tracking model is an artificial intelligence model trained to extract feature vectors from images containing multiple objects, and to associate these extracted feature vectors with the feature vectors of previously tracked identities (IDs). This process enables the model to correlate newly detected objects with existing data on tracked objects.

In one embodiment, the pre-trained first object tracking model is a two-step artificial intelligence model that employs both a pre-trained object detection model and a pre-trained feature extraction model. It is trained to extract feature vectors corresponding to multiple objects from an image and subsequently track these objects. The model uses the pre-trained object detection model to acquire bounding boxes corresponding to each object in the image. It then utilizes the pre-trained feature extraction model to extract feature vectors from cropped images based on these bounding boxes. In addition, based on the extracted feature vectors from the multiple objects, the pre-trained first object tracking model can associate these objects with previously tracked identities.

In one embodiment, the pre-trained second object tracking model is an artificial intelligence model trained in a one-shot manner. It is specifically designed to simultaneously extract bounding boxes and feature vectors corresponding to multiple objects from an image and to track these objects. This model is trained to extract centroids corresponding to each object from an image and then extract both the bounding boxes and feature vectors associated with each centroid. The pre-trained second object tracking model can match the bounding boxes with their corresponding feature vectors for each object and associate them with previously tracked identities.

In one embodiment, Signage (1000) can utilize a pre-trained facial landmark extraction model to acquire gaze information for multiple objects from images that include a target area displayed by the Display Unit (1310). Signage (1000) is capable of extracting multiple facial landmarks corresponding to each object from the acquired first image. In this context, facial landmarks are predetermined points or specific areas on the face used to measure the direction of an object's gaze. Examples of facial landmarks include the left eye, right eye, tip of the nose, left corner of the mouth, right corner of the mouth, and the chin. Using the pre-trained facial landmark extraction model, Signage (1000) extracts these facial landmarks from the first image and, based on these landmarks, acquires gaze information for each object.

The pre-trained facial landmark extraction model can be an artificial intelligence model trained to extract facial landmarks corresponding to each object from images containing multiple objects. This process involves determining the positions of facial features on the image, meaning the model can identify the locations of facial landmarks for each object depicted in the image. This model corresponds to an artificial intelligence model that was trained with a dataset of images where facial landmarks were predefined on the faces within these images.

In one embodiment, the pre-trained facial landmark extraction model is an artificial intelligence model that uses a labeling method categorizing facial landmarks in training images as either visible or at least partially invisible, depending on their visibility in the training images. A more detailed description of the pre-trained facial landmark extraction model, based on this method of labeling visible and invisible landmarks, will be discussed later with reference to FIG. 8.

In one embodiment, Signage (1000) can utilize a pre-trained pose estimation model to estimate the poses corresponding to multiple objects from images that include a target area displayed by the Display Unit (1310). The pre-trained pose estimation model is an artificial intelligence model that was trained to estimate the poses of multiple objects from images containing those objects. It corresponds to an artificial intelligence model that was trained using a dataset of images marked with predefined body keypoints on the objects' bodies. The method by which Signage (1000) uses the pre-trained pose estimation model to acquire multiple body keypoints corresponding to each object from the images will be further discussed with reference to FIGS. 10 and 11.

In one embodiment, Signage (1000) can utilize a pre-trained head vector extraction model to acquire gaze information from multiple objects in images that include a target area displayed by the Display Unit (1310). This pre-trained head vector extraction model is an artificial intelligence model specifically trained to extract head vectors corresponding to multiple objects from images containing these objects.

In one embodiment, the pre-trained first head vector extraction model is an artificial intelligence model that was trained using a 3D training image dataset where head vectors are labeled on the objects' faces. For example, this dataset may have been created using a 3D camera to extract and label head vectors from 3D images. Signage (1000) can use the pre-trained first head vector extraction model to extract head vectors from each object in the acquired first image. Based on these head vectors, Signage (1000) can then acquire gaze information for each object.

In yet another embodiment, the pre-trained second head vector extraction model is an artificial intelligence model that processes facial landmarks from a training image dataset marked with facial landmarks of objects, converting them into head vectors and then training on these vectors. For instance, the facial landmarks of an object can be converted into head vectors using the Perspective-n-Point (PnP) algorithm. Signage (1000) can use the pre-trained second head vector extraction model to extract head vectors from each object in the acquired first image. Based on these head vectors, Signage (1000) can acquire gaze information for each object.

Figure 3:
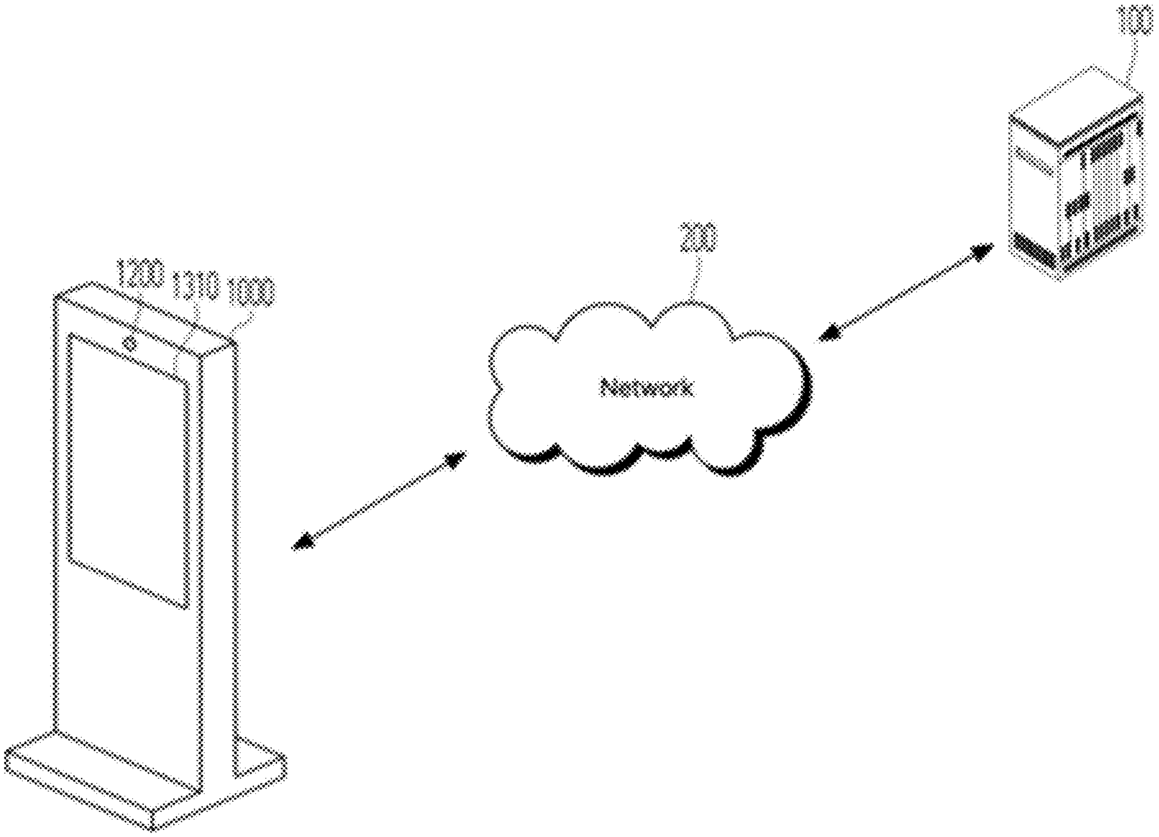
FIG. 3 is a schematic diagram illustrating communications between signage and a server according to an embodiment of this disclosure.

FIG. 3 presents a schematic diagram illustrating the communication between Signage (1000) and Server (100) according to one embodiment of this disclosure.

Signage (1000) can communicate with Server (100) through Network (200). It accesses Network (200) using its communication unit. This network can comprise various communication networks such as a Personal Area Network (PAN) and a Wide Area Network (WAN). In addition, Network (200) may be part of the globally recognized World Wide Web (WWW). Both Signage (1000) and Server (100) can transmit and receive data through this network.

As depicted in FIG. 3, the Display Unit (1310) can be centrally positioned in Signage (1000) according to one embodiment. Depending on Signage (1000)'s installation location, Display Unit (1310) can be positioned at a height that facilitates easy viewing by pedestrians. The Camera Unit (1200) can be installed above the Display Unit (1310) and may also be centrally located on Signage (1000). It is strategically positioned to capture the target area that the content displayed on Display Unit (1310) exposes. For instance, the Camera Unit (1200) could be oriented towards the content output direction of the Display Unit (1310). However, these placements of Camera Unit (1200) and Display Unit (1310) are examples, and they can be variably positioned based on design requirements or visual effects.

In one embodiment, Signage (1000) is capable of transmitting to Server (100) acquired images, the feature vectors corresponding to each of the multiple objects extracted from these images, the facial landmarks corresponding to each object, and at least one pose of these objects. To generate data for transmission, Signage (1000) utilizes pre-trained detection models, pre-trained facial landmark extraction models, and pre-trained pose estimation models.

In one embodiment, Server (100) can process data received from Signage (1000). For instance, based on the feature vectors from Signage (1000), Server (100) can determine the gender, age, attire, and items purchased by each object exposed to the content displayed by Signage (1000). In addition, Server (100) can generate content viewing statistics using the facial landmarks received from Signage (1000). Furthermore, Server (100) can acquire and track behavior information for each object based on the received poses. In this context, behavior information refers to actions determined from the object's pose, which could include purchasing behavior, waving, reaching out for payment, and car washing activities. Note that these data processing tasks are not exclusively performed by Server (100) and could also be conducted by Signage (1000).

Figure 4:
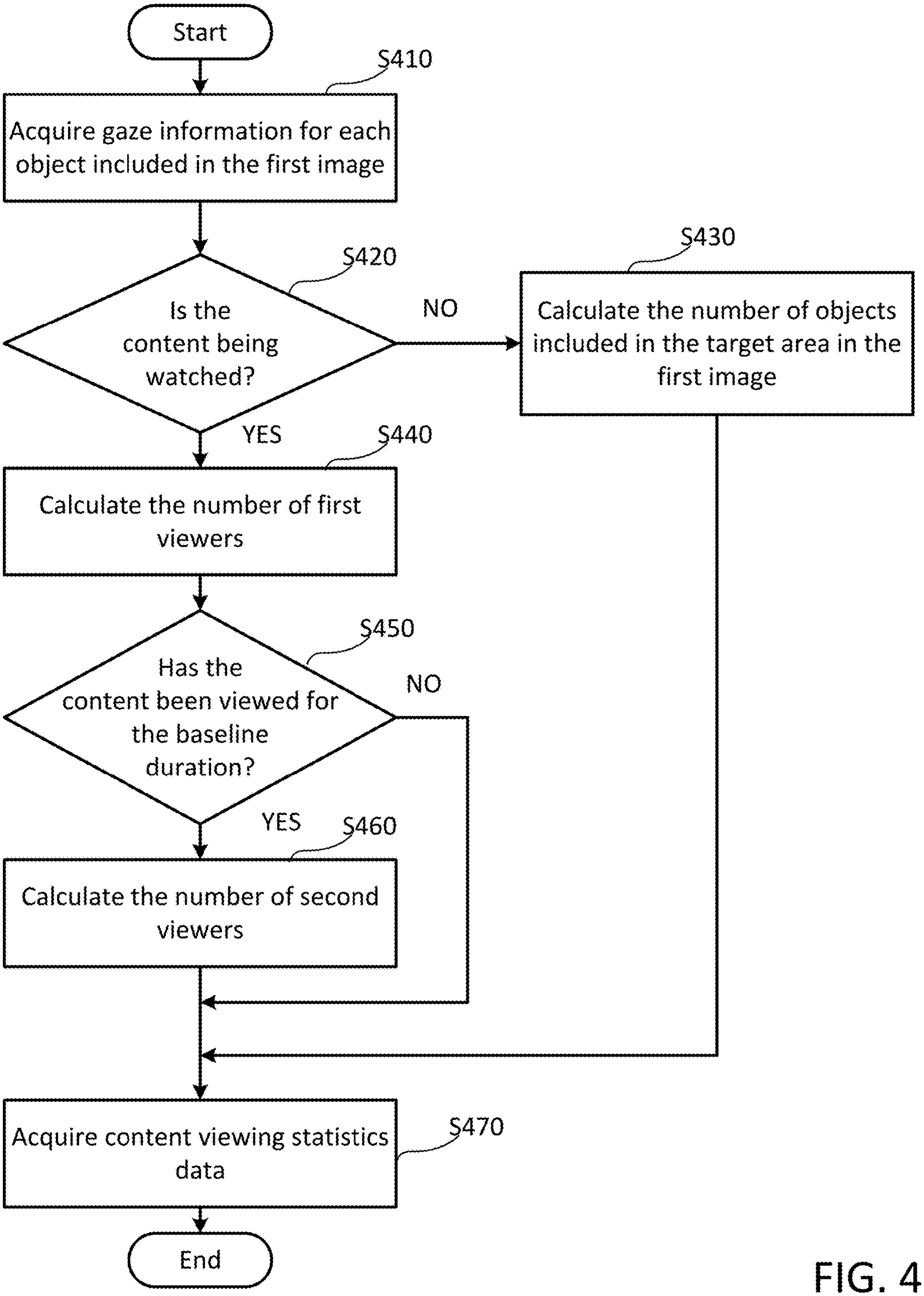
FIG. 4 is a flowchart illustrating the method by which signage acquires content viewing statistics data according to an embodiment of this disclosure.

FIG. 4 is a flowchart illustrating a method for acquiring content viewing statistics data by Signage (1000) according to one embodiment of this disclosure.

In one embodiment, Signage (1000) can acquire a first image that includes a target area displayed by the Display Unit (1310). Signage (1000) may acquire this first image either through its internal Camera Unit or by obtaining it from an external camera via the Communication Unit (1400).

In one embodiment, Signage (1000) can detect multiple objects within the first image. For example, by using a pre-trained object detection model, Signage (1000) is capable of extracting bounding boxes for each object from the first image. In addition, Signage (1000) can track these objects across sequential images that include the first image. By employing a pre-trained object tracking model, it can monitor the movement of multiple objects across these sequential images. Moreover, Signage (1000) can extract feature vectors corresponding to each object from each image in the sequence and track at least one of the following attributes for each object: gender, age, attire, purchased items, and movement paths.

At step S410, according to one embodiment, Signage (1000) can acquire gaze information for each object from the acquired first image. It can also collect gaze information for each object from sequential images that include the first image.

In one embodiment, Signage (1000) is capable of extracting multiple facial landmarks for each object from the acquired first image. By using a pre-trained facial landmark extraction model, Signage (1000) can retrieve these facial landmarks for each object from the first image. In addition, with the same pre-trained model, Signage (1000) can extract multiple facial landmarks for each object from sequential images that include the first image.

In one embodiment, Signage (1000) can acquire the gaze information for multiple objects based on several facial landmarks corresponding to each object. This gaze information may include the yaw, pitch, and roll angles of the face. Utilizing the Perspective-n-Point (PnP) algorithm, Signage (1000) can obtain the gaze information for each object from their corresponding facial landmarks. For instance, by employing the PnP algorithm, Signage (1000) can determine the yaw, pitch, and roll angles of an object's face from the positions of its facial landmarks. From these angles, Signage (1000) is also capable of obtaining head vector information for the objects. The PnP algorithm may include methods such as Efficient Perspective-n-Point (EPnP), Uncalibrated Perspective-n-Point (UPnP), Direct Linear Transform (DLS), or Absolute Pose-n-Point (APnP).

In one embodiment, Signage (1000) can track the gaze information corresponding to each of the multiple objects based on facial landmarks extracted from sequential images that include the first image. For example, Signage (1000) can monitor changes in the gaze of each object across these images. This capability allows Signage (1000) to determine, for each sequential image, whether the objects were focusing on the content displayed by Signage (1000).

In yet another embodiment, Signage (1000) can track the gaze information for each object from the first image using a pre-trained head vector extraction model. For example, Signage (1000) could utilize either a pre-trained first head vector extraction model or a pre-trained second head vector extraction model to extract the head vectors of each object from the first image. Using these extracted head vectors, Signage (1000) can then track the gaze information for each object.

At step S420, Signage (1000) can determine whether multiple objects are observing the content displayed based on each object's gaze information. It assesses whether each object's gaze is directed towards the display unit, thereby determining if the content has been viewed. If it is determined that the objects are not watching the content, the number of objects within the target area in the first image can be calculated (S430). Conversely, if the objects are watching the content, the number of first viewers can be calculated (S440).

At step S430, Signage (1000) can calculate the number of objects included in the target area of the first image. It counts the number of objects exposed to the content within this area. By providing data on the number of objects exposed to the content to the content provider (e.g., an advertiser), Signage (1000) can inform the provider about the exposure level of the content.

At step S440, based on the gaze information obtained from the multiple objects in the first image, Signage (1000)

can calculate the number of first viewers who watched the content. By providing data on the actual number of objects that watched the content to the content provider (e.g., an advertiser), Signage (1000) can inform the provider about the viewership of the content.

In one embodiment, Signage (1000) can determine the attention status of multiple objects towards content by checking if at least one of the yaw or pitch angles of each object satisfies the first condition. Based on this attention status, Signage (1000) can then calculate the number of first viewers. For instance, the first condition might stipulate that each object's yaw angle must fall within a predefined first standard angle range, and the pitch angle within a predefined second standard angle range. Typically, these standard angle ranges could be within 30 degrees of their central axes, with a central angle of 0 degrees.

In one embodiment, the predefined first and second standard angle ranges can be set based on factors such as the location or size of the display unit, or the location of the camera unit. For example, if the display unit is positioned relatively high above the ground, objects might need to tilt their heads up to see the display, which could result in a higher pitch angle. As a result, the central angle for the second standard angle range might increase. For example, the central angle of the second standard angle range could be set to +10 degrees, with the range extending from just over −20 degrees to less than +40 degrees.

For example, the predefined first and second standard angle ranges can be based on the size of the display unit. If the display unit is relatively wide, the horizontal range within which an object can view the display may also be wider. In this case, the first standard angle range for the yaw angle could be extended, potentially up to 40 degrees. Similarly, if the display unit is relatively tall, the vertical range within which an object can view the display may also be wider, potentially allowing for a second standard angle range of up to 40 degrees.

For example, the central angles of the predefined first and second standard angle ranges can be determined based on the position of the camera. If the camera is positioned perpendicular to the ground and aligned with the axis that passes through the center of the display unit, the central angle of the first standard angle range could be 0 degrees. However, if the camera is positioned on the side of the display unit, the central angles of the predefined first and second standard angle ranges could shift to align with the direction from which the display is viewed.

Signage (1000) can determine whether content is being viewed based on the three-dimensional position and direction of the face derived from gaze information, rather than directly detecting the movement of the eyes. This method achieves a technical effect of more accurately determining whether content is viewed, utilizing the head vector information of an object instead of relying on the challenging detection of eye movement.

In one embodiment, Signage (1000) can determine the content viewing status of multiple objects based on their individual movement information. For a detailed explanation of how Signage (1000) determines the viewing status based on the movement information of each object, please refer to FIG. 14.

At step S450, Signage (1000) can determine whether multiple objects have watched the content for a reference time period or longer, based on the gaze information obtained from each object in a series of sequential images, which may correspond to each frame of a video. Signage (1000) can track each object's gaze from the information gathered in each of these sequential images. This gaze information includes a series of gaze data collected from the sequential images. If it is determined that multiple objects have watched the content for at least the reference time period, Signage (1000) can calculate the number of second viewers who have watched the content for the reference time period or longer (S460).

At step S460, Signage (1000) calculates the number of second viewers who have watched the content for at least the reference time period, based on the gaze information of each object obtained from the sequential images that include the first image.

In one embodiment, Signage (1000) can determine the focused attention status of content for each of multiple objects, based on whether at least one of the yaw or pitch angles of the objects satisfies a second condition. Once the content focus status is established, Signage (1000) can then calculate the number of second viewers. For example, the second condition could include each object's yaw angle being within a predefined third reference angle range and each object's pitch angle being within a predefined fourth reference angle range. These ranges could be within 30 degrees around each central axis, with a possible central angle of 0 degrees.

In one embodiment, the predefined third and fourth reference angle ranges can be determined based on at least one of the following: the position of the display unit, the size of the display unit, or the position of the camera unit. As the method for determining these ranges based on the position, size of the display unit, or position of the camera unit is similar to the method used for the first and second reference angle ranges, further explanation is omitted.

In one embodiment, the criteria for determining if content is being watched and if it is being watched intently may differ. For instance, the third reference angle range for the second condition might be narrower than the first reference angle range for the first condition, and the fourth reference angle range might be narrower than the second reference angle range for the first condition. Signage (1000) can determine not just whether content has been watched for a set duration but also based on the angle ranges of facial orientation. Specifically, Signage (1000) can determine whether the content has been watched for the set duration and whether at least one of the yaw or pitch angles of each object meets the second condition, based on each object's gaze information. Signage (1000) can assess whether the content was watched attentively based on whether the content was watched for the set duration and if at least one of the yaw or pitch angles of each object satisfies the second condition. Based on this assessment of attentive viewing, Signage (1000) can determine the number of second viewers.

At step S470, Signage (1000) can obtain content viewing statistics data that includes the number of objects within the target area in the first image, the number of first viewers, and the number of second viewers. Signage (1000) can send this content viewing statistics data to a server using its communication unit. This enables content providers to evaluate the effectiveness of content distribution from various perspectives, thus achieving a technical effect based on the content viewing statistics data.

In one embodiment, the content displayed by Signage (1000) may include both first and second content. The content displayed by Signage (1000) can encompass multiple pieces of content, each potentially provided by different content providers. Signage (1000) can acquire content broadcast information for both the first and second content, including the start time, end time, and broadcast duration for each. The start and end times of the content broadcast can be recorded based on real time. Alternatively, these times may also be recorded based on the frame number of the content displayed by Signage (1000).

Signage (1000) can obtain content viewing statistics data for both the first and second content based on the gaze information of multiple objects and the content broadcast information. For instance, Signage (1000) may broadcast the second content precisely when the first content's broadcast concludes. This means that the end time of the first content's broadcast and the start time of the second content's broadcast can coincide. Signage (1000) can then acquire content viewing statistics data for both the first and second content based on the respective playback durations of each content.

For example, if a first object continues to watch the display while transitioning from the first content to the second content, it is possible to calculate the duration for which the first object watched the first and second contents, respectively. Therefore, even if the total time the first object spent watching both the first and second contents exceeds the reference time period, the first object may not be considered as having concentrated on the first content if the time spent watching it alone is less than the reference time period. In other words, the first object may not be included in the count of viewers who concentrated on the content.

In one embodiment, Signage (1000) can transmit the acquired content viewing statistics data to a server. In addition, the server can also perform operations such as extracting multiple facial landmarks of an object, acquiring gaze information of an object, and acquiring content viewing statistics data, which are performed by Signage (1000). For example, Signage (1000) can send the feature vectors of the acquired first image to the server. Alternatively, Signage (1000) can send the facial landmarks corresponding to each of the extracted multiple objects to the server. Furthermore, Signage (1000) can transmit the gaze information of the acquired multiple objects to the server. The server can then use the information related to the received multiple objects to perform identical operations to those conducted by Signage (1000) and acquire content viewing statistics data.

In one embodiment, after acquiring the content viewing statistics data, Signage (1000) can delete the acquired first image from the memory. This action helps protect the personal information contained in the first image.

Figure 5:
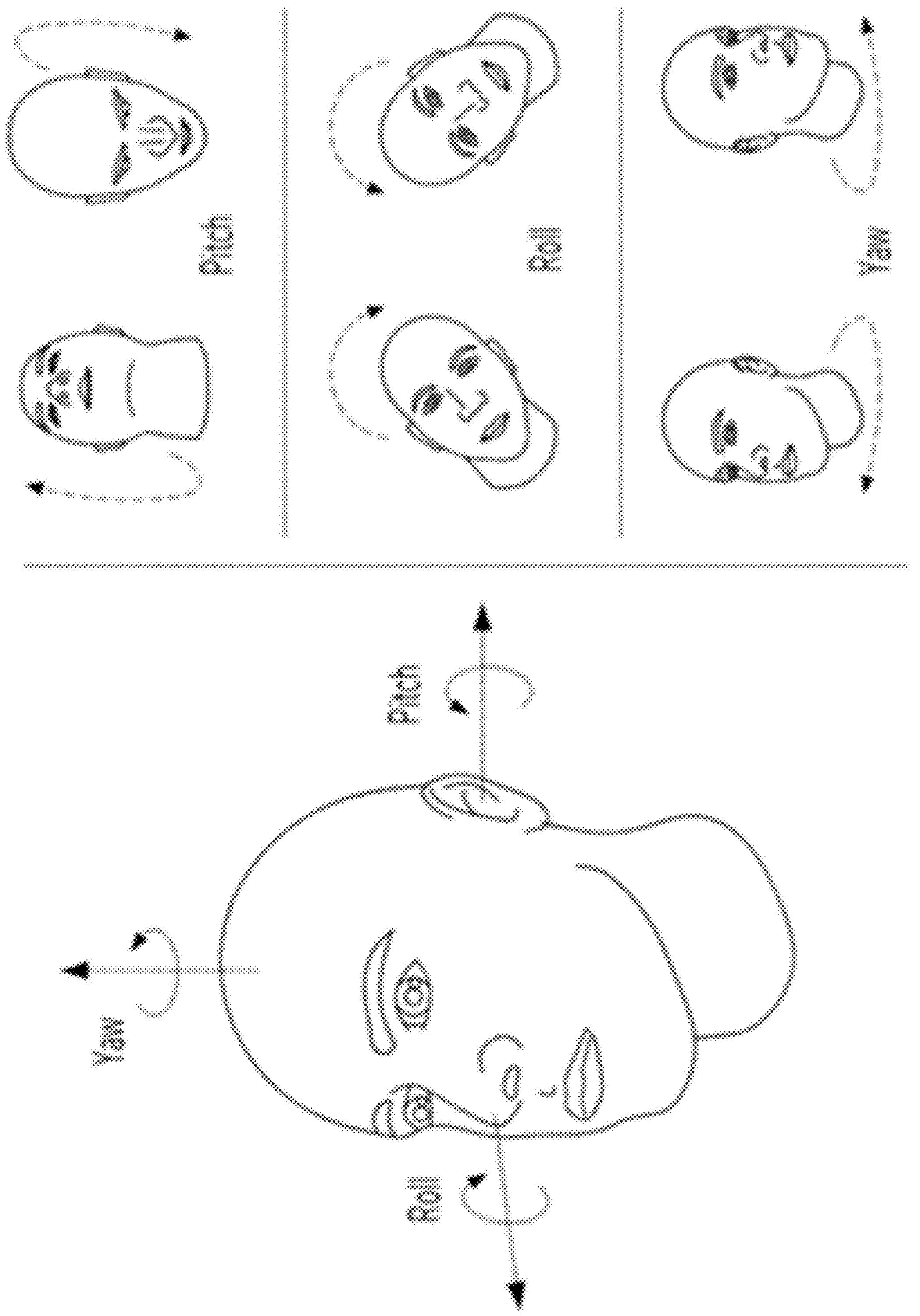
FIG. 5 is a schematic diagram representing facial gaze information according to an embodiment of this disclosure.

FIG. 5 is a schematic diagram illustrating facial gaze information according to one embodiment of the disclosure.

Referring to FIG. 5, the direction of an object's face (or head) can be represented by three axes: yaw, pitch, and roll. The roll angle of the face is centered on the axis that aligns parallel to the axis captured by the camera when the central angles of the face's yaw, pitch, and roll are all aligned at 0 degrees. This central axis for roll is referred to as the z-axis. The pitch angle of the face, perpendicular to the roll's central axis, is centered on the axis that runs parallel to the ground, known as the x-axis. The yaw angle of the face is perpendicular to the roll's central axis and is centered on the axis that runs perpendicular to the ground, designated as the y-axis.

In one embodiment, whether the object's face rotates around the roll axis may not affect its engagement with the display. Even if the roll angle changes, the object can continue watching the display as long as the yaw and pitch angles of the object's face remain within a specified range. Therefore, Signage can use at least one of the yaw or pitch angles as a criterion to determine if the content is being watched. For example, Signage (1000) can determine whether each of the multiple objects is watching the content based on whether at least one of the yaw or pitch angles of each object meets the first condition for assessing content viewership when calculating the number of first viewers. In addition, Signage (1000) can determine the content viewing status of each of the multiple objects based on whether at least one of their yaw or pitch angles meets the second condition for assessing content viewership when calculating the number of second viewers.

Figure 6:
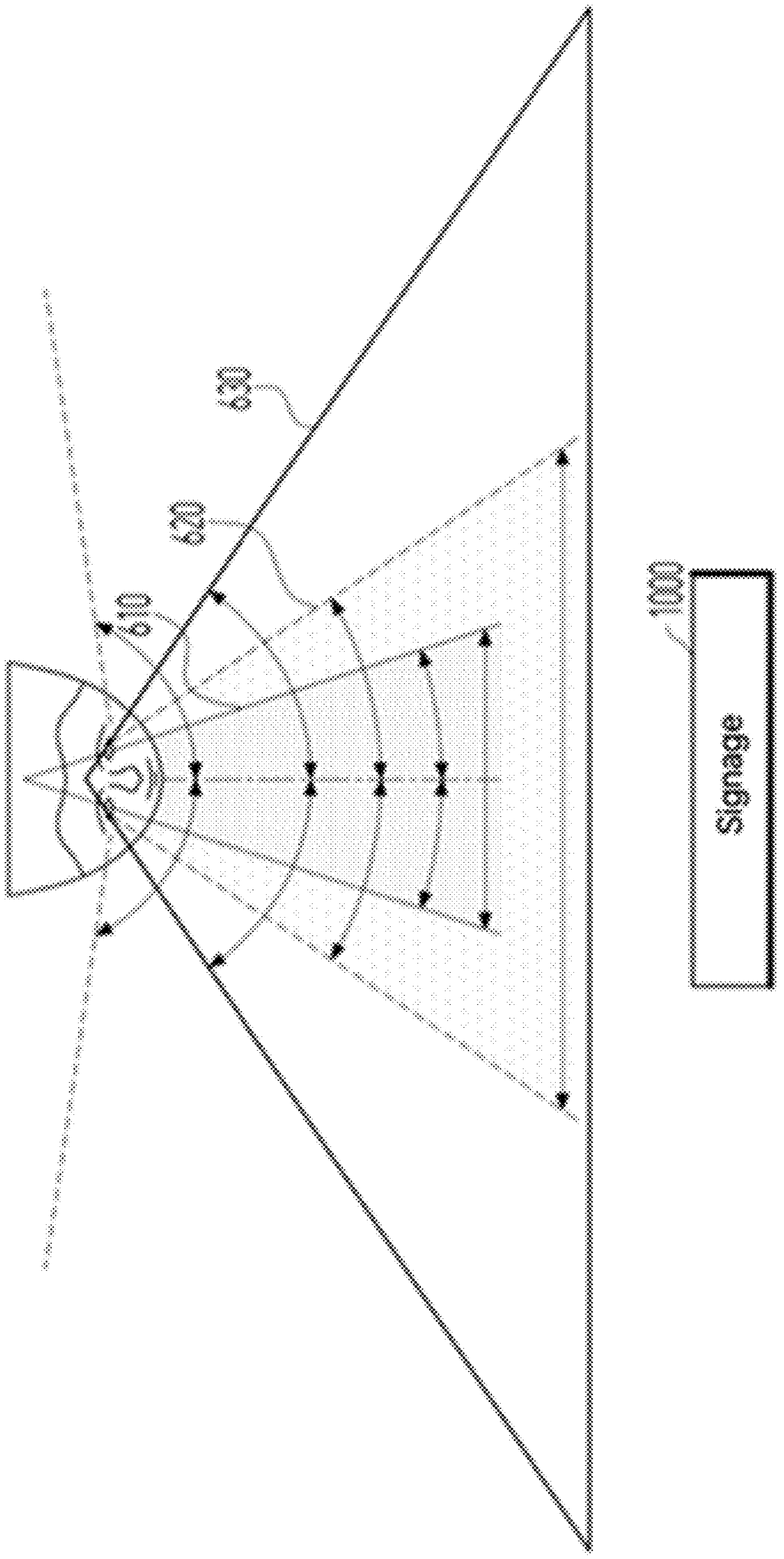
FIG. 6 is a schematic diagram depicting a viewer engaging with signage according to an embodiment of this disclosure.

FIG. 6 is a schematic diagram illustrating a viewer watching Signage according to one embodiment of the disclosure.

When an object's face is fixed, its Visible Range (630)—the area within which it can see—is typically determined. However, even if Signage (1000) falls within the object's Visible Range (630), the object may not actually be watching it. For example, if Signage (1000) is positioned at the boundary of the object's Visible Range (630), the object may not be engaged with Signage (1000).

In one embodiment, Signage (1000) can determine whether an object is watching the content by assessing whether it meets the First Condition (620). If the display part of Signage (1000) falls within a narrower range of the First Condition (620) that lies within the object's Visible Range (630), it can be inferred that the object has watched the content displayed by Signage (1000).

In one embodiment, Signage (1000) can determine whether an object is intently watching the content by checking if it satisfies the Second Condition (610). If the display part of Signage (1000) is located within an even narrower range of the Second Condition (610), more restrictive than the First Condition (620) within the object's range, it can be determined that the object has intently watched the content displayed by Signage (1000).

Figure 7:
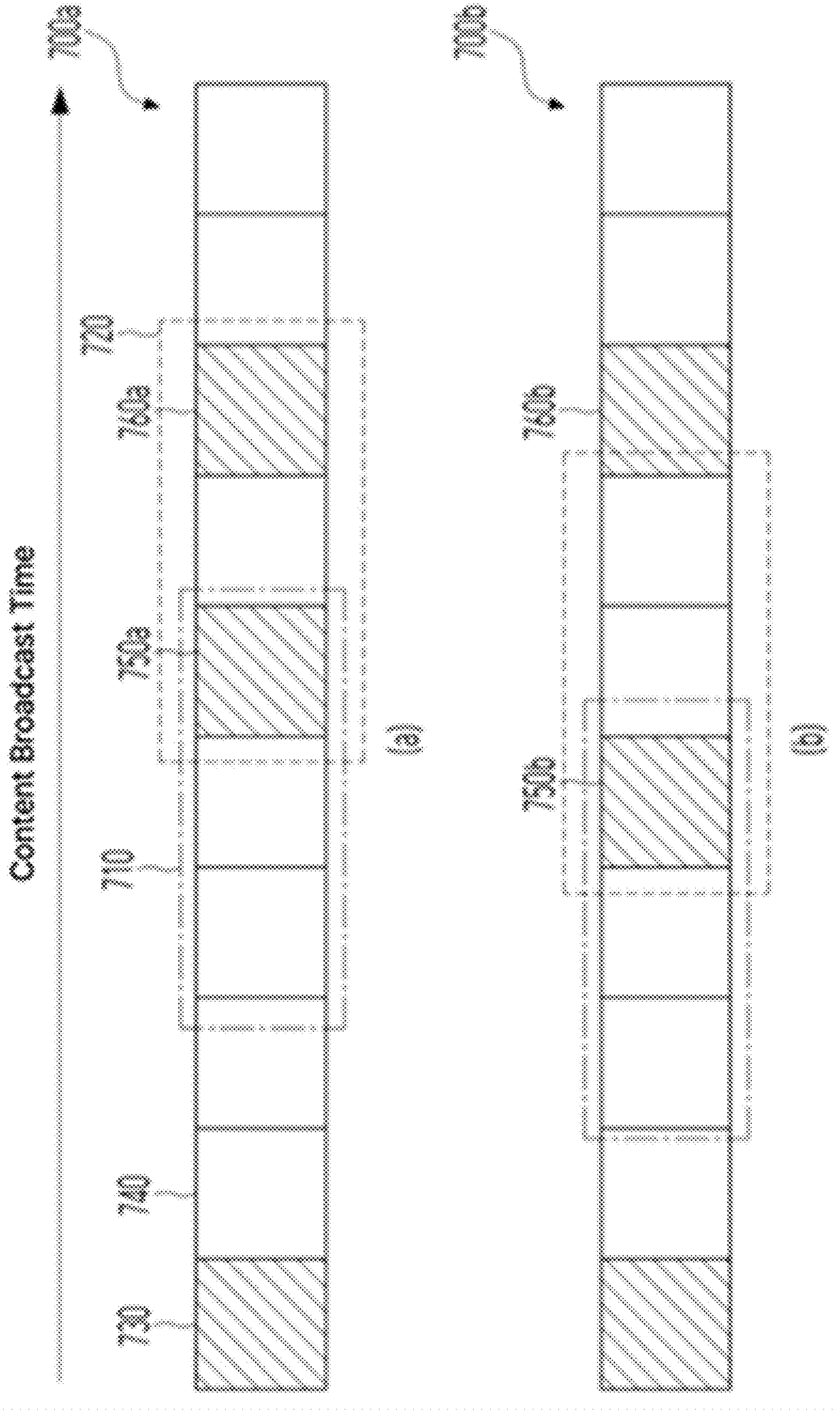
FIG. 7 is a schematic diagram showing a queue that indicates whether objects are paying attention to the content according to an embodiment of this disclosure.

FIG. 7 is a schematic diagram representing a queue that indicates whether individual objects are watching the content, according to one embodiment of the disclosure.

In one embodiment, Signage (1000) can store a queue that records whether each object has watched the content displayed by Signage (1000). The content viewing statistics data may include a queue corresponding to each of the multiple objects. Each queue records whether the object watched the content, and this information is divided into time units. In this disclosure, a "time unit" refers to the minimum duration that an object needs to watch the content; for example, a time unit could be 0.5 seconds. Referring to FIG. 7, a Queue (700*a*) corresponding to the first object and a Queue (700*b*) corresponding to the second object are displayed. These queues (700*a* and 700*b*) each represent a data structure configured to contain multiple time units. As content is broadcast, Signage (1000) can record whether each of the multiple objects watched the content in the corresponding queue for each time unit, based on the gaze information of the multiple objects. For instance, in the Queue (700*a*) corresponding to the first object, the first object may have watched the content during the First Time Unit (730) and may not have watched it during the Second Time Unit (740).

In one embodiment, when calculating the number of second viewers, Signage (1000) assesses whether each of the multiple objects watched the content for a first time period unit that is longer than the reference time period. Signage (1000) can calculate the number of second viewers by summing the durations that content was watched within the first time period unit. Objects for which the total duration of content watched within the first time period unit exceeds the reference time period are included in the count of second viewers. Thus, Signage (1000) includes those objects in the count of second viewers whose combined duration of content watched within the first time period unit exceeds the reference time period.

For example, Signage (1000) can record the durations for which each of the multiple objects watched (viewing time) and did not watch (non-viewing time) the content. These durations are stored in a queue corresponding to each object when calculating the number of second viewers. By applying the First Time Window (710) and the Second Time Window (720) to each queue, Signage (1000) can obtain the total viewing times within these time windows. Both the First Time Window (710) and the Second Time Window (720) are of the same size and may overlap at least partially. If the total viewing time from either the First Time Window (710) or the Second Time Window (720) exceeds the reference time period, the object corresponding to that queue can be included in the count of second viewers. In one embodiment, the reference time period may include both continuous and discontinuous sets of time units.

In this disclosure, a "time window" refers to a data structure with a predetermined duration unit, applied to a queue to determine a viewer's watching duration. This time window can be applied in a sliding manner within the queue. For example, a time window sized to match a predetermined number of time units can slide through the units in the queue. In the example depicted in FIG. 7, the time window could cover three time units. In this scenario, as the time window is applied, it determines the object's watching time over the duration comprising the first, second, and third time units. In the subsequent application, the time window can determine the object's watching time over the period comprising the second, third, and fourth time units.

In one embodiment, the minimum size of the time window can correspond to the reference time period used to determine if content is being intently watched. In one embodiment, the size of the time window can be configured to exceed the reference time period necessary for determining if the content is being intently watched.

In one embodiment, the reference time period may equal the sum of two time units. For example, a time unit could be 0.5 seconds, making the reference time period 1 second. Referring to FIG. 7(*a*), for the Queue (700*a*) corresponding to the first object, only the Third Time Unit (750*a*) may be recorded as viewing time within the First Time Window (710). In this case, the total viewing time within the First Time Window (710) would be less than the reference time period. Conversely, in the Second Time Window (720), both the Third Time Unit (750*a*) and the Fourth Time Unit (760*b*) might be recorded as viewing times. The total viewing time within the Second Time Window (720) matches the reference time period, and consequently, the first object could be included in the count of second viewers.

Referring to FIG. 7(*b*), for the Queue (700*b*) corresponding to the second object, there are two time units recorded as non-viewing time between the Fifth Time Unit (750*b*) and the Sixth Time Unit (760*b*), which are recorded as viewing times. Therefore, regardless of how the time units are grouped within the time window, the total viewing time within the time window cannot exceed the reference time period. Thus, the second object may not be included in the count of second viewers.

Figure 8:
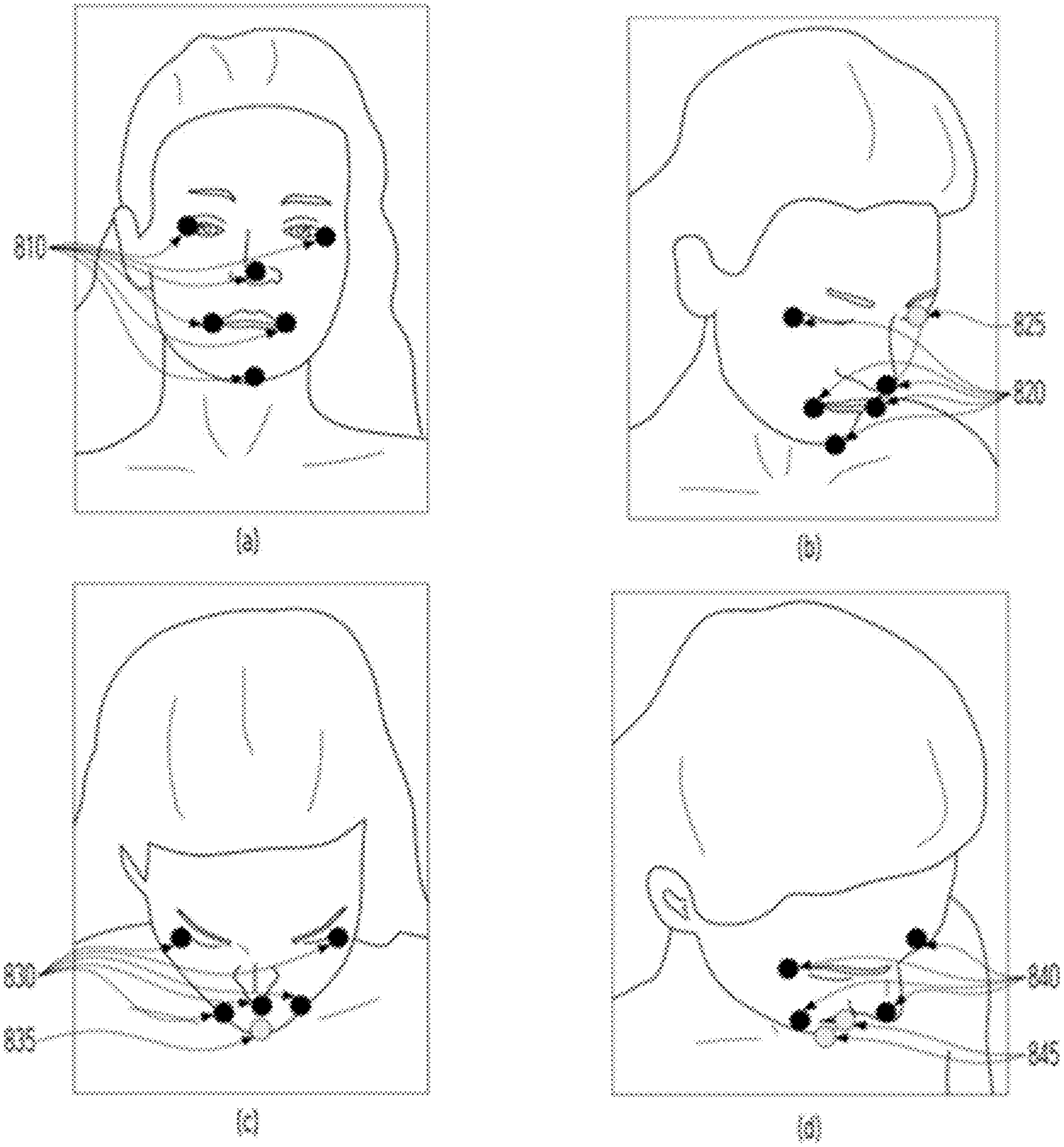
FIG. 8 is a schematic diagram displaying a facial image marked with facial landmarks according to an embodiment of this disclosure.

FIG. 8 is a schematic diagram showing a facial image marked with facial landmarks according to one embodiment of the disclosure.

In one embodiment, a pretrained facial landmark extraction model can be based on a labeling method that classifies landmarks into visible and invisible categories, depending on whether they are visible in the training images. This corresponds to an artificial intelligence model trained on images where facial landmarks are marked as either visible or at least partially invisible. FIG. 8 shows examples of training images marked with visible and invisible landmarks according to this labeling method. However, the pretrained model can also be trained on images captured from various angles where landmarks are marked as either visible or invisible.

For example, as seen in FIG. 8(*a*), all predefined facial landmarks in the first training image may be visible. In this case, the first training image can contain only visible Landmarks (810). Observing FIG. 8(*b*), the facial Landmark (825) corresponding to the left eye in the second training image may be at least partially invisible. In this scenario, the facial Landmark (825) for the left eye can be labeled as an invisible landmark, while the remaining facial Landmarks (820) can be labeled as visible landmarks. Examining FIG. 8(*c*), the facial Landmark (835) corresponding to the chin in the third training image may be at least partially invisible. In this case, the facial Landmark (835) corresponding to the chin can be labeled as an invisible landmark, while the remaining facial Landmarks (830) can be labeled as visible landmarks. Looking at FIG. 8(*d*), the facial Landmark (845) corresponding to the left corner of the mouth and the chin in the fourth training image may be at least partially invisible. In this situation, the facial Landmark (845) for the left corner of the mouth and chin can be labeled as invisible landmarks, while the remaining facial Landmarks (840) can be labeled as visible landmarks.

Signage (1000) can extract multiple facial landmarks from the acquired first image using a pretrained facial landmark extraction model. This model differentiates between visible and invisible landmarks based on their visibility in the training images. By leveraging these extracted landmarks, Signage (1000) is able to acquire comprehensive gaze information for multiple objects. The pretrained model is adept at predicting the positions of invisible landmarks from the first image, thus enabling the extraction of both visible and invisible landmarks. As a result, Signage (1000) is equipped to extract all predefined facial landmarks from an image, regardless of their visibility, thereby obtaining more precise gaze information, such as the objects' head vectors.

Figure 9:
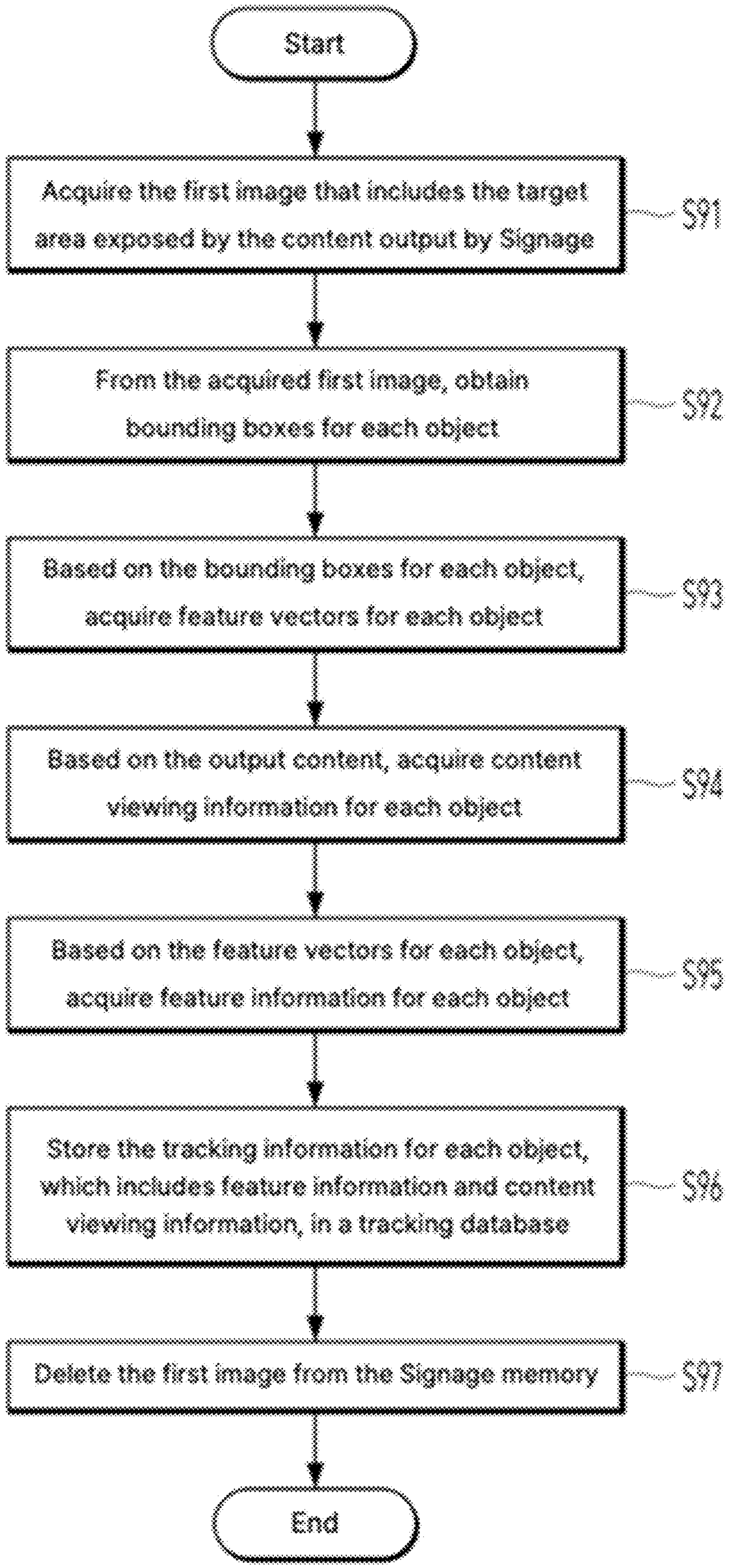
FIG. 9 is a flowchart depicting the method by which signage acquires tracking information for multiple objects according to an embodiment of this disclosure.

FIG. 9 presents a flowchart illustrating how Signage (1000) acquires tracking information for multiple objects, according to one embodiment of this disclosure.

In step S91, Signage (1000) can acquire the first image, which includes the target area exposed by the content displayed on the display unit. This acquisition can occur either through its internal camera or via an external camera connected through the Communication Unit (1400).

In step S92, Signage (1000) is capable of obtaining bounding boxes for multiple objects from the acquired first image. In addition, it can acquire bounding boxes and multiple facial landmarks corresponding to each object from this image. Signage (1000) utilizes a pretrained object detection model to detect bounding boxes for each object from the first image. Moreover, using a pretrained facial landmark extraction model, Signage can extract multiple facial landmarks for each object from the first image.

In step S93, Signage (1000) can acquire feature vectors corresponding to multiple objects based on their respective bounding boxes. Specifically, using a pretrained feature extraction model, Signage (1000) is capable of extracting feature vectors for each object from their corresponding bounding boxes. In addition, Signage (1000) can also acquire feature vectors based on both the bounding boxes and multiple facial landmarks corresponding to each object. For example, using a pretrained feature extraction model, Signage (1000) can extract feature vectors from both the bounding boxes and the multiple facial landmarks associated with each object. The feature vectors may include those related to the appearance of the objects as well as those associated with the gaze information of the objects. The feature vectors related to gaze information can correspond to multiple facial landmarks associated with each object.

In step S94, Signage (1000) can acquire characteristic information for each object based on the feature vectors. In addition, based on the feature vectors, Signage (1000) is also able to acquire both characteristic information and gaze information for each object. In one embodiment, an object's characteristic information may correspond to feature vectors related to the object's appearance. This characteristic information could include predefined feature items such as gender, age, and attire, encompassing at least one of these aspects. Feature vectors related to an object's appearance may include vectors associated with at least one aspect of the object's gender, age, or clothing. Signage (1000) is capable of acquiring characteristic information for each object from the appearance-related feature vectors contained within the acquired feature vectors. In addition, Signage (1000) can acquire gaze information for each object from the feature vectors related to gaze information contained in the acquired feature vectors.

At step S95, Signage (1000) can acquire content viewing information for each of several objects based on the displayed content. In one embodiment, an object's content viewing information may include details related to the content to which the object has been exposed. For example, if an object passes through a target area where the content displayed by the signage is exposed, it can become exposed to this content. In this case, the object's content viewing information may include details related to the content that the object was exposed to. In addition, the object's viewing information may contain information about the object's attention to the content. Information related to content attention can include whether the object paid attention to the content and whether it focused intently on watching the content. For instance, information regarding content attention may specify whether the object is included in either the first or second viewer count.

In one embodiment, Signage (1000) can acquire the content viewing information of an object based on whether at least one of the object's movement information or the distance between the object and Signage (1000) meets the conditions for determining if the content was attended to. A detailed description of the method for determining content attention based on at least one of the object's movement information or the distance between the object and Signage (1000) will be further discussed with reference to FIG. 14.

At step S96, Signage (1000) can store tracking information in the tracking database for each of several objects. This information includes a feature vector for each object, characteristic information, and content viewing details. In addition, the tracking information for each object may also incorporate gaze information. The tracking database may already contain tracking details for several previously tracked identities. Signage (1000) can link these existing identities with the multiple objects to continue monitoring them. For instance, Signage (1000) can associate the previously tracked identities with the multiple objects based on the vector similarity between the feature vectors corresponding to each of the previously tracked identities and those corresponding to each object. Signage (1000) can then update the tracking information for each previously tracked identity with the associated tracking information of the corresponding objects. Furthermore, Signage (1000) is capable of assigning a new identity to at least one object among the multiple objects that is not associated with any previously tracked identities and can initiate tracking for at least one such object.

In one embodiment, Signage (1000) can use a Kalman filter to associate multiple previously tracked identities with several objects included in the first image. The Kalman filter can predict the positions of the bounding boxes for each object in the current frame based on their locations in the previous frame. Using the Kalman filter, Signage (1000) can determine the expected positions on the first image of the bounding boxes corresponding to each previously tracked identity, as obtained from the image corresponding to the previous frame. Signage (1000) then compares the positions of the bounding boxes corresponding to each object from the first image with the expected positions of the bounding boxes obtained using the Kalman filter, thereby enabling the tracking of these objects. For example, Signage (1000) can identify matching bounding boxes based on the Intersection over Union (IoU) values between the bounding boxes obtained from the first image and those predicted using the Kalman filter. Based on these matched bounding boxes, Signage (1000) can effectively track the multiple objects.

In one embodiment, Signage (1000) can utilize both the Kalman filter and the vector similarity of feature vectors to associate multiple previously tracked identities with several objects in the first image. Signage (1000) associates pairs of bounding boxes that have IoU values exceeding a preset threshold and, among these pairs, further associates those where the vector similarity between the feature vectors of the bounding boxes surpasses a predefined similarity threshold. This approach allows Signage (1000) to link the existing identities corresponding to the associated pairs of bounding boxes with the objects located within the target area of the first image.

In one embodiment, Signage (1000) can obtain location information for each of multiple objects based on the bounding boxes corresponding to each object. For instance, the location information for an object might include the coordinates of the center point of its bounding box. Based on the characteristic and location information related to each object, Signage (1000) can determine whether each object belongs to one of several predefined groups. These groups, created using specific criteria to cluster one or more objects, may include, but are not limited to, mixed-gender groups, same-gender groups, and family groups. From this assessment, Signage (1000) can determine the group information for each object.

For example, Signage (1000) can access the gender and age information included in the characteristic data for each object. In addition, by using the location information of each object, Signage (1000) can identify which objects are positioned within a predefined proximity to one another. Based on the gender, age, and location information of the objects, Signage (1000) can then determine the appropriate group information for each. For instance, if two objects located within the specified proximity are male and female, Signage (1000) might classify them as a mixed-gender group. Alternatively, if two objects within the same proximity are of the same gender, they could be classified as a same-gender group. Moreover, if among three objects within this proximity, two have similar ages but different genders, and the third object's age differs by a predefined age difference (e.g., 30 years), then Signage (1000) could classify these three as a family group.

As an additional example, Signage (1000) can acquire pose information for multiple objects and use this information to determine their level of physical contact, such as holding hands, having an arm around the shoulder, and/or linking arms. Based on this level of physical contact, it can identify the characteristics of the groups to which these objects belong. Each object's tracking information may include both the location and group information for each object. This capability provides a technical advantage, allowing content providers to gather key group information within the target area where the content is displayed, as well as which groups are focusing on the content.

In one embodiment, an object's bounding box might be a visible bounding box, which includes only the part of the object visible in the first image. Signage (1000) can use a pre-trained pose estimation model to identify multiple body keypoints for each object from their respective bounding boxes. Signage (1000) can decide whether to delete the tracking information for an object if only a part of that object is included in its bounding box. For instance, if the bounding box corresponding to the first object includes only body keypoints for the lower half, Signage (1000) may delete the tracking information for this first object from the tracking database. If occlusion with another object prevents the first object from observing Signage (1000) because the bounding box only includes body keypoints for the lower half, Signage (1000) might then delete the tracking information for the first object from the tracking database in the first image. As a result, Signage (1000) might not update the tracking information for the first object in the first image with the existing tracking information previously collected.

In one embodiment, Signage (1000) can determine the body orientation angles of multiple objects based on the feature vectors corresponding to each object. For instance, the appearance of an object can vary according to its body orientation angle. Signage (1000) is capable of obtaining the body orientation angles of multiple objects by utilizing feature vectors related to each object's appearance. In addition, Signage (1000) can derive feature vectors that correspond to the body orientation angles of each object, based on both the feature vectors and the body orientation angles associated with each object. The tracking information for each object may include feature vectors corresponding to their body orientation angles. Using these feature vectors, Signage (1000) can acquire at least one of the following for each object based on their body orientation angles: characteristic information, gaze information, and pose information. For example, Signage (1000) can store in the tracking database feature vectors specific to the body orientation angles of objects within the tracking information of several previously tracked identities. This method achieves a technical effect where objects can be tracked more accurately without being influenced by changes in appearance that occur due to varying body orientations, by comparing feature vectors specific to body orientation angles.

In one embodiment, Signage (1000) can identify at least one non-tracked object, which is preset to not be tracked based on the characteristic information of each of several objects. For example, when Signage (1000) is located at an exhibition, the content provider may not require the content viewing information of the exhibition staff. Similarly, when Signage (1000) is located in a store, the content provider may not need the content viewing information of the store clerks. The signage (1000) can set non-tracking targets such as staff and clerks, and identify at least one non-tracked object preset as a non-tracking target. In addition, Signage (1000) can identify at least one non-tracked object among multiple objects based on each object's attire, such as staff or clerks possibly wearing staff vests or clerk vests. Signage (1000) can identify non-tracked objects based on the specific attire of the objects. Furthermore, Signage (1000) can delete the tracking information of at least one non-tracked object, obtained from the first image, from the tracking database. This enables the content provider to acquire content viewing statistics data for the objects they wish to target, achieving a technical effect.

In step S97, Signage (1000) can delete the first image from memory. After acquiring the tracking information for several objects, Signage (1000) can remove the acquired first image from memory. This action helps protect the personal information of each of the multiple objects included in the first image.

Figure 10:
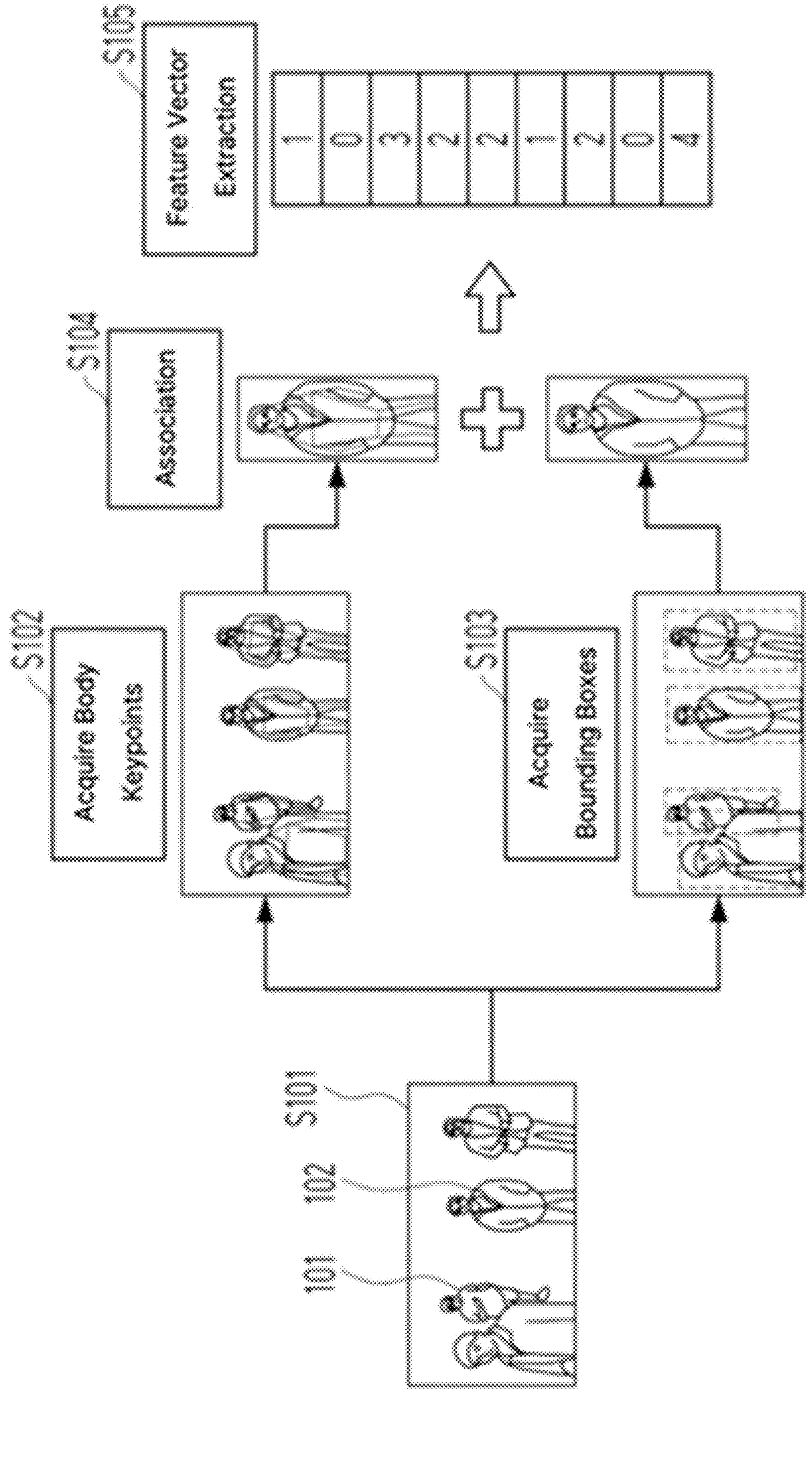
FIG. 10 is a schematic diagram illustrating the method by which signage extracts feature vectors corresponding to multiple objects according to an embodiment of this disclosure.
Figure 11:
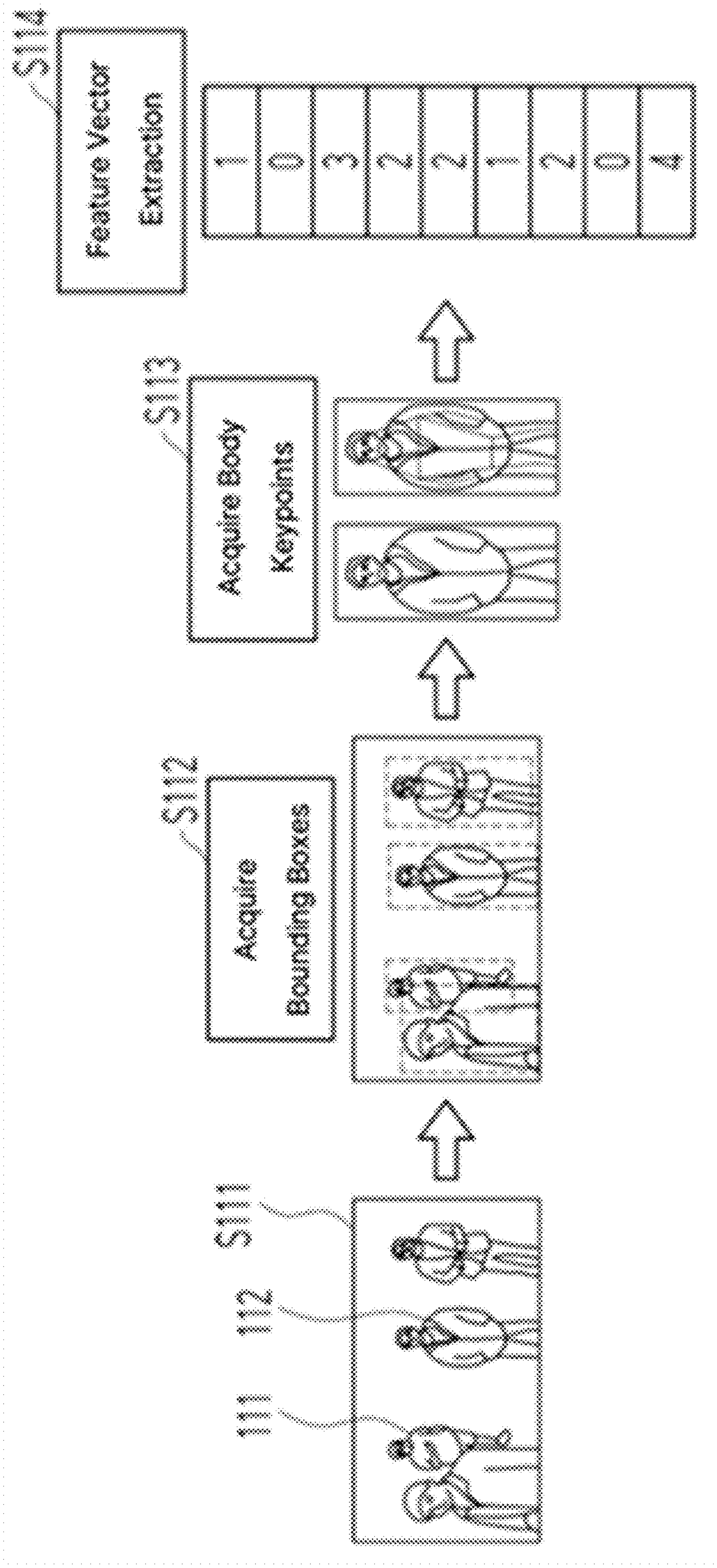
FIG. 11 is a schematic diagram illustrating a method by which signage extracts feature vectors corresponding to multiple objects, according to an embodiment of this disclosure.
Figure 12:
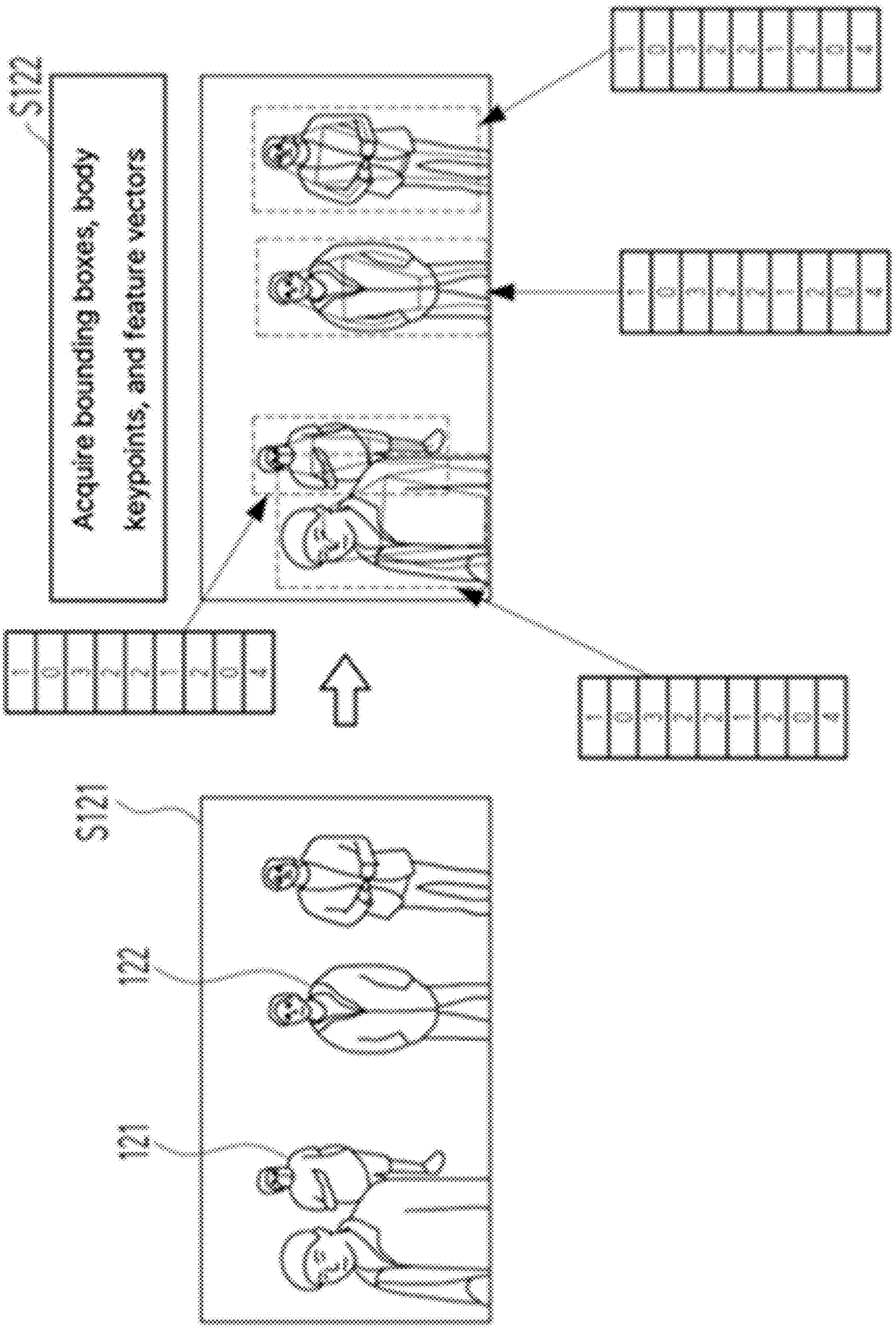
FIG. 12 is a schematic diagram illustrating a method for extracting feature vectors corresponding to multiple objects by signage, according to an embodiment of this disclosure.

FIGS. 10 through 12 are schematic diagrams that illustrate a method for extracting feature vectors for multiple objects according to an embodiment of the disclosure. Signage (1000) can acquire not only the bounding boxes corresponding to each of the multiple objects but also multiple facial landmarks and multiple body keypoints for each object. In extracting feature vectors for each object, Signage (1000) uses the bounding boxes and body keypoints associated with each object. In addition, the extraction process also incorporates the bounding boxes, facial landmarks, and body keypoints corresponding to each object.

As depicted in FIG. 10, in one embodiment, Signage (1000) is capable of simultaneously performing the acquisition of bounding boxes and body keypoints.

At step S101, Signage (1000) can acquire a first image that includes the target area where the content displayed by the display unit is exposed. This first image may include multiple objects, including First Object (101) and Second Object (102). Using the feature vector extraction process described with reference to FIGS. 10 through 12, Signage (1000) can acquire feature vectors corresponding to each object. For clarity in explanation, the process of extracting feature vectors for First Object (101) and Second Object (102) among the multiple objects is used as examples. Both First Object (101) and Second Object (102) can pass through the target area where the content displayed by Signage (1000) is exposed. These objects can be exposed to the content displayed by the signage. As a result, Signage (1000) can choose to track First Object (101) and Second Object (102), which are exposed to the content, to generate content viewing statistics data.

At step S102, Signage (1000) can acquire multiple body keypoints corresponding to First Object (101) and Second Object (102). For example, by using a pre-trained pose estimation model, Signage (1000) is able to obtain multiple body keypoints for both First Object (101) and Second Object (102) from the first image. It is important to note that the body keypoints corresponding to First Object (101) and Second Object (102) can be obtained independently of their respective bounding boxes.

At step S103, Signage (1000) can acquire bounding boxes corresponding to First Object (101) and Second Object (102). For instance, employing a pre-trained object detection model allows Signage (1000) to obtain the bounding boxes for First Object (101) and Second Object (102) from the first image. Steps S102 and S103 can be performed either sequentially or simultaneously. Specifically, Signage (1000) can use both a pre-trained object detection model and a pre-trained pose estimation model to simultaneously acquire the bounding boxes and multiple body keypoints for First Object (101) and Second Object (102) from the first image.

In one embodiment, Signage (1000) can acquire multiple facial landmarks corresponding to First Object (101) and Second Object (102). Specifically, using a pre-trained facial landmark extraction model, Signage (1000) is capable of obtaining multiple facial landmarks for both First Object (101) and Second Object (102) from the first image. The processes of acquiring these facial landmarks, along with steps S102 and S103, can be performed either sequentially or simultaneously. To achieve this, Signage (1000) utilizes a pre-trained object detection model, a pre-trained facial landmark extraction model, and a pre-trained pose estimation model to simultaneously acquire the bounding boxes, multiple facial landmarks, and multiple body keypoints for First Object (101) and Second Object (102) from the first image.

At step S104, Signage (1000) can associate the bounding boxes and multiple body keypoints corresponding to First Object (101) and Second Object (102). In addition, Signage (1000) can also link these bounding boxes with the multiple facial landmarks and multiple body keypoints for both First Object (101) and Second Object (102). In one embodiment, Signage (1000) bases these associations on the number of facial landmarks and body keypoints contained within each object's bounding box. For instance, the bounding box for First Object (101) might include more facial landmarks associated with First Object (101) than the bounding box for Second Object (102). Similarly, the bounding box for First Object (101) might also contain more body keypoints associated with it than the bounding box for Second Object (102). In such cases, Signage (1000) can associate all the facial landmarks and all the body keypoints corresponding to First Object (101) with its bounding box.

At step S105, Signage (1000) can acquire feature vectors for First Object (101) and Second Object (102) based on their respective bounding boxes and multiple body keypoints. In addition, Signage (1000) can also obtain feature vectors for both First Object (101) and Second Object (102) based on their bounding boxes, multiple facial landmarks, and multiple body keypoints. For instance, using a pre-trained feature extraction model, Signage (1000) can extract feature vectors corresponding to First Object (101) and Second Object (102) from their bounding boxes, multiple facial landmarks, and multiple body keypoints associated with each object. Signage (1000) is capable of acquiring feature vectors that relate to the appearance, gaze information, and pose of First Object (101) and Second Object (102). These feature vectors related to appearance, gaze information, and pose are each linked to the objects'bounding boxes, multiple facial landmarks, and multiple body keypoints.

In one embodiment, Signage (1000) can derive feature, gaze, and pose information for First Object (101) and Second Object (102) based on the corresponding feature vectors. The feature, gaze, and pose information of the objects can be directly associated with the feature vectors related to appearance, gaze information, and pose, respectively. The tracking information for the objects can include detailed pose information.

Referring to FIG. 11, in one embodiment, Signage (1000) can sequentially perform the acquisition of bounding boxes and body keypoints.

At step S111, Signage (1000) can acquire a first image that includes the target area where the content displayed by the display unit is exposed. This first image may contain First Object (111) and Second Object (112), which correspond to First Object (101) and Second Object (102) from FIG. 10. The description for step S111 corresponds to step S101 from FIG. 10, and is therefore omitted here for brevity.

At step S112, Signage (1000) is capable of acquiring bounding boxes corresponding to First Object (111) and Second Object (112). For example, using a pre-trained object detection model, Signage (1000) can obtain the bounding boxes for First Object (111) and Second Object (112) directly from the first image.

At step S113, Signage (1000) can acquire multiple body keypoints corresponding to First Object (111) and Second Object (112). By employing a pre-trained pose estimation model, Signage (1000) can extract multiple body keypoints for First Object (111) and Second Object (112) from their respective bounding boxes, which directly correspond to First Object (101) and Second Object (102) respectively.

In one embodiment, Signage (1000) can acquire multiple facial landmarks corresponding to First Object (101) and Second Object (102). For example, using a pre-trained facial landmark extraction model, Signage (1000) can obtain multiple facial landmarks for both First Object (101) and Second Object (102) from the bounding boxes corresponding to First Object (111) and Second Object (112). The process of acquiring multiple facial landmarks and body keypoints at step S103 can be performed either sequentially or simultaneously. Specifically, Signage (1000) can use both a pre-trained facial landmark extraction model and a pre-trained pose estimation model to simultaneously obtain multiple facial landmarks and body keypoints for First Object (101) and Second Object (102) from the bounding boxes of First Object (111) and Second Object (112).

At step S114, Signage (1000) can acquire feature vectors for First Object (111) and Second Object (112) based on their respective bounding boxes and multiple body keypoints. By extracting multiple body keypoints from the bounding boxes corresponding to First Object (111) and Second Object (112), Signage (1000) is able to simplify the association process. In addition, Signage (1000) can obtain feature vectors for First Object (111) and Second Object (112) based on their bounding boxes, multiple facial landmarks, and multiple body keypoints. The process of acquiring multiple facial landmarks and body keypoints from the bounding boxes of First Object (111) and Second Object (112) allows for the omission of further association steps. The procedure for acquiring feature vectors for First Object (111) and Second Object (112) aligns with step S105 from FIG. 10, and is therefore not repeated here for conciseness.

In one embodiment, Signage (1000) can acquire feature and pose information for First Object (101) and Second Object (102) based on the respective feature vectors. Furthermore, Signage (1000) can acquire feature, gaze, and pose information for First Object (101) and Second Object (102) based on their respective feature vectors. The feature, gaze, and pose information for the objects corresponds to feature vectors associated with appearance, gaze information, and pose, respectively. The tracking information for the objects includes detailed pose information for each object.

Referring to FIG. 12, in one embodiment, Signage (1000) can simultaneously acquire bounding boxes, body keypoints, and feature vectors. Although the feature vectors corresponding to multiple objects are depicted as identical in FIG. 12, this representation is solely for illustrative purposes; the actual feature vector values for each object can vary.

At step S121, Signage (1000) can acquire a first image that includes the target area where the content displayed by the display unit is exposed. This first image may include First Object (121) and Second Object (122), which may correspond to First Object (101) and Second Object (102) from FIG. 10. The description for step S121 is analogous to step S101 from FIG. 10 and is omitted here for brevity.

At step S122, Signage (1000) can acquire bounding boxes, multiple body keypoints, and feature vectors corresponding to First Object (121) and Second Object (122) from the first image. In addition, Signage (1000) can also acquire bounding boxes, multiple facial landmarks, multiple body keypoints, and feature vectors for both First Object (121) and Second Object (122) from the first image. For instance, using a pre-trained object detection model, Signage (1000) can determine the centroids corresponding to First Object (121) and Second Object (122) from the acquired image. Based on these centroids, Signage (1000) can then obtain the bounding boxes, multiple facial landmarks, and multiple body keypoints for both First Object (121) and Second Object (122). Using these bounding boxes, multiple facial landmarks, and multiple body keypoints, Signage (1000) can subsequently acquire the feature vectors corresponding to each object, First Object (121) and Second Object (122).

In one embodiment, Signage (1000) can acquire feature vectors corresponding to First Object (121) and Second Object (122) from the first image using a pre-trained second object tracking model. Specifically, Signage (1000) can use this model to determine the centroids corresponding to First Object (121) and Second Object (122) from the first image. Based on these centroids, Signage (1000) can then extract feature vectors for both First Object (121) and Second Object (122). The feature vectors obtained by the pre-trained second object tracking model may include at least one of the following: a feature vector related to the bounding box position, a feature vector concerning the appearance of the object, a feature vector associated with the object's gaze information, and a feature vector linked to the pose information of the object.

Figure 13:
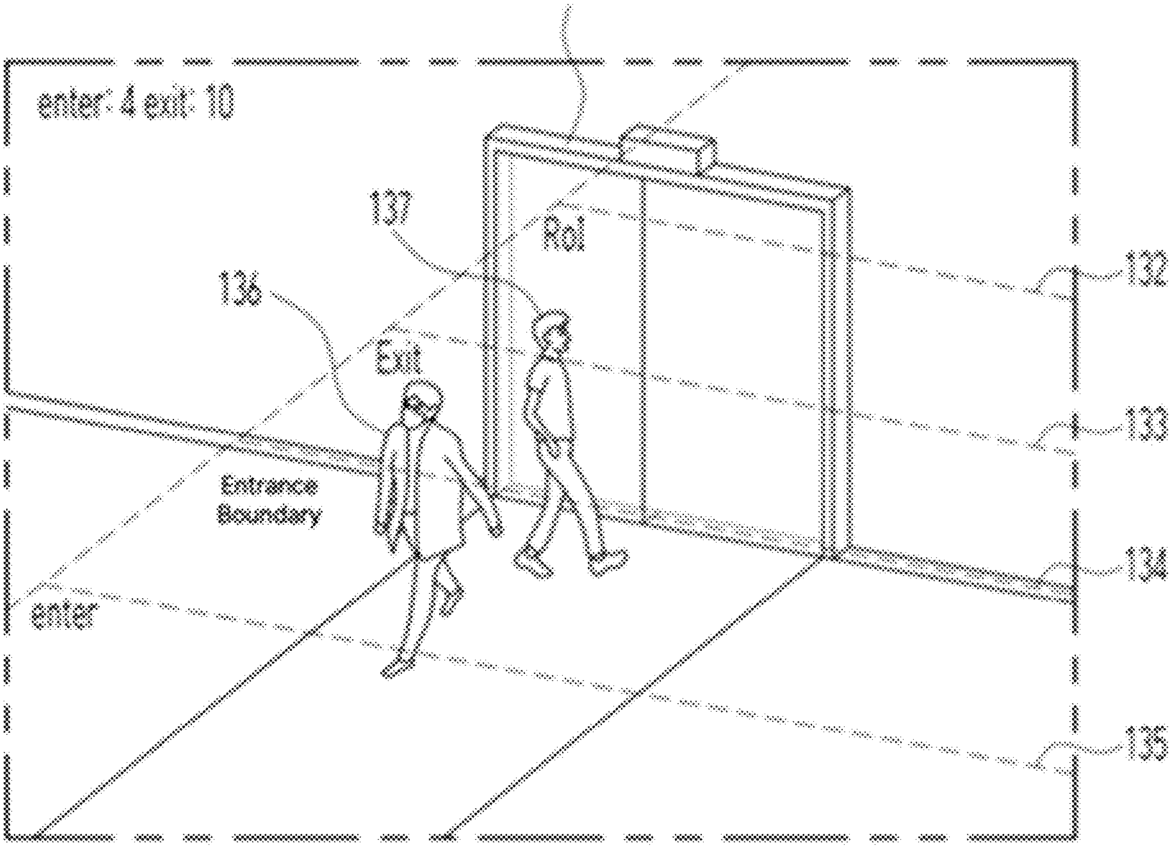
FIG. 13 is a schematic diagram depicting multiple sub-areas within the target area where content is displayed, according to an embodiment of this disclosure.

FIG. 13 is a schematic representation of the multiple sub-areas included in the target area where content is displayed, according to an embodiment of this disclosure.

In one embodiment, the target area where the content outputted by Signage (1000) is displayed can include at least one boundary that provides meaningful data to the content provider, through information about the movement between object boundaries. For example, Signage (1000) may include an Entrance Boundary (134) corresponding to the Entrance (131). In addition, the target area can comprise multiple sub-areas. The target area can be divided into multiple sub-areas based on at least one boundary. In one embodiment, the target area can be segmented into various sub-areas based on the actions that objects can undertake in each sub-area. For example, the target area may encompass sub-areas such as a purchasing area, checkout area, display area, car wash area, experience area, entry area, and access area.

Referring to FIG. 13, the target area may include a Target Area Boundary (132), Entry Area Boundary (133), Entrance Boundary (134), and Ingress Area Boundary (135). The Target Area Boundary (132) represents the outer limit of the target area where the content displayed by Signage (1000) is exposed. In addition, the target area can be divided into the following regions: an external area located between the Target Area Boundary (132) and the Entry Area Boundary (133); an entry area located between the Entry Area Boundary (133) and the Entrance Boundary (134); an ingress area located between the Entrance Boundary (134) and the Ingress Area Boundary (135); and an internal area located within the Ingress Area Boundary (135).

In one embodiment, Signage (1000) can use a pre-trained object detection model to acquire bounding boxes corresponding to multiple objects from sequential images, including the first image. Based on the bounding boxes obtained for the multiple objects from these sequential images, Signage (1000) can determine the location information for each object in each sequential image. Using this location information, Signage (1000) can derive movement information for each object. For example, by tracking changes in the location information of each object across the sequential images, Signage (1000) can obtain movement information for each object. The movement information for an object, in one embodiment, may include details related to the object's movement vector. Specifically, this movement information can include details about the object's movement path, speed, and direction. The tracking information for each object may include the movement information for that object.

In one embodiment, Signage (1000) can determine whether each of the multiple objects is entering or exiting through an entrance, such as Entrance (131), based on their movement information and the Entrance Boundary (134). For example, Second Object (137) may pass through the Entrance Boundary (134) to either enter or exit Entrance (131). Using this information, Signage (1000) can calculate the number of objects entering and exiting through the entrance. This capability provides a technical benefit by allowing content providers to obtain detailed information about the entry and exit behaviors of multiple objects.

In one embodiment, the location information for each of the multiple objects may include details about the sub-area of the target area in which the object is located. Referring to FIG. 13, First Object (136) and Second Object (137) may be located in the ingress area, which is one of the sub-areas within the target area. Signage (1000) can store the information that First Object (136) and Second Object (137) are located in the ingress area as part of their respective location information.

In one embodiment, Signage (1000) can determine whether each of the multiple objects is moving from the entry area to the ingress area or from the ingress area to the entry area, based on the movement information of each object. For example, First Object (136) may be moving from the entry area to the ingress area. Specifically, First Object (136) might be crossing the Entrance Boundary (134) and heading toward the Ingress Area Boundary (135). By analyzing the movement information of First Object (136), if Signage (1000) detects that First Object (136) is crossing the Entrance Boundary (134) and moving in the direction of the Ingress Area Boundary (135), it can classify First Object (136) as an object entering the ingress area from the entry area. Similarly, Second Object (137) may be moving from the ingress area to the entry area. Specifically, Second Object (137) could be crossing the Entrance Boundary (134) and heading toward the Entry Area Boundary (133). By analyzing the movement information of Second Object (137), if Signage (1000) detects that Second Object (137) is crossing the Entrance Boundary (134) and moving in the direction of the Entry Area Boundary (133), it can classify Second Object (137) as an object exiting the ingress area and entering the entry area.

In one embodiment, Signage (1000) can determine whether each of the multiple objects is entering or exiting based on the centroids corresponding to each object. To acquire this information, Signage (1000) can calculate the movement paths of the centroids for each object by utilizing the bounding boxes and movement information of the objects. For example, using a pre-trained object detection model, Signage (1000) can extract the bounding boxes corresponding to each object from sequential images and determine the centroids from these bounding boxes. Alternatively, Signage (1000) can directly obtain the centroids corresponding to each object from sequential images using the pre-trained object detection model.

Based on the movement information of each object, Signage (1000) can derive the movement paths of the centroids corresponding to each object. Using these movement paths, Signage (1000) can determine whether each object is entering or exiting. For instance, Signage (1000) can evaluate whether the centroids of each object pass through the Entrance Boundary (134) to determine the entry or exit status of each object.

In one embodiment, Signage (1000) can determine whether each of the multiple objects is entering or exiting based on the body keypoints corresponding to both feet. To acquire this information, Signage (1000) can use a pre-trained pose estimation model to obtain multiple body keypoints corresponding to each object from the bounding boxes of the objects. Based on these body keypoints and the movement information for each object, Signage (1000) can calculate the movement paths of the body keypoints corresponding to both feet for each object. Using the movement paths of the body keypoints corresponding to both feet, Signage (1000) can determine whether each of the multiple objects is entering or exiting.

Figure 14:
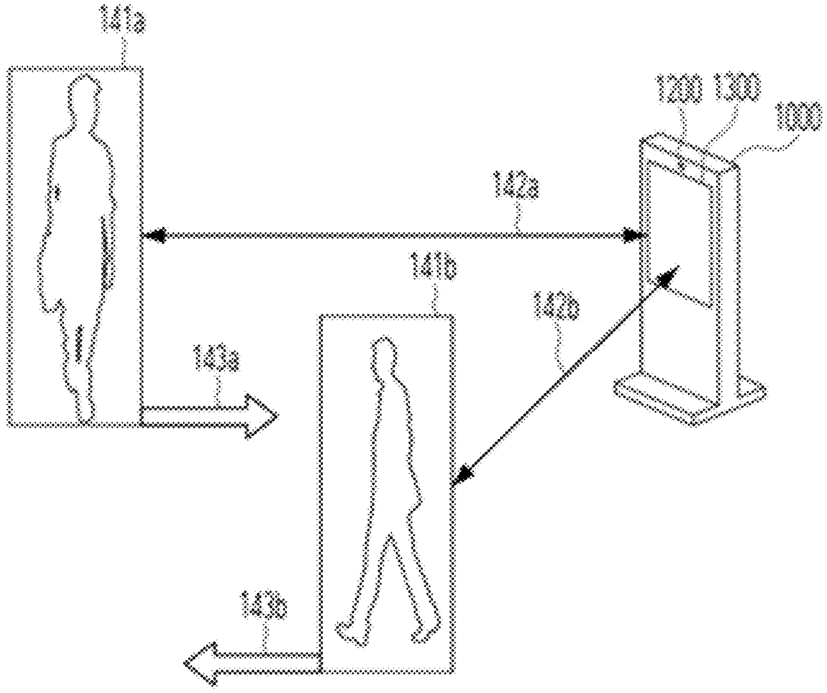
FIG. 14 is a schematic diagram illustrating a method for determining conditions for viewing content, according to an embodiment of this disclosure.

FIG. 14 is a schematic diagram illustrating a method for determining content attention conditions according to an embodiment of the disclosure.

In one embodiment, Signage (1000) can determine whether each of the multiple objects is paying attention to the content based on at least one of the movement information of the objects or the distance between each object and Signage (1000). Signage (1000) can include objects that meet the content attention conditions, based on at least one of the movement information or the distance from Signage (1000), as part of the first viewer count (the number of viewers paying attention to the content).

In one embodiment, Signage (1000) can acquire movement information for each of the multiple objects from sequential images, including the first image. For example, Signage (1000) can obtain the positions of each object from these sequential images. By analyzing the changes in the positions of each object, Signage (1000) can derive the movement information for each object. Based on this movement information, Signage (1000) can determine whether each object is paying attention to the content. For example, if a moving object slows down near Signage (1000) while watching the content, its speed may decrease. Signage (1000) can record that the object was paying attention to the content in its content viewing information if the object's speed decreases by more than a predefined amount within the target area. Furthermore, Signage (1000) can include such objects, whose speed decreases by more than the predefined amount, in the first viewer count (the number of viewers paying attention to the content).

In one embodiment, when calculating the first viewer count, Signage (1000) can determine whether each object is paying attention to the content based on whether at least one of the yaw or pitch angles of each object satisfies a first condition for determining content attention, as well as the movement information of each object. For example, if the speed of an object, which satisfies the first condition, decreases by more than a predefined amount within the target area, Signage (1000) can include that object in the first viewer count.

In one embodiment, Signage (1000) can acquire distance information for each of the multiple objects corresponding to each sequential image, based on the location information of each object. Signage (1000) can determine viewing information for each object by evaluating whether at least one of the objects'movement information or their distance from Signage (1000) satisfies the conditions for determining whether the content is being watched. For instance, if an object is too far from Signage (1000), it may not be able to view the content displayed by Signage (1000), regardless of its movement speed. Similarly, even if an object is near Signage (1000), it may not be watching the content if its movement speed does not change. Therefore, Signage (1000) can assess whether an object is watching the content based on at least one of the following: the object's movement information or its distance from Signage (1000). The viewing information for each of the multiple objects can include data related to whether each object is watching the content.

In one embodiment, Signage (1000) can calculate the change in movement speed for each of the multiple objects corresponding to each sequential image, including the first image, based on their movement information. The content watching conditions, in one embodiment, may require that the movement speed of each object decreases by at least a preset amount and that the distance to Signage (1000) is less than a preset threshold. For example, the preset distance can be determined based on the range within which an object can be located within the target area. In other words, the preset distance can be established using the location information of the objects and the boundaries of the target area where the content is displayed.

In one embodiment, Signage (1000) can determine the movement direction of each of the multiple objects corresponding to each sequential image, based on the movement information of the objects obtained from the sequential images, including the first image. The content watching conditions in this embodiment may include the following: the movement direction of each object changes by at least a preset angular variation toward Signage (1000), the change in movement speed of each object is at least a preset speed variation, and the distance between each object and Signage (1000) is less than a preset threshold. The preset angular variation included in the content watching conditions can be determined based on the position of Signage (1000) and the movement direction of each object. For example, an object may adjust its movement direction toward Signage (1000) to watch the content displayed by Signage (1000). If the movement direction of an object changes by at least the preset angular variation such that Signage (1000) is within the object's field of view, the object may be watching the content displayed by Signage (1000).

In one embodiment, Signage (1000) can determine whether each object is watching content and calculate the number of first viewers. This determination is based on whether at least one of the yaw angle or pitch angle of each object satisfies a first condition for determining content watching status, along with the movement information of each object and its distance from Signage (1000). For example, Signage (1000) may include an object in the number of first viewers if the object satisfies the first condition, its movement speed decreases by at least a preset speed variation within the target area, and its distance from Signage (1000) is less than a preset threshold.

Referring to FIG. 14, First Object (141*a*) and Second Object (141*b*) may be objects moving near Signage (1000). Signage (1000) can determine the content viewing information for each of First Object (141*a*) and Second Object (141*b*) based on whether at least one of their movement information or distance information relative to Signage (1000) satisfies the content watching conditions.

For example, First Object (141*a*) may change its movement direction toward the location of Signage (1000) and reduce its movement speed. Based on the Motion Information (143*a*) of First Object (141*a*), Signage (1000) can determine that First Object (141*a*) is watching the content. In addition, Signage (1000) can conclude that First Object (141*a*) is watching the content by considering both the Motion Information (143*a*) of First Object (141*a*) and the Distance Information (142*a*) between First Object (141*a*) and Signage (1000). For instance, the distance between First Object (141*a*) and Signage (1000) may fall within a range that allows First Object (141*a*) to be positioned within the target area. Signage (1000) can determine that First Object (141*a*) is watching the content by evaluating its Motion Information (143*a*) and whether its distance is within the range that places it in the target area.

On the other hand, Second Object (141*b*) may not change its movement direction toward the location of Signage (1000) or reduce its movement speed. Based on the Motion Information (143*b*) of Second Object (141*b*), Signage (1000) can determine that Second Object (141*b*) is not watching the content. In addition, Signage (1000) can conclude that Second Object (141*b*) is not watching the content by considering both the Motion Information (143*b*) of Second Object (141*b*) and the Distance Information (142*b*) between Second Object (141*b*) and Signage (1000). For example, the distance between Second Object (141*b*) and Signage (1000) may fall within a range that allows Second Object (141*b*) to be positioned in the target area. However, Signage (1000) can evaluate both the Motion Information (143*b*) of Second Object (141*b*) and whether its distance falls within the range of the target area to determine whether Second Object (141*b*) is watching the content.

Figure 15:
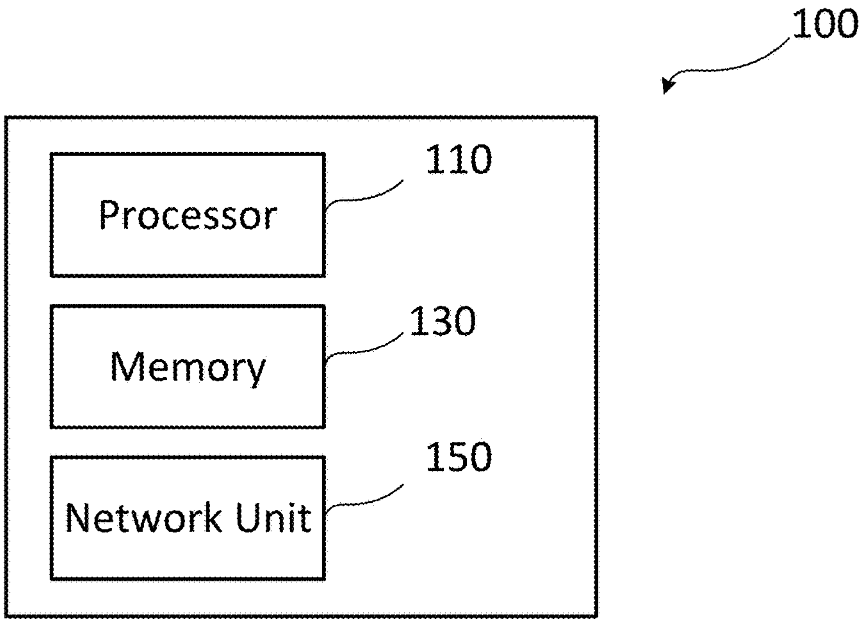
FIG. 15 is a block diagram of a computing device, according to an embodiment of this disclosure.

FIG. 15 is a block diagram of a computing device according to one embodiment of this disclosure.

The configuration of Computing Device (100) shown in FIG. 15 is a simplified example. In one embodiment of this disclosure, Computing Device (100) may include additional components necessary to operate its computing environment, and only some of the disclosed components may be included in Computing Device (100). Computing Device (100) may correspond to the Server (100) illustrated in FIG. 3.

Computing Device (100) may include a Processor (110), Memory (130), and a Network Unit (150).

The Processor (110) may consist of one or more cores and include processors designed for data analysis and deep learning, such as a central processing unit (CPU: central processing unit), a general-purpose graphics processing unit (GPGPU: general-purpose graphics processing unit), or a tensor processing unit (TPU: tensor processing unit). The Processor (110) can read a computer program stored in Memory (130) to perform data processing for machine learning in accordance with an embodiment of this disclosure. In one embodiment, the Processor (110) can execute computations required for training a neural network model. The Processor (110) can handle tasks involved in training for deep learning (DL: deep learning), such as processing input data for training, extracting features from the input data, calculating errors, and updating the weights of a neural network model using backpropagation. At least one of the CPU, GPGPU, or TPU in the Processor (110) can manage the training of a neural network model. For example, the CPU and GPGPU can work together to train the neural network model and process data classification using the model. In addition, in one embodiment of this disclosure, the processors of multiple computing devices can be used collaboratively to train a neural network model and perform data classification using the model. Furthermore, the computer program executed on the computing device, according to an embodiment of this disclosure, may be a program executable by the CPU, GPGPU, or TPU.

According to one embodiment of this disclosure, Memory (130) can store any form of information generated or determined by Processor (110), as well as any form of information received by Network Unit (150). Memory (130) may include a tracking database (Database, DB) that stores tracking information for multiple objects. This tracking database may include a vector database that stores feature vectors corresponding to each of the multiple objects. For example, the tracking information for multiple objects may include at least one of the following: feature vectors corresponding to each object, feature information for each object, gaze information, pose information, location information, and content viewing information. Memory (130) can also store any form of information obtained from multiple signages. For instance, Memory (130) may store content viewing statistical data obtained from multiple signages. In addition, Memory (130) may store tracking information for each of the multiple objects collected from multiple signages.

According to one embodiment of this disclosure, Memory (130) may include at least one type of storage medium, such as a flash memory type, hard disk type, multimedia card micro type, card-type memory (e.g., SD or XD memory), RAM (Random Access Memory), SRAM (Static Random Access Memory), ROM (Read-Only Memory), EEPROM (Electrically Erasable Programmable Read-Only Memory), PROM (Programmable Read-Only Memory), magnetic memory, magnetic disk, or optical disk. Computing Device (100) may also operate in conjunction with web storage that performs the storage functions of Memory (130) on the internet. The descriptions of memory types provided above are illustrative examples and are not intended to limit the scope of this disclosure.

The Network Unit (150), according to one embodiment of this disclosure, can utilize any type of wired or wireless communication system.

In this disclosure, the Network Unit (150) can be configured to support various communication methods, including both wired and wireless systems. It can operate with different types of communication networks, such as a Personal Area Network (PAN: Personal Area Network) or a Wide Area Network (WAN: Wide Area Network). In addition, the network may include the well-known World Wide Web (WWW: World Wide Web) and may use wireless transmission technologies for short-range communication, such as Infrared Data Association (IrDA: Infrared Data Association) or Bluetooth. The technologies described in this disclosure can also be applied to other networks mentioned above. The Network Unit (150) can receive any information related to the content displayed by multiple signages. Furthermore, the Network Unit (150) can transmit information about the frequency of content delivery, determined based on content viewing statistical data, to multiple signages. It can also send information related to content viewing statistical data to user devices.

Figure 16A:
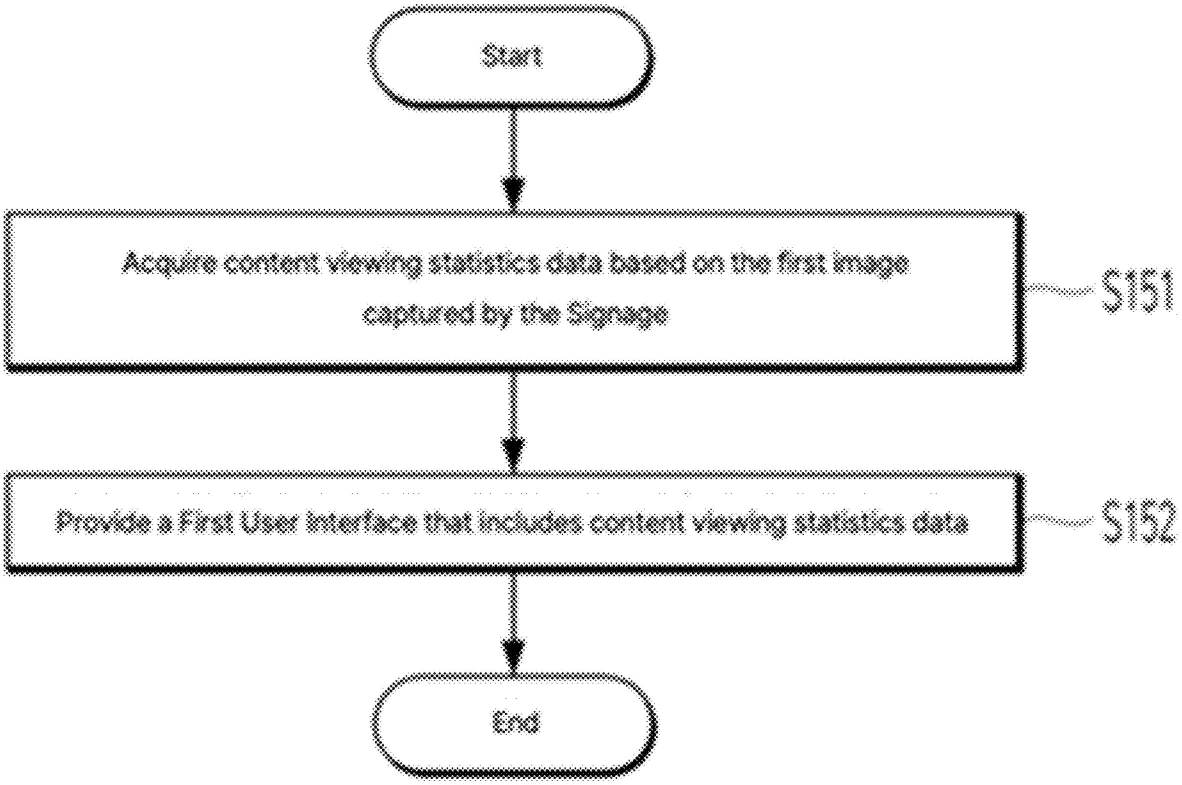
FIG. 16A is a flowchart illustrating a method for providing a first user interface that includes content viewing statistics data, according to an embodiment of this disclosure.

FIG. 16A is a flowchart illustrating a method for providing a first user interface that includes content viewing statistical data, according to one embodiment of this disclosure.

In step S151, the Computing Device (100), according to one embodiment, can acquire content viewing statistical data generated based on a first image captured by Signage (1000). The first image may be an image used to evaluate the interaction between the content displayed by Signage (1000) and people appearing in the image. For example, the interaction between the content and people may include whether individuals are watching the content. Another example of such interaction may involve delivering content based on the gender or age of individuals.

In one embodiment, the Computing Device (100) can acquire content viewing statistical data for each piece of content generated based on a sequence of images, including the first image. For instance, the Computing Device (100) can update the content viewing statistical data by aggregating the viewing statistics for each frame of a video captured by Signage (1000).

As described with reference to FIGS. 16A through 16C, a person can be identified as an object included in the images captured by the signage. This distinction helps prevent confusion with other graphical elements displayed on the first and second user interfaces provided by the Computing Device (100), such as graphical objects and button objects.

In one embodiment, the Computing Device (100) can acquire tracking information for each individual from Signage (1000). The Computing Device (100) can obtain this tracking information based on the sequence of images captured by Signage (1000), including the first image. For example, the Computing Device (100) can update the tracking information for each individual based on the tracking data from each frame of a video captured by Signage (1000). The Computing Device (100) can then generate content viewing statistical data based on the tracking information for each individual. For instance, the Computing Device (100) can produce content viewing statistical data related to the number of people exposed to the content, based on the number of individuals tracked. In addition, the Computing Device (100) can generate content viewing statistical data related to viewer engagement based on the gaze information of each individual. Moreover, the Computing Device (100) can acquire content viewing statistical data related to the gender distribution, age group, and attire of the viewers based on the feature information of each individual.

In one embodiment, the Computing Device (100) can acquire tracking information for each individual from multiple signages, including Signage (1000). The Computing Device (100) is capable of obtaining comprehensive content viewing statistical data from the tracking information collected across these signages. For example, this comprehensive content viewing statistical data may encompass viewing statistics for various pieces of content displayed across different signages.

In one embodiment, the Computing Device (100) can acquire content viewing statistical data from Signage (1000). It is also able to gather content viewing statistical data from multiple units of Signage (1000). Subsequently, the Computing Device (100) can aggregate this data collected from various signages to compile a unified set of content viewing statistical data.

In step S152, the Computing Device (100) can provide a first user interface that incorporates content viewing statistical data. For instance, the Computing Device (100) may offer this first user interface to a content provider's user device. Alternatively, it might provide the first user interface to a signage manager's device. When the first user interface is provided to either a content provider's user device or a signage manager's device, it can be displayed on the device's screen. The first user interface features a first area that displays a graph, including a first axis representing the moment of content playback, a second axis indicating the relative attention received by the content, and a graph object that depicts the relative attention at various playback moments. In addition, there is a second area displaying text that describes the first graph. Further details about the first user interface will be discussed with reference to FIG. 16B.

In one embodiment, the content viewing statistical data can include several metrics: the number of people within the target area captured in the first image, which includes the area where the content is displayed, the number of second viewers who have maintained attention on the content for a specified duration, and at least one indicator of the content's attention level. In this embodiment, the attention level of the content might be calculated as the ratio of the number of second viewers to the total number of people exposed to the content. This measure reflects the proportion of viewers who are actively engaged with the content. Alternatively, the attention level could be calculated as the ratio of the number of second viewers to the number of first viewers, indicating the proportion of engaged viewers among those who noticed the content.

In one embodiment, the content viewing statistical data may include the relative attention level at each playback moment of the content. This relative attention level is calculated by dividing the attention level at each playback moment by the average attention level of the content. For example, if the content is a 15-second video and attention levels are calculated every 0.1 seconds, there would be a total of 150 playback moments. The attention level at each playback moment is the calculated attention value at that specific time. Signage (1000) can calculate the attention level of the content at each of these moments. The Computing Device (100) can then acquire these attention levels from Signage (1000). In addition, the Computing Device (100) is capable of computing the attention level at each playback moment based on the gaze information from each individual.

In one embodiment, the average attention level of content is defined as the average proportion of attention it receives, regardless of the specific playback moment. This average can be calculated by dividing the total attention received at each playback moment by the number of playback moments. As Signage (1000) repeatedly displays the content, the Computing Device (100) can update the content viewing statistical data. Metrics such as the attention level of the content, its average attention level, the attention level at each playback moment, and the relative attention level at each playback moment can be updated based on the revised content viewing statistical data. For instance, if the number of second viewers who concentrate on the content increases with repeated displays, the value of the content's attention level may also rise.

Figure 16B:
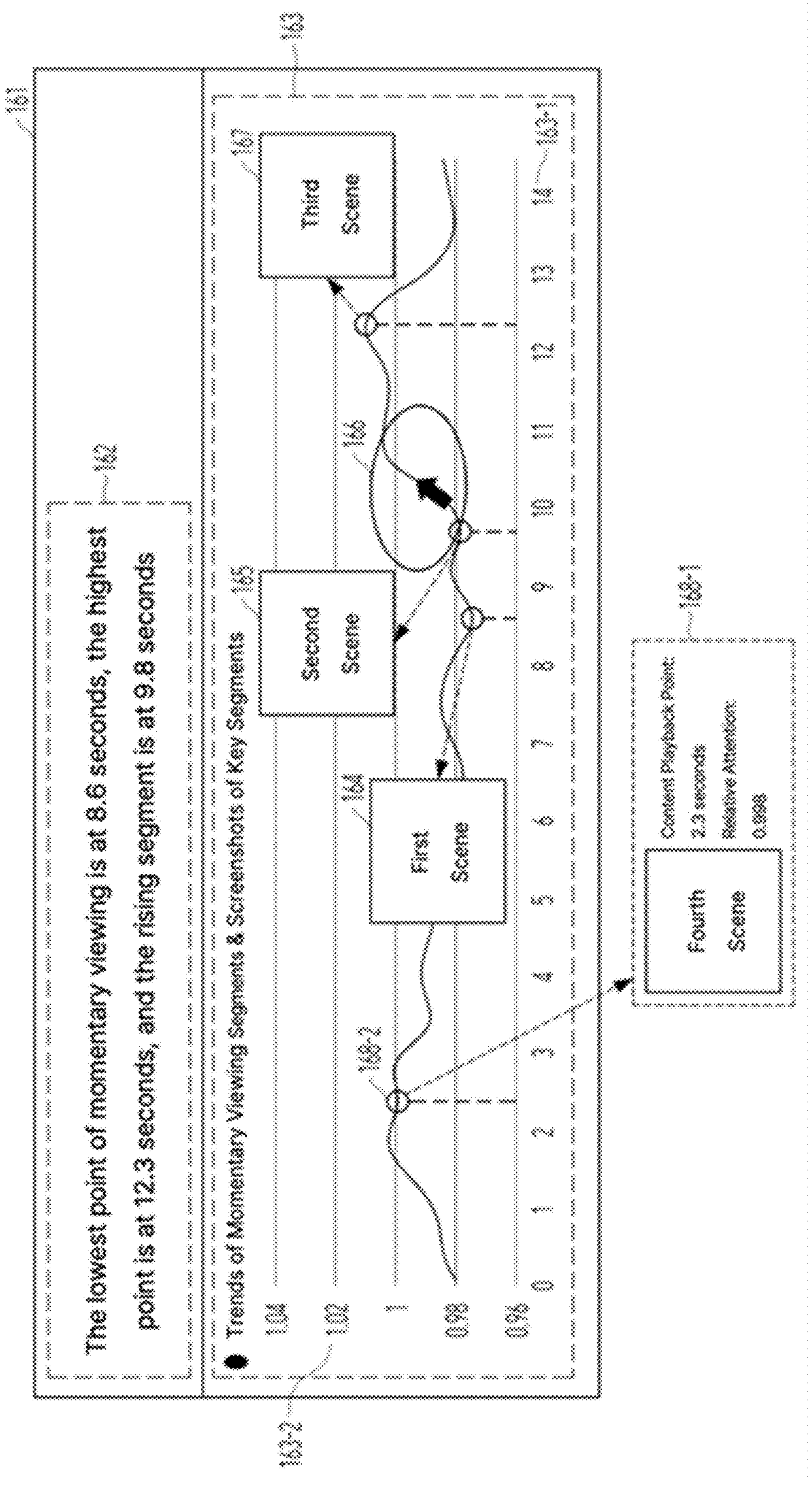
FIG. 16B is a diagram showing a first user interface that incorporates content viewing statistics data, according to an embodiment of this disclosure.

FIG. 16B is a diagram that illustrates a first user interface including content viewing statistical data, according to one embodiment of this disclosure.

In one embodiment, the First User Interface (161) includes a First Area (163) displaying a first graph. This graph features a First Graph Object that represents the relative attention level at each playback moment of the content. The graph includes a First Axis (163-1) representing the playback moments within the total playback duration of the content, and a Second Axis (163-2), which indicates the relative attention level at each playback moment, based on a reference value of 1. For example, the First Axis (163-1) typically serves as the horizontal axis, while the Second Axis (163-2) acts as the vertical axis. In addition, the First User Interface (161) contains a Second Area (162) that displays text describing the first graph. In this context, 'instant viewing' in the First User Interface (161) refers to the relative attention level at each playback moment.

In one embodiment, the First Area (163) may display the First Scene (164) of the content, which corresponds to the lowest point of relative attention at each playback moment. In addition, the values of the First Axis (163-1) and the Second Axis (163-2), which correspond to this lowest point, can also be displayed in the First Area (163). For example, the First Area (163) may feature a region that shows the First Scene (164) of the content at the lowest point of the relative attention level. Furthermore, this area may display the values of the First Axis (163-1) and the Second Axis (163-2) associated with this lowest point.

In one embodiment, the First Area (163) may display the Second Scene (165) of the content, which corresponds to the highest rising point of the relative attention level at each playback moment. The values of the First Axis (163-1) and the Second Axis (163-2) associated with the highest rising point can also be shown in the First Area (163). The highest rising point of the relative attention level at each playback moment is defined as the starting point of the Maximum Ascending Section (166). This section refers to the part of the total playback duration where the relative attention level rises the most. For example, the Maximum Ascending Section (166) may be determined based on whether the slope of the relative attention level at each playback moment exceeds a preset value. The First Area (163) includes a region that displays the Second Scene (165) corresponding to this highest rising point. In addition, this area may also display the values of the First Axis (163-1) and the Second Axis (163-2) corresponding to the highest rising point.

In one embodiment, the First Area (163) may display the Third Scene (167) of the content, which corresponds to the highest point of the relative attention level at each playback moment. In addition, the values of the First Axis (163-1) and the Second Axis (163-2) that correspond to the highest point of the relative attention level at each playback moment can also be displayed in the First Area (163). For example, the First Area (163) may feature a section that shows the Third Scene (167) of the content at the highest point of the relative attention level. Furthermore, this area may include a segment that displays the values of the First Axis (163-1) and the Second Axis (163-2) associated with this highest point.

Referring to FIG. 16B, although the values of the First Axis (163-1) and the Second Axis (163-2) corresponding to the First Scene (164), Second Scene (165), and Third Scene (167) are not shown, this is merely illustrative. The values of the First Axis (163-1) and the Second Axis (163-2) corresponding to the First Scene (164), Second Scene (165), and Third Scene (167) can indeed be displayed together. For example, the values of the First Axis (163-1) and the Second Axis (163-2) corresponding to each scene might be displayed in a manner similar to how the Content Information (168-1) is shown corresponding to the First Point (168-2). This setup allows content providers to visually ascertain significant points such as the lowest, highest rising, and highest points of relative attention in the content, including the corresponding output scenes, playback moments, and relative attention levels, thereby achieving a significant technical effect.

In one embodiment, within the First Area (163), when a First Point (168-2) corresponding to a user's selection input coincides with a first graph object, the values of the First Axis (163-1) and the Second Axis (163-2) corresponding to that point, as well as the Fourth Scene of the content corresponding to that point, may be displayed. The Computing Device (100) can acquire the user's selection input through the first graph object included in the First Area (163). Users can select any point on the first graph object to retrieve the values of the First Axis (163-1) and the Second Axis (163-2) at that point, as well as the corresponding scene of the content.

Referring to FIG. 16B, if a user selects the First Point (168-2) on the first graph object, the Content Information (168-1) corresponding to the First Point (168-2) may be displayed. This Content Information (168-1) includes the values of the First Axis (163-1) and the Second Axis (163-2) at that point, along with the scene of the content. Specifically, the value of the First Axis (163-1) at the First Point (168-2) might be 2.3 seconds, the value of the Second Axis (163-2) might be 0.988, and the content scene could be the fourth scene. This configuration allows content providers to verify the output scene and relative attention at the desired playback moment, achieving a significant technical effect. Although in FIG. 16B the Content Information (168-1) corresponding to the First Point (168-2) is depicted outside the First Area (163) for illustrative convenience, the Content Information (168-1) corresponding to the First Point (168-2) can be displayed within the First Area (163), similar to how the First Scene (164), Second Scene (165), and Third Scene (167) are displayed.

In one embodiment, within the First Area (163), the Fifth Scene of the content may be displayed at the first point where the relative attention level at each playback moment remains above a preset attention level for a preset duration. In addition, the values of the First Axis (163-1) and the Second Axis (163-2) corresponding to this first point can also be displayed in the First Area (163). For example, the First Area (163) may include a section that displays the Fifth Scene of the content corresponding to this first point. Furthermore, this area may include a segment that displays the values of the First Axis (163-1) and the Second Axis (163-2) associated with this first point.

In one embodiment, the Second Axis (163-2) represents the attention level of the content, and the first graph object may illustrate the content's attention level. The method of displaying the content's attention level in the First Area (163) is consistent with the previously described method for displaying the relative attention level, therefore further explanation will be omitted.

In one embodiment, the Computing Device (100) can provide a second user interface that includes content viewing statistical data. The Computing Device (100) is capable of receiving user inputs through a button object displayed on the second user interface. Based on the user input, the Computing Device (100) can then provide the First User Interface (161). Detailed information about the second user interface will be described with reference to FIG. 16C.

Figure 16C:
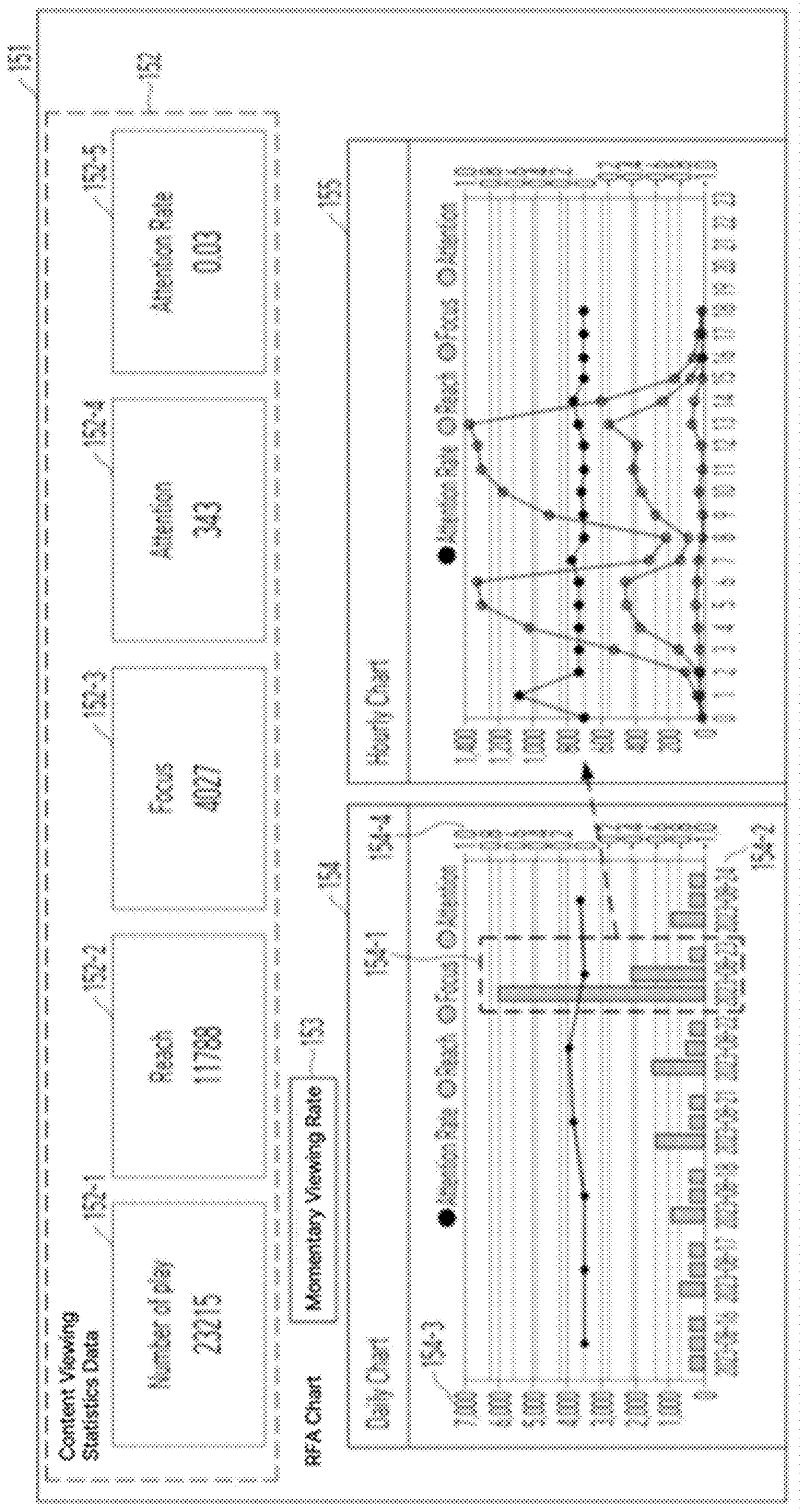
FIG. 16C is a diagram showing a second user interface that incorporates content viewing statistics data, according to an embodiment of this disclosure.

FIG. 16C illustrates a second user interface that includes content viewing statistical data, according to one embodiment of this disclosure.

In one embodiment, the Computing Device (100) can provide a Second User Interface (151) that includes content viewing statistical data. This interface features a Third Area (152), which displays a second graph. This graph includes the Third Axis (154-2), representing the output dates of the content, and the Fourth Axes (154-3, 154-4), representing content viewing statistical data. In addition, it incorporates a second graph object that illustrates content viewing statistical data corresponding to each output date of the content. For example, in the second graph, the Third Axis (154-2) functions as the horizontal axis, while the Fourth Axes (154-3, 154-4) function as the vertical axes. The content viewing statistical data by output date could represent the data calculated for multiple dates on which the content was displayed.

In one embodiment, the Second User Interface (151) also includes a Sixth Area (153) that displays a button object for receiving user inputs. The Computing Device (100) is capable of acquiring user inputs such as touches or clicks through this button object. Based on user input, the Computing Device (100) can then provide the First User Interface.

In one embodiment, the content viewing statistical data can include several metrics: the number of content playbacks, the number of people within the target area displayed in a sequence of images that includes this area, the number of first viewers who watched the content, the number of second viewers who watched the content for a predetermined duration, and the content's attention level. These sequential images may include the first image captured by Signage (1000). The Third Area (152), designated for displaying content viewing statistical data, is divided into several sections: Area (152-1) for the number of content playbacks, Area (152-2) for the number of people, Area (152-3) for the number of first viewers, Area (152-4) for the number of second viewers, and Area (152-5) for the attention level of the content. This content viewing statistical data can be updated as the content is repeatedly displayed by Signage (1000). The Computing Device (100) is capable of acquiring updated content viewing statistical data from sequential images captured as the content is repeatedly displayed by Signage (1000).

In one embodiment, the Fourth Axes (154-3, 154-4) comprise the Fourth-1 Axis (154-3), which displays the number of people within the target area, the number of first viewers per output date, and the number of second viewers per output date who watched the content for a predetermined duration, all derived from sequential images that include the target area. The Fourth-2 Axis (154-4) displays the attention level per output date of the content. Since the numbers of people, first viewers, and second viewers per output date are calculated as integers, while the attention level per output date is calculated as a ratio of integers, the corresponding graph objects are displayed with distinct vertical axes for the Fourth-1 Axis (154-3) and the Fourth-2 Axis (154-4).

In one embodiment, the second graph object may include various graph objects that represent the number of people per output date, the number of first viewers per output date, the number of second viewers per output date, and the attention level per output date. As shown in FIG. 16C, the graph objects for the number of people, first viewers, and second viewers per output date are formatted as bar graphs. In contrast, the graph object for the attention level per output date is formatted as a line graph, which connects the attention levels across different dates.

In one embodiment, within the Third Area (152), if a User Selected Area (154-1) corresponding to a second user selection input coincides with the second graph object, a third graph can be displayed in the Fifth Area (155) of the Second User Interface (151). This third graph includes a Fifth Axis, representing the output times of the content within the content's output date, and a Sixth Axis, representing content viewing statistical data. In addition, it features a third graph object that depicts the content viewing statistical data at each output time. For example, the Fifth Axis could serve as the horizontal axis of the third graph, while the Sixth Axis could serve as the vertical axis. The Fifth and Sixth Axes may correspond to the Third Axis (154-2) and Fourth Axes (153-3, 154-4) of the second graph, respectively. Content viewing statistical data by output time could be calculated hourly, and the content viewing statistical data by output date could be the sum of the content viewing statistical data for each output time within that date.

In one embodiment, the Computing Device (100) can acquire a second point corresponding to a second user selection input through the second graph object. Users can select any point within the area that contains the second graph object, which corresponds to a specific output date, by clicking or touching. The Computing Device (100) captures this click or touch input and determines the User Selected Area (154-1) that includes the second graph object associated with a specific output date. The device can then ascertain the output date corresponding to the User Selected Area (154-1). This feature allows content providers to easily verify content viewing statistical data for each output time within that date, achieving a significant technical effect.

Referring to FIG. 16C, the Computing Device (100) can acquire a second user selection input corresponding to the date of Aug. 23, 2023. The Area (154-1) corresponding to this second user selection input can include the second graph object associated with the date of Aug. 23, 2023. Based on the second user selection input, a third graph can be displayed in the Fifth Area (155) of the Second User Interface (151). This third graph includes a third graph object that represents the content viewing statistical data for each output time on Aug. 23, 2023.

In one embodiment, the Sixth Axis included in the Fifth Area (155) represents various metrics related to content viewership at each output time within the target area, as depicted in sequential images. This axis includes the Sixth-1 Axis, which details the number of people, the number of first viewers who watched the content, and the number of second viewers who watched the content for a specified duration. In addition, the Sixth-2 Axis represents the attention level at each output time. Since the numbers of people, first viewers, and second viewers at each output time are calculated as integers, while the attention level is calculated as a ratio of integers, their corresponding graph objects utilize different vertical axes for the Sixth-1 Axis and Sixth-2 Axis.

In one embodiment, the third graph object includes graph objects that represent the number of people at each output time, the number of first viewers at each output time, the number of second viewers at each output time, and the attention level at each output time. Referring to FIG. 16C, the graph objects for the number of people, first viewers, second viewers, and attention levels at each output time are formatted as line graphs that connect values over time.

Figure 17A:
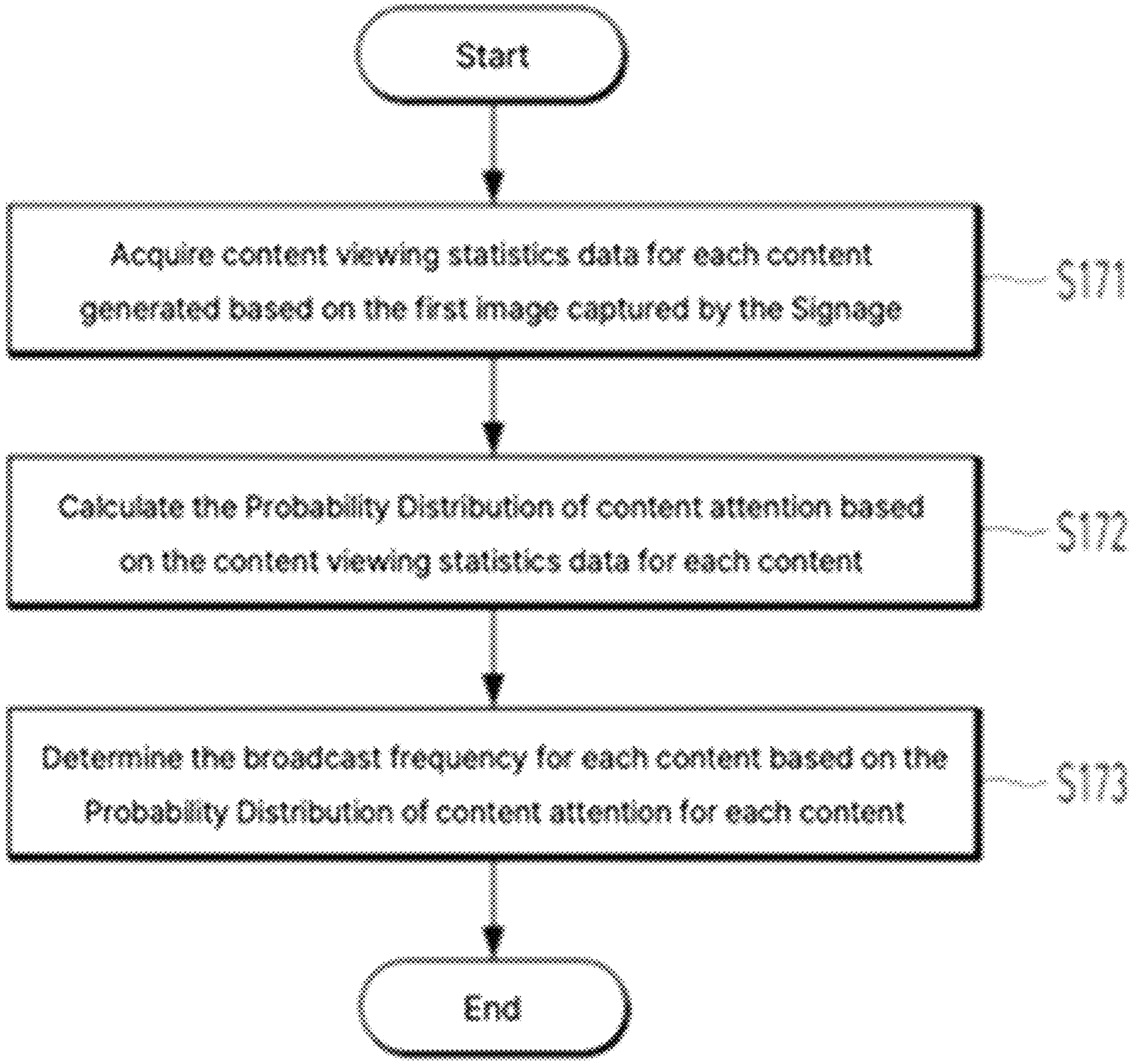
FIG. 17A is a flowchart illustrating a method for determining the broadcasting frequency of content, according to an embodiment of this disclosure.

FIG. 17A is a flowchart illustrating a method for determining the frequency of content delivery according to one embodiment of this disclosure. In this context, the term 'delivery' of content at Signage (1000) is synonymous with the 'output' of content at Signage (1000).

In step S171, the Computing Device (100) can acquire content viewing statistical data for each piece of content generated based on the first image captured by Signage (1000). This first image may serve to assess interactions between multiple pieces of content displayed by Signage (1000) and various objects within that image. For instance, these interactions could include determining whether objects are paying attention to the content. In addition, interactions may also involve assessing the response of objects based on their gender or age relative to the broadcast content.

In one embodiment, the Computing Device (100) can acquire content viewing statistical data for each piece of content based on a sequence of images that includes the first image. For example, the Computing Device (100) might update the content viewing statistical data by aggregating viewing statistics from each frame of a video captured by Signage (1000).

In one embodiment, Signage (1000) is capable of outputting multiple pieces of content. For instance, Signage (1000) could display the first, second, and third pieces of content according to their respective broadcast frequencies. If the broadcast frequency of the third content is the highest, it may result in a higher number of plays during a specified period compared to the first and second content.

In one embodiment, the content viewing statistical data may include the number of objects within the target area shown in the first image, the number of first viewers who watched the content, the number of second viewers who watched the content for a specified duration, and the attention level of the content. The methods for calculating the number of objects, first viewers, and second viewers are consistent with those previously described, so further explanation is omitted here.

In one embodiment, the attention level of the content could represent the likelihood that an object will pay attention to the content. This attention level might be calculated as the ratio of the number of second viewers to the number of objects within the target area in the first image, effectively representing the proportion of objects that are actively paying attention to the content. Alternatively, the attention level could be calculated as the ratio of the number of second viewers to the number of first viewers, indicating the proportion of engaged viewers among those who noticed the content. Another method could calculate the attention level as the ratio of the number of first viewers to the number of objects in the target area in the first image, illustrating the proportion of objects that noticed the content.

In step S172, the Computing Device (100) can calculate the probability distribution of attention levels for multiple pieces of content based on the content viewing statistical data for each piece. In one embodiment, as the content is repeatedly played, the Computing Device (100) can determine the probability distribution of how likely various objects are to pay attention to each piece of content.

In one embodiment, the Computing Device (100) can acquire the probability distribution of attention levels for multiple pieces of content based on their broadcast time slots. These slots could be predefined periods such as morning, noon, evening, night, and early morning when the content is broadcast. For instance, the demographic profile of the audience, such as occupation groups, gender ratio, age groups, main groups, and population density in the target area, may vary by time slot. Therefore, even if the same content is broadcast, the attention level could differ depending on whether it is shown in the morning, at noon, in the evening, at night, or early in the morning.

In one embodiment, the Computing Device (100) can acquire content viewing statistical data for each piece of content broadcast during a first broadcast time slot. This slot could encompass periods such as morning, noon, evening, night, or early morning. Using the content viewing statistical data, the Computing Device (100) is able to calculate the mean and standard deviation values for the attention levels of the multiple pieces of content. It can then use these values to calculate the probability distribution of attention levels for each piece of content. These probability distributions of attention levels for each piece of content are associated with the predefined broadcast time slots. This allows the Computing Device (100) to acquire the probability distribution of attention levels for each piece of content corresponding to each broadcast time slot. This functionality enables content providers to effectively schedule the broadcasting frequency of content that attracts higher attention during specific time slots, thereby achieving a significant technical effect.

In one embodiment, the Computing Device (100) can acquire the probability distribution of attention levels for multiple pieces of content based on their broadcast locations. The term "broadcast location" refers to the place where Signage (1000) is installed, specifically the target area where the content is displayed. For instance, Signage (1000) could be located in various settings such as exhibitions, stores, business districts, residential areas, or commercial areas. The demographic profile of the audience, such as occupation groups, gender ratio, age groups, main groups, and population density within the target area, can vary by location. As a result, even if the same content is broadcast, the attention it receives can differ significantly depending on whether it is shown at an exhibition, in a store, or in a business district.

In one embodiment, the Computing Device (100) can acquire content viewing statistical data for each piece of content. Using this data, the Computing Device (100) can calculate the mean and standard deviation values for the attention levels of multiple pieces of content. With these mean and standard deviation values, the device can then calculate the probability distribution of attention levels for each piece of content. In this scenario, the probability distributions of attention levels for each piece of content would correspond to the installation locations of Signage (1000). Thus, the Computing Device (100) can acquire the probability distribution of attention levels for each piece of content corresponding to the installation (or broadcast) locations of Signage (1000).

In one embodiment, the Computing Device (100) can acquire content viewing statistical data from multiple signages, including Signage (1000). Using this data, the device can acquire the probability distribution of attention levels for each piece of content based on the installation locations of each signage. This capability enables content providers to effectively adjust the broadcasting frequency of content to enhance its impact in locations where it garners the most attention, thereby achieving a significant technical effect.

In one embodiment, the Computing Device (100) can acquire content viewing statistical data for multiple pieces of content, each corresponding to specific broadcast time slots and locations. For example, the Computing Device (100) is able to calculate content viewing statistical data for each piece of content based on its broadcast location and various time slots. This capability enables content providers to effectively tailor their content exposure based on broadcasting frequency, taking into account both the time and location of the broadcast.

In one embodiment, the Computing Device (100) utilizes the Thompson Sampling algorithm to acquire the probability distribution of attention levels for each piece of content. The probability distribution of content attention levels may adhere to distributions such as the beta distribution or the normal distribution. For a detailed explanation of how the Thompson Sampling algorithm is used to obtain the probability distribution of content attention levels, please refer to FIG. 17B.

In step S173, the Computing Device (100) can determine the broadcast frequency for each piece of content based on the probability distribution of their attention levels. In one embodiment, the Computing Device (100) sets the broadcast frequency for each piece of content based on the average values of the content attention levels. For instance, the Computing Device (100) may increase the broadcast frequency of content as its average attention level increases. In addition, as the content is broadcast and attention levels change, the Computing Device (100) can update the probability distribution of attention levels for each piece of content to reflect these variations.

In one embodiment, content viewing statistical data can include at least one of the following attributes about multiple objects: gender ratio, age group, and attire. For example, the Computing Device (100) is capable of acquiring tracking information for each object. Subsequently, the device can gather characteristic information related to each object's gender, age, attire, and group information from their tracking data. Based on this characteristic information, the Computing Device (100) can determine the gender ratio, age group, predominant attire, and main groups of these objects. Using this data, the device can then decide the broadcast frequency for each piece of content based on the probability distribution of content attention levels, as well as at least one attribute such as gender ratio, age group, predominant attire, and main groups of the objects.

For example, if Signage (1000) displays the first and second pieces of content, and the first image captured by Signage (1000) shows a higher percentage of males among the objects, the Computing Device (100) can classify the first content, which has a higher attention level, as targeted towards males. Conversely, if the first image captured by Signage (1000) shows a higher percentage of females among the objects, and the second content achieves a higher attention level compared to the first, the Computing Device (100) can classify the second content as targeted towards females.

As another example, if the first image captured by Signage (1000) includes multiple objects in the toddler age group, the Computing Device (100) can determine that the first content, which has a higher attention level than the second content, is targeted towards toddlers. In addition, if the first image captured by Signage (1000) includes multiple objects in the middle-aged group, the Computing Device (100) can determine that the second content, which has a higher attention level than the first content, is targeted towards middle-aged individuals.

As another example, if the first image captured by Signage (1000) shows multiple objects predominantly wearing business attire, the Computing Device (100) can determine that the first content, which has a higher attention level than the second content, is targeted towards working professionals. Moreover, if the first image captured by Signage (1000) shows multiple objects predominantly wearing school uniforms, the Computing Device (100) can determine that the second content, which has a higher attention level than the first content, is targeted towards students.

As another example, if the first image captured by Signage (1000) includes multiple objects where the main group is families, the Computing Device (100) can determine that the first content, which has a higher attention level than the second content, is targeted towards families. In addition, if the first image captured by Signage (1000) includes multiple objects where the main group is couples, the Computing Device (100) can determine that the second content, which has a higher attention level than the first content, is targeted towards couples.

In one embodiment, the Computing Device (100) can determine the broadcast frequencies for multiple pieces of content to be displayed on Signage (1000), based on characteristic information derived from multiple objects in the first image captured by Signage (1000). In addition, the Computing Device (100) can set the broadcast frequencies for multiple pieces of content on other signages, using the frequencies determined from that first image. These decisions are made based on attributes such as the gender ratio, age group, predominant attire, and main groups of the objects displayed on each signage.

In one embodiment, the Computing Device (100) can determine the broadcast frequencies for multiple pieces of content across various signages included in Signage (1000), based on characteristic information from multiple objects in images captured by these signages. The broadcast frequency for each piece of content on each signage can be decided based on attributes like the gender ratio, age group, predominant attire, and main groups of the objects exposed in the images captured by each signage.

Figure 17B:
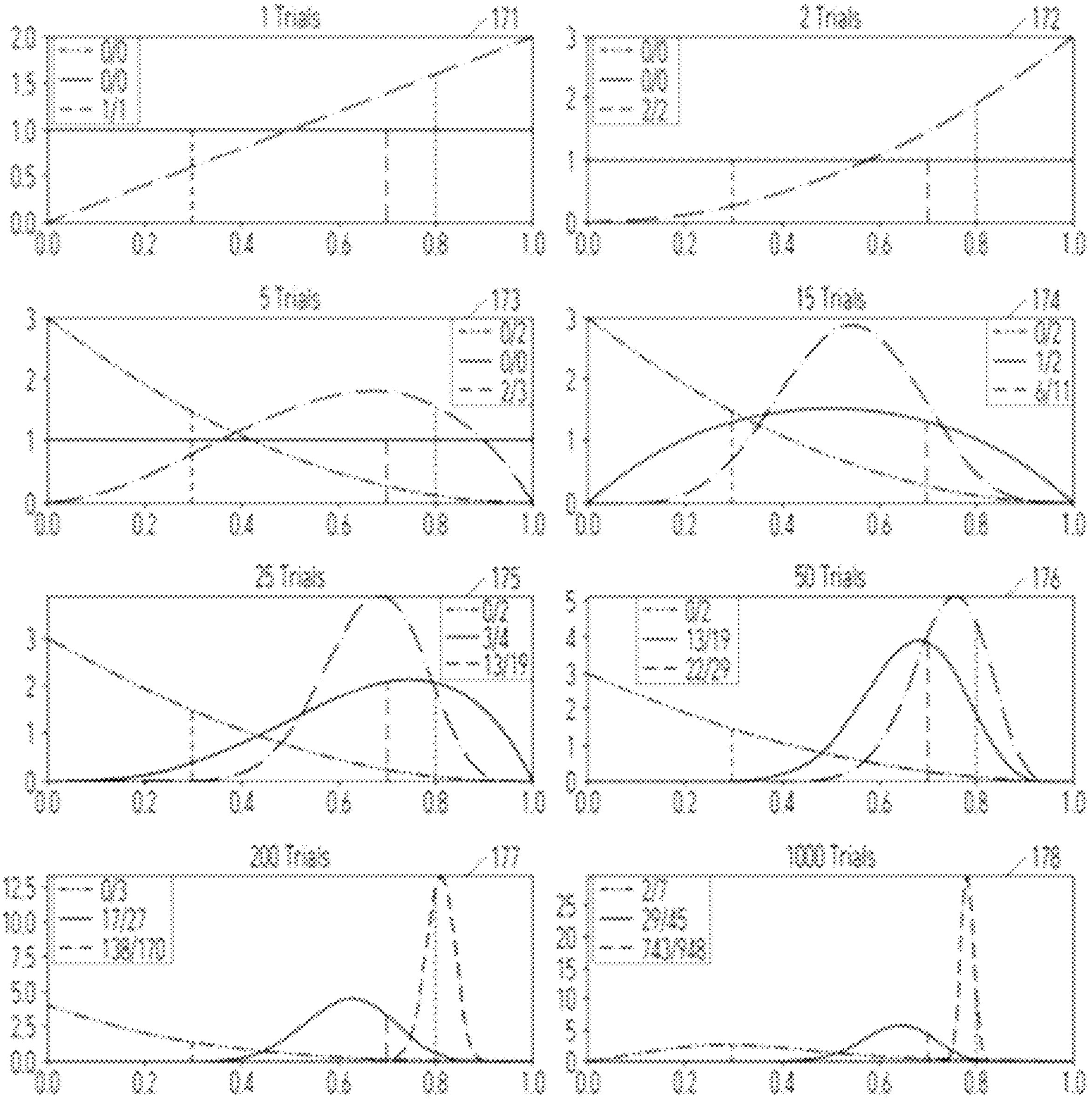
FIG. 17B is a diagram illustrating the process of obtaining the probability distribution of attention to content, according to an embodiment of this disclosure.

FIG. 17B illustrates the process of acquiring the probability distribution of content attention levels according to one embodiment of the disclosure.

In one embodiment, Signage (1000) can broadcast multiple pieces of content, including the first, second, and third pieces. If these pieces are not broadcast sufficiently and the probability distribution is calculated with a limited sample, the content preferences of multiple objects may not be fully reflected in the broadcast frequencies of the content. Therefore, using the Thompson Sampling algorithm, the Computing Device (100) can select one piece of content to be displayed on Signage (1000). Once the content has been broadcast more than a preset number of times, the device can determine the broadcast frequencies for each piece of content.

In one embodiment, the Thompson Sampling algorithm calculates the probability distribution of content attention levels using a beta distribution for each piece of content. It involves drawing a random sample for each piece and updating the probability distribution by broadcasting the content that corresponds to the sample with the highest attention level. Each beta distribution for the pieces of content can have two parameters: one for instances where the content is watched, and another for instances where it is not. Being watched could mean that the content is either observed or attentively watched. The Computing Device (100) acquires content viewing statistical data based on sequential images, including the first image, and updates the beta distribution based on the number of objects, the number of first viewers, and the number of second viewers in the target area derived from each image. Subsequently, the Computing Device (100) can increase the broadcast frequency for each piece of content based on the average attention level obtained from each content's beta distribution.

For example, if content attention is calculated by dividing the number of second viewers by the number of objects in the target area within the first image, the content's beta distribution could be Beta(a+1, b+1), where 'a' represents the number of second viewers, and 'b' is the difference between the number of objects and the number of second viewers. Another example is if content attention is calculated by dividing the number of second viewers by the number of first viewers, the content's beta distribution could be Beta(a+1, b+1), where 'a' represents the number of second viewers, and 'b' is the difference between the number of first viewers and the number of second viewers. In addition, if content attention is calculated by dividing the number of first viewers by the number of objects in the target area within the first image, the content's beta distribution could be Beta(a+1, b+1), where 'a' is the number of first viewers, and 'b' is the difference between the number of objects and the number of first viewers.

In one embodiment, Signage (1000) can repeatedly broadcast multiple pieces of content based on the Thompson Sampling algorithm, which allows for the updating of the probability distribution of content attention levels. For example, using the Thompson Sampling algorithm, the Computing Device (100) can determine which piece of content will be displayed next on Signage (1000). The Computing Device (100) can then transmit information about the selected content to Signage (1000).

Referencing FIG. 17B, the probability distribution of content attention for an arbitrary first object, based on the number of broadcasts of the first, second, and third pieces of content, is illustrated. In each probability distribution shown in FIG. 17B, the horizontal axis represents the number of times the first object has attended to the content relative to the number of content broadcasts, and the vertical axis may represent the probability density function value of the distribution. In the example shown in FIG. 17B, content attention is calculated as the ratio of content attendance occurrences to the number of content broadcasts. For simplicity, the example in FIG. 17B explains the process of acquiring the probability distribution by depicting a scenario where each broadcast exposes the content to one first object at a time. However, this is merely an illustrative example; the Computing Device (100) is capable of acquiring the probability distribution of content attention across multiple objects using the Thompson Sampling algorithm.

Referring to FIG. 17B, in the Probability Distribution (171) corresponding to a single broadcast, the third content is broadcast once, and the first object may pay attention to it. In some scenarios, the first object might have simply watched or attentively watched the third content. The Computing Device (100) can draw samples for each piece of content and decide to rebroadcast the third content. In the Probability Distribution (172) corresponding to two broadcasts, the third content is broadcast twice, and the first object may pay attention to it twice. In one instance, the Computing Device (100) can draw samples for each piece of content after each broadcast to determine which content will be broadcast next. In another instance, if the number of broadcasts of content reaches a preset limit, the Computing Device (100) can then start drawing samples for each piece of content to decide the next content to be broadcast.

In the Probability Distribution (173) corresponding to five broadcasts, the first content is broadcast twice, and the third content may be broadcast three times. In this scenario, the first object may not pay attention to the first content but may pay attention to the third content twice. As multiple contents are broadcast from Signage (1000), the Computing Device (100) can acquire Probability Distributions corresponding to 15 broadcasts (174), 25 broadcasts (175), 50 broadcasts (176), 200 broadcasts (177), and 1000 broadcasts (178). As the number of content broadcasts increases, the average attention level for the third content by the first object could be the highest. Based on the probability distribution of content attention, the Computing Device (100) can increase the broadcast frequency of the third content. The broadcast frequencies for various contents may be highest for the third content, followed by the second and then the first content.

Figure 18A:
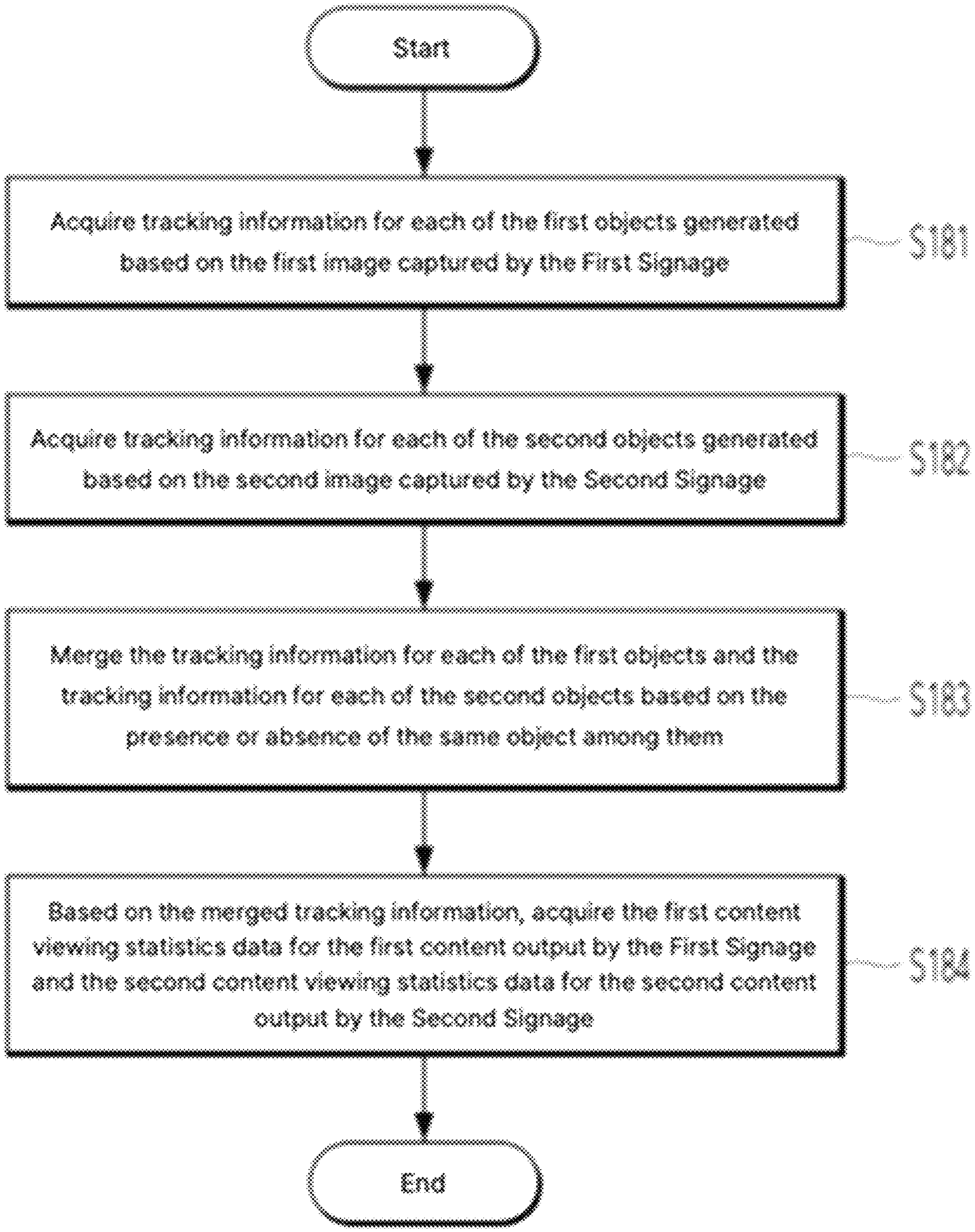
FIG. 18A is a flowchart illustrating a method for acquiring content viewing statistics data from multiple signages, according to an embodiment of this disclosure.

FIG. 18A illustrates a flowchart for acquiring content viewing statistical data from multiple signages according to one embodiment.

The Computing Device (100) can acquire content viewing statistical data from multiple signages, including the first Signage (1000). In FIG. 18A, the first Signage (1000) can correspond to the Signage (1000) shown in FIG. 1. In addition, the group of signages, including the first and second signages, can incorporate the same configurations as the Signage (1000) in FIG. 1. Each of the multiple signages may display different or the same content. Furthermore, the target areas of the multiple signages may overlap or not overlap at all. Also, some objects within the target areas captured in images by the signages may be the same. For simplicity, FIG. 18A focuses on an example where the Computing Device (100) acquires content viewing statistical data from both the first Signage (1000) and the second signage. However, this is merely illustrative; the Computing Device (100) can perform the steps described in FIG. 18A to acquire content viewing statistical data from these signages for multiple signages as well.

At step S181, the Computing Device (100) can acquire tracking information for each of several first objects based on the first image captured by the first Signage (1000). This first image is intended to determine interactions between the first content displayed by the first Signage (1000) and multiple first objects within it. The descriptions of tracking information for the multiple first objects are consistent with previously discussed examples; therefore, further details are omitted here.

At step S182, the Computing Device (100) can acquire tracking information for each of several second objects based on the second image captured by the second signage. This second image is intended to analyze interactions between the second content displayed by the second signage and multiple second objects within it. Descriptions of tracking information for each of the multiple second objects align with previously discussed examples, and therefore further explanation is omitted here.

At step S183, the Computing Device (100) can merge the tracking information of multiple first objects with that of multiple second objects based on whether some objects are identical across both groups. For example, if the same object is captured by both the first Signage (1000) and the second signage, the Computing Device (100) can acquire two sets of tracking information for the same object from both signages. As a result, the Computing Device (100) can merge these two sets of tracking information into one comprehensive set. In scenarios where the Computing Device (100) acquires multiple sets of tracking information for the same object from multiple signages, it can consolidate them into a single set of tracking information. This merged tracking information can include both sets of tracking information for the same object from both the multiple first objects and the multiple second objects.

In one embodiment, the Computing Device (100) can determine whether identical objects exist based on the feature vector corresponding to each object. The tracking information for an object may include a feature vector associated with that object. The Computing Device (100) can assess the presence of identical objects among multiple first and second objects by evaluating the vector similarity between the feature vectors of the first objects and the second objects. For instance, if the similarity between the feature vectors of the multiple first and second objects exceeds a predefined threshold, the Computing Device (100) can identify the same objects among them. Based on this determination, the Computing Device (100) can merge the tracking information of the identified identical objects, where merging involves combining the tracking information of these objects into a single unified set of tracking information.

In one embodiment, the Computing Device (100) can determine the presence of identical objects based on their location information. The tracking information for an object may include its location data. The Computing Device (100) can convert the location information of multiple first objects from the coordinate system of the first Signage (1000) to an absolute coordinate system. In this context, the coordinate system of the first Signage (1000) refers to the coordinate system of the camera embedded within the first Signage (1000). The absolute coordinate system represents a unified coordinate framework used across multiple signages. For example, the location information of the same object recorded at the first Signage (1000) and the second signage might differ when expressed in the coordinate systems of the respective signages. However, when translated to the absolute coordinate system, the location information for the same object would be identical. The Computing Device (100) can similarly convert the location information of multiple second objects from the coordinate system of the second signage to the absolute coordinate system.

In one embodiment, the Computing Device (100) can determine whether identical objects exist among multiple first and second objects based on their transformed location information. The transformed location information for both sets of objects is measured using an absolute coordinate system. The Computing Device (100) can identify identical objects by checking if there is matching location information in this absolute coordinate system. Based on the results of this identification, the Computing Device (100) can merge the tracking information of identified identical objects from both the first and second sets.

At step S184, based on the merged tracking information, the Computing Device (100) is able to acquire content viewing statistics for content displayed by the first Signage (1000) and the second signage. In one embodiment, the Computing Device (100) can collect content viewing statistics based on the gaze information of the objects. The tracking information of the objects may include their gaze data. Using the merged tracking information, the Computing Device (100) can obtain viewing statistics for both the first and second content, based on the gaze data from multiple first and second objects.

In one embodiment, the first content viewing statistics may include the number of first objects within the first target area shown in the first image, the number of first viewers who watched the first content, the number of second viewers who watched the first content for a specified duration, and the attention level of the first content. In addition, the second content viewing statistics may include the number of second objects within the second target area shown in the second image, the number of third viewers who watched the second content, the number of fourth viewers who watched the second content for a specified duration, and the attention level of the second content.

In one embodiment, if the first and second contents are the same, the first and second content viewing statistics can be combined into a single set of content viewing statistics. For example, this combined content viewing statistics might include the total number of objects (the sum of first and second objects), the total number of viewers (the sum of first and third viewers), the total number of viewers who watched for a specified duration (the sum of second and fourth viewers), and a combined attention level for the content (the sum of the attention levels for the first and second content).

In one embodiment, the number of third objects can be calculated as the sum of the number of first objects and second objects. Alternatively, the number of third objects might be the sum of the number of first objects and second objects minus the number of objects identified as identical. When calculating the number of third objects by adding the number of first and second objects, objects identified as identical can be included in both counts, potentially being counted twice. Therefore, to ensure that objects identified as identical are only included once in the count of third objects, the number of these objects can be subtracted from the combined total of first and second objects.

In one embodiment, the number of first viewers can be calculated based on the eye-tracking information obtained from each of the multiple first objects from the first image, and the number of third viewers can be calculated based on the eye-tracking information from each of the multiple second objects from the second image.

In one embodiment, the number of first viewers is determined based on whether each of the multiple first objects is observing the content, and the number of third viewers is based on the observation status of each of the multiple second objects. Whether an object is observing the content may depend on whether at least one of the object's yaw or pitch angles satisfies a first condition for determining observation status. An example of this first condition may include the object's yaw angle and pitch angle being within a present range of the first and second angles, respectively.

In one embodiment, each signage may include a display unit that outputs content and a camera unit that captures the target area where the content is exposed. For each signage, the predetermined first standard angle range and the second standard angle range can be determined based on at least one of the location, size of the display unit, and the position of the camera unit. Therefore, the first condition for determining whether content is being watched can vary among the multiple signages.

In one embodiment, the number of second viewers is calculated based on the eye-tracking information obtained from each of the multiple first objects from sequential images that include the first image. Similarly, the number of fourth viewers is calculated based on the eye-tracking information from sequential images that include the second image.

In one embodiment, the number of second viewers is calculated based on whether each of the multiple first objects is intently watching the content, and the number of fourth viewers is based on whether each of the multiple second objects is intently watching the content. The determination of whether an object is intently watching the content may depend on whether at least one of the object's yaw or pitch angles meets a second condition for determining intense observation. This second condition might involve the object's yaw angle being within a predetermined third standard angle range and the pitch angle within a predetermined fourth standard angle range.

In one embodiment, the third standard angle range of the second condition may be narrower than the first standard angle range of the first condition, and the fourth standard angle range of the second condition may be narrower than the second standard angle range of the first condition. This arrangement allows the second condition, which assesses the intensity of content engagement, to be set more strictly than the first condition, which determines if content is being watched.

In one embodiment, the number of second viewers for both the multiple first objects and the multiple second objects can be calculated using a queue that records the content-watching times corresponding to each of the multiple first and second objects. The method for calculating the number of second viewers using a queue that records content-watching times is the same as the method previously described in FIG. 7 for calculating the number of second viewers; thus, further details are omitted here.

Figure 18B:
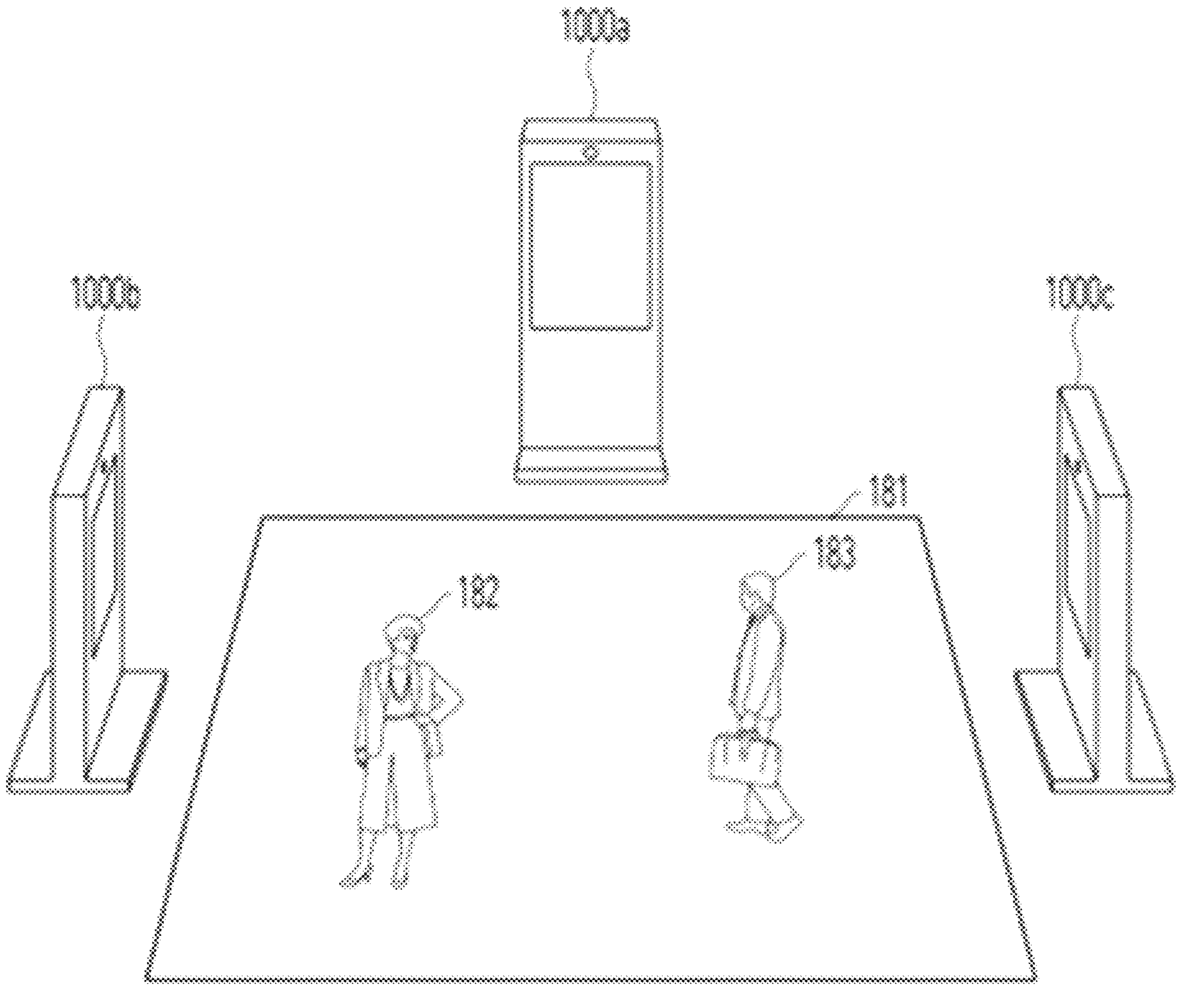
FIG. 18B is a diagram depicting an exemplary environment with multiple signages installed, according to an embodiment of this disclosure.

FIG. 18B illustrates an exemplary environment featuring multiple signages installed according to one embodiment of the disclosure.

In one embodiment, referring to FIG. 18B, First Signage (1000*a*), Second Signage (1000*b*), and Third Signage (1000*c*) can all be oriented towards the same Target Area (132). For instance, images captured by First Signage (1000*a*), Second Signage (1000*b*), and Third Signage (1000*c*) may each include the same Target Area (132). The images captured by these Multiple Signage Units (1000*a*, 1000*b*, 1000*c*) might contain Fourth Object (182) and Fifth Object (183) within the same Target Area (132). The Computing Device (100) can acquire tracking information for multiple objects based on the images captured by each of these Multiple Signage Units (1000*a*, 1000*b*, 1000*c*). Specifically, the Computing Device (100) could obtain tracking information for multiple first objects from First Signage (1000*a*), for multiple second objects from Second Signage (1000*b*), and for multiple third objects from Third Signage (1000*c*). Each group of these multiple first, second, and third objects could include Fourth Object (182) and Fifth Object (183). The Computing Device (100) has the ability to merge three sets of tracking information corresponding to Fourth Object (182) into one tracking record for Fourth Object (182). Similarly, it can merge three sets of tracking information corresponding to Fifth Object (183) into one comprehensive tracking record for Fifth Object (183).

Figure 19:
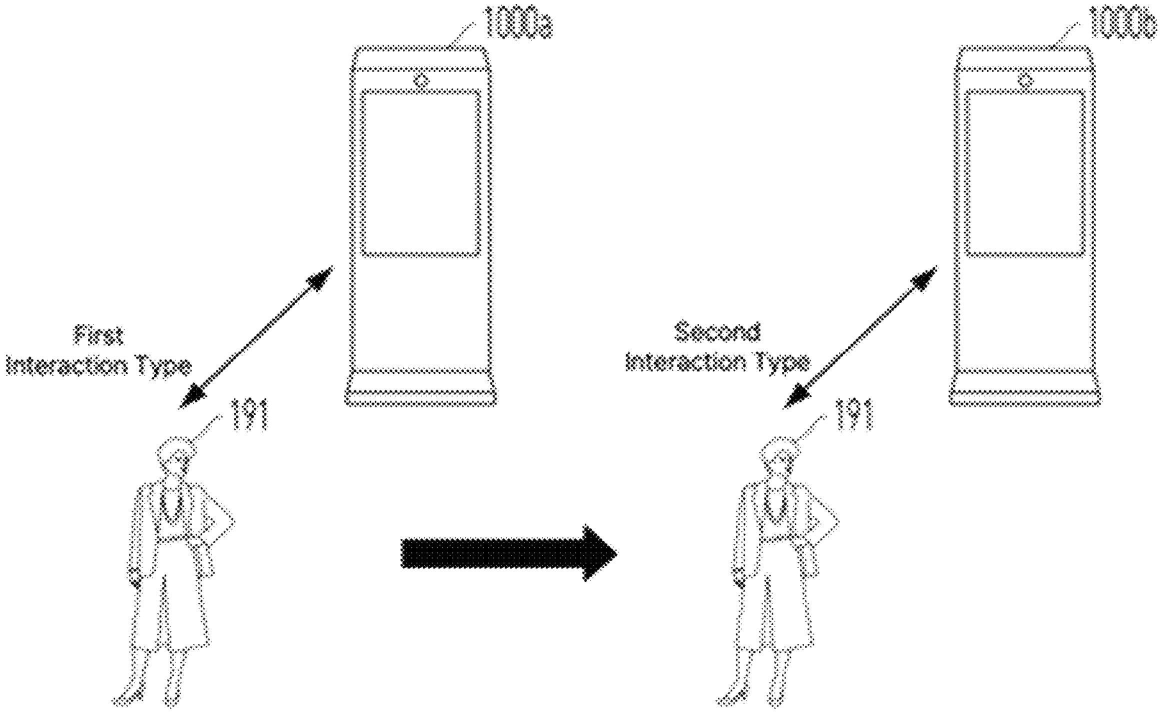
FIG. 19 is a diagram illustrating the process of interaction between signage and objects, according to an embodiment of this disclosure.

FIG. 19 illustrates a diagram according to an embodiment of the disclosure, showing the interaction process between signage and objects.

In one embodiment, the Computing Device (100) can obtain tracking information for multiple objects from both the First Signage (1000*a*) and the Second Signage (1000*b*). The tracking information for the multiple first objects includes location information corresponding to each object within several sequential third images that incorporate the first image. Similarly, the tracking information for the multiple second objects includes location information corresponding to each object within several sequential fourth images that incorporate the second image. The Computing Device (100) can acquire movement information for the multiple first objects based on their location information in the sequential third images. In addition, it can acquire movement information for the multiple second objects based on their location information in the sequential fourth images.

In one embodiment, the first and second content may be the same. In this case, as objects move, the Computing Device (100) can determine the start times for broadcasting both the first and second content sequentially, allowing continuous viewing of the same content across different scenes. The Computing Device (100) can obtain location information for both the First Signage (1000*a*) and the Second Signage (1000*b*). Based on this location information, along with the movement information of the multiple first and second objects, the Computing Device (100) can decide the broadcast start times for both the first and second content.

For example, based on the location information of First Signage (1000*a*) and Second Signage (1000*b*), the distance between these two signages can be determined. In addition, by using the movement information of the multiple first and second objects, their average moving speeds can be calculated. The Computing Device (100) can then determine the appropriate start times for broadcasting the first and second content based on the distance between First Signage (1000*a*) and Second Signage (1000*b*), along with the average moving speeds of the first and second objects.

Referring to FIG. 19, Sixth Object (191) might be moving from First Signage (1000*a*) to Second Signage (1000*b*). Although only Sixth Object (191) is shown for simplicity, multiple objects can be exposed to the content. If the first content displayed by First Signage (1000*a*) and the second content displayed by Second Signage (1000*b*) are the same, Computing Device (100) can determine the broadcast start times for both content instances based on the movement information of Sixth Object (191). For instance, the Computing Device (100) might delay the start time for broadcasting the second content compared to the first content. This arrangement allows Sixth Object (191) to view the first and second content as a continuous scene.

In one embodiment, based on the location information of First Signage (1000*a*) or Second Signage (1000*b*), the interaction types between the same object and the first content, as well as the second content, can be linked. These interaction types can vary. For instance, if First Signage (1000*a*) and Second Signage (1000*b*) are located at an exhibition's entrance and exit, respectively, and if Sixth Object (191) is detected by First Signage (1000*a*), it may display the first content that includes a greeting. Here, the first interaction type corresponds to a greeting. Conversely, if Sixth Object (191) is detected by Second Signage (1000*b*), Second Signage (1000*b*) may display second content that includes a feedback request for the exhibition. In this case, the second interaction type corresponds to a feedback request.

As another example, if First Signage (1000*a*) and Second Signage (1000*b*) are situated at the entrance and exit of a store, respectively, and if Sixth Object (191) is detected by First Signage (1000*a*), it can display first content that includes product recommendations. This first interaction type would correspond to product recommendations. First Signage (1000*a*) can output first content recommending preferred products, determined based on the tracking information of Sixth Object (191) included in the first image. For example, Computing Device (100) can decide which products to recommend to Sixth Object (191) based on at least one characteristic such as gender, age, or attire included in Sixth Object (191)'s feature information. Computing Device (100) can determine the preferred products for Sixth Object (191) based on the preferences of other objects with the same gender, similar age group, and similar attire.

In addition, if the Sixth Object (191) is detected at Second Signage (1000*b*), Second Signage (1000*b*) may display second content that includes a feedback request about the store. In this case, the second interaction type could be a feedback request about the store. Alternatively, if the Sixth Object (191) is detected by Second Signage (1000*b*), Second Signage (1000*b*) may display second content that includes a feedback request regarding a purchased item. In this case, the second interaction type could be a feedback request about the purchased item.

According to one embodiment of the disclosure, a computer-readable medium storing a data structure is disclosed. The data structure may refer to the organization, management, and storage of data that enables efficient access and modification. The data structure can refer to the organization of data to solve specific problems, such as searching, storing, or modifying data in the shortest possible time. Data structures may be defined by physical or logical relationships between data elements, designed to support specific data processing functions. Logical relationships between data elements can include connections between user-defined data elements. Physical relationships may include the actual relationships between data elements physically stored on a computer-readable storage medium, such as permanent storage devices. Data structures may specifically include collections of data, relationships between data, and functions or commands that can be applied to the data. Through effectively designed data structures, Signage (1000) and Computing Device (100) can perform operations while minimizing the use of resources. Specifically, Signage (1000) and Computing Device (100) can enhance the efficiency of operations, reading, insertion, deletion, comparison, exchange, and search through effectively designed data structures.

Data structures can be divided into linear and nonlinear types based on their form. Linear data structures consist of a sequence where each data element is directly linked to the next. This category includes lists, stacks, queues, and deques. A list can represent a series of data elements with inherent order and may include linked lists. A linked list is a data structure where each element is connected in a sequence through pointers. These pointers may contain links to the next or previous data elements. Depending on the structure, linked lists can be categorized as single, double, or circular. A stack is a data structure where access to data is restricted to one end, allowing data operations (such as insertion or deletion) only at that end (Last In, First Out—LIFO). Unlike stacks, queues allow data to exit in the order it entered (First In, First Out—FIFO). A deque is a data structure that enables data operations at both ends.

Nonlinear data structures can be those in which multiple data points are connected following a single data point. These structures may include graph data structures. A graph data structure can be defined by vertices and edges, with edges being lines that connect two different vertices. In addition, graph data structures can encompass tree data structures. A tree data structure is characterized by having only one path that connects any two different vertices among the multiple vertices included in the tree. This implies that it can be a data structure that does not form loops within the graph data structure.

Throughout this specification, the terms "computation models," "neural networks," "network functions," and "neural networks" can be used interchangeably. From now on, they will consistently be referred to as "neural networks." The data structure can include a neural network and may be stored on a computer-readable medium. This data structure, incorporating the neural network, can include preprocessed data for neural network processing, data inputs, weights, hyperparameters, data retrieved from the neural network, activation functions associated with each node or layer, and loss functions used for training. This data structure can contain any of the components mentioned above. In other words, the data structure with the neural network can consist of preprocessed data, input data, weights, hyperparameters, retrieved data, activation functions for each node or layer, loss functions for training, or any combination of these. Besides these components, the data structure containing the neural network can include any other information determining the network's characteristics. In addition, the data structure can encompass all forms of data used or generated during the neural network's operations, not limited to the discussed aspects. The computer-readable medium may include computer-readable recording media and/or transmission media. Neural networks typically consist of interconnected computing units, often referred to as nodes or neurons. A neural network comprises at least one or more of these nodes.

In one embodiment, the data structure can include data that is input into a neural network. This data structure, which contains data for the neural network, can be stored on a computer-readable medium. The data input into the neural network may consist of both training data used during the learning process and input data used after the network has been trained. This input data can comprise both preprocessed data and data that is to be preprocessed. Preprocessing may involve processing data to prepare it for input into the neural network. Therefore, the data structure can include both data that is to be preprocessed and data generated through preprocessing. The described data structure is merely illustrative and does not limit this disclosure.

The data structure can include the neural network's weights. (In this specification, "weights" and "parameters" are used interchangeably.) In addition, a data structure that includes the neural network's weights can be stored on a computer-readable medium. A neural network can include multiple weights, which may be variable and adjustable by the user or an algorithm to perform desired functions. For example, if one output node is interconnected with several input nodes through links, the output node can determine its output value based on the values entered into the linked input nodes and the weights assigned to each link. This described data structure is illustrative and is not a limitation of this disclosure.

As an illustrative example, weights can include both those that vary during the neural network training process and those finalized after training is complete. Weights that vary during training may include the initial weights at the start of a training cycle and/or weights that change throughout the cycle. Finalized weights are those established when the training cycle concludes. Thus, a data structure containing neural network weights can incorporate both variable weights during training and finalized weights post-training. This means the data structure may include the aforementioned weights and/or any combination of these weights.

A data structure containing neural network weights can be stored on a computer-readable storage medium (such as memory or a hard disk) after undergoing a serialization process. Serialization involves transforming the data structure into a form that allows it to be stored and later reconstructed for use on the same or different Signage (1000) or Computing Device (100). Signage (1000) and Computing Device (100) can serialize the data structure to transmit data over networks. The serialized data structure, including the neural network's weights, can be reconstructed on the same or a different Signage (1000) or Computing Device (100) through deserialization. The inclusion of neural network weights in a data structure is not limited to serialization. Furthermore, the data structure may incorporate other data structures designed to maximize operational efficiency while minimizing the use of resources on Signage (1000) and Computing Device (100), such as nonlinear data structures like B-Trees, Tries, m-way search trees, AVL trees, and Red-Black Trees. These details are examples and do not restrict the disclosure.

The data structure can include hyperparameters for neural networks, which can be stored on a computer-readable medium. Hyperparameters are variables that users can adjust and may include settings such as the learning rate, cost function, number of training cycles, parameters for weight initialization (e.g., setting the range of weight values), and the number of hidden units (e.g., number of layers and nodes in hidden layers). This description of the data structure is just one example; the disclosure is not limited to this example.

Figure 20:
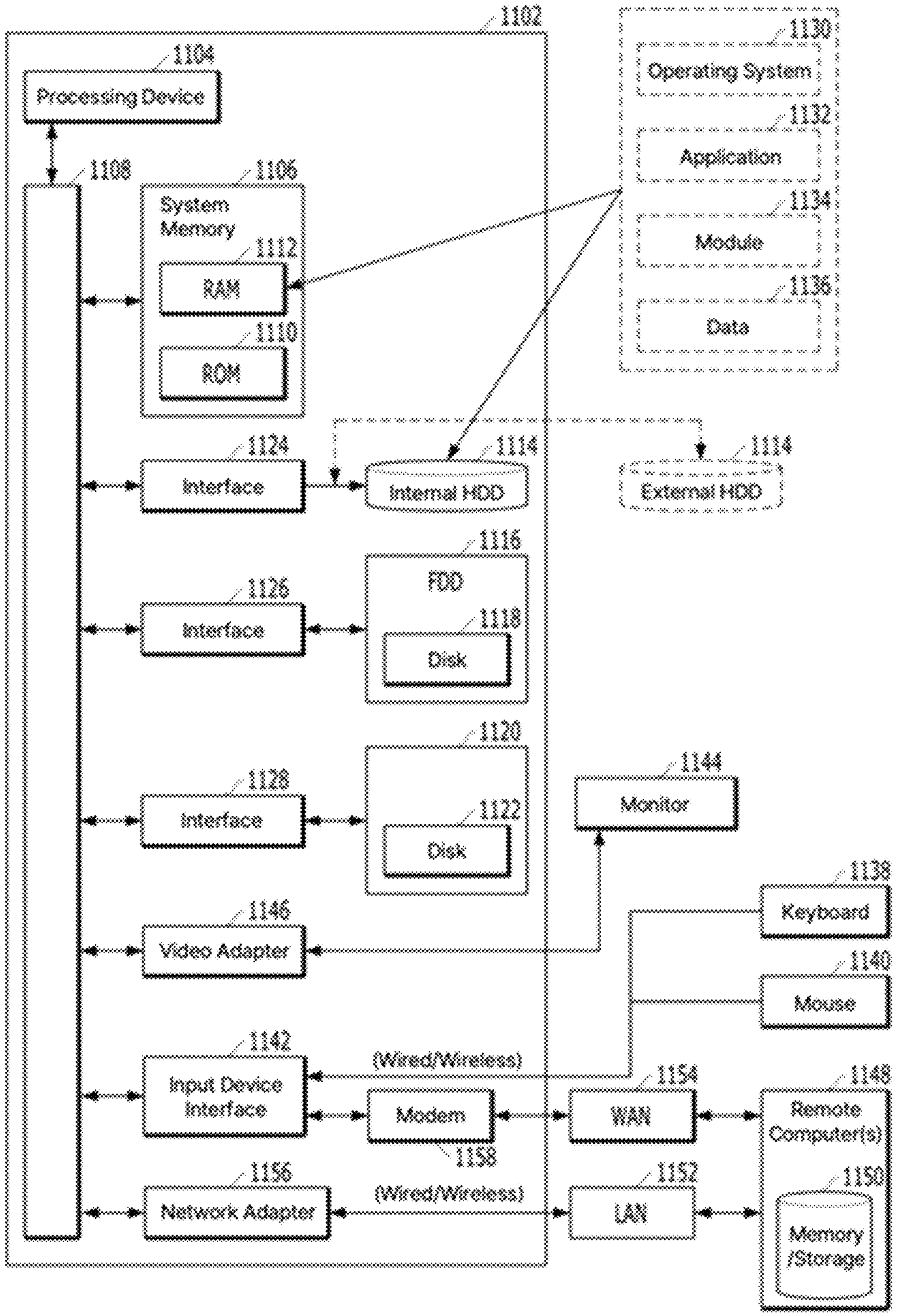
FIG. 20 is a simple and general schematic diagram of an exemplary computing environment in which the disclosed embodiments may be implemented.

FIG. 20 presents a simplified and general diagram of an exemplary computing environment where the described embodiments can be implemented.

Although this disclosure has generally been described as being implementable on Signage (1000) or Computing Device (100), those skilled in the art will recognize that it can also be executed on various computer configurations. These include single-processor or multiprocessor computer systems, minicomputers, mainframe computers, as well as personal computers, handheld computing devices, and microprocessor-based or programmable consumer electronics, each potentially connected to one or more associated devices.

Program modules generally include routines, programs, components, data structures, etc., that perform specific tasks or implement specific abstract data types. In addition, the methods of the disclosure could be practiced in distributed computing environments where tasks are performed by remote processing devices linked through a communications network. In such environments, program modules may reside in both local and remote memory storage devices.

The embodiments described may also be implemented in a distributed computing environment where certain tasks are executed by remote processing devices that are connected through a communications network. In a distributed computing environment, program modules could be located in both local and remote memory storage devices.

Computers typically include a variety of computer-readable media. These can be any media accessible by a computer and may include both volatile and non-volatile, transitory and non-transitory, removable, and non-removable media. Examples of computer-readable media encompass computer-readable storage media and computer-readable transmission media. The computer-readable storage media include any method or technology for storing information, such as computer-readable instructions, data structures, program modules, or other data. This category encompasses volatile and non-volatile, removable and non-removable media implemented in any method or technology, such as RAM, ROM, EEPROM, flash memory or other memory technology, CD-ROM, digital video disks (DVDs) or other optical disk storage, magnetic cassettes, magnetic tape, magnetic disk storage, or other magnetic storage devices, or any other medium that can be used to store desired information and accessed by a computer.

Computer-readable transmission media typically involve a modulated data signal with computer-readable instructions, data structures, program modules, or other data, including any information delivery media. The term "modulated data signal" refers to a signal in which one or more of its characteristics have been set or changed to encode information within the signal. Examples of computer-readable transmission media include wired media such as a wired network or direct-wired connection, and wireless media such as acoustic, RF, infrared, and other wireless media. Any combination of the mentioned media may also be included within the scope of computer-readable transmission media.

The Exemplary Environment (1100) depicted includes a Computer (1102) comprising a Processing Device (1104), System Memory (1106), and a System Bus (1108). The System Bus (1108) connects various system components, including, but not limited to, the System Memory (1106), to the Processing Device (1104). The Processing Device (1104) could be any of the various commercial processors and is capable of supporting dual processor or other multi-processor architectures.

The System Bus (1108) may be any of several types of bus structures that can also interconnect with a local bus, which uses any of the various commercially available bus architectures, including memory buses and peripheral buses. The System Memory (1106) includes Read-Only Memory (ROM) (1110) and Random Access Memory (RAM) (1112). The Basic Input/Output System (BIOS), stored in non-volatile memory such as ROM, EPROM, EEPROM (1110), contains fundamental routines that assist in transferring information among components within the Computer (1102) during startup and at other times. In addition, RAM (1112) may include high-speed RAM such as static RAM for data caching.

Furthermore, the Computer (1102) is equipped with an Embedded Hard Disk Drive (HDD) (1114) (e.g., EIDE, SATA)—which can also be configured for external use within an appropriate chassis (not depicted)—, a Magnetic Floppy Disk Drive (FDD) (1116) (for reading from or writing to a Removable Diskette (1118)), and an Optical Disk Drive (1120) (for reading from or recording to high-capacity optical media such as a CD-ROM DISK (1122) or DVD). The Hard Disk Drive (1114), Magnetic Disk Drive (1116), and Optical Disk Drive (1120) are each connected to the System Bus (1108) via their respective interfaces: a Hard Disk Drive Interface (1124), a Magnetic Disk Drive Interface (1126), and an Optical Drive Interface (1128). The Interface (1124) for external drive implementations includes at least one or both of the following technologies: USB (Universal Serial Bus) or IEEE 1394.

These drives and their associated computer-readable media provide non-volatile storage for data, data structures, computer-executable instructions, and other elements. For the Computer (1102), these drives and media enable the storage of any data in an appropriate digital format. Although the description of computer-readable media here refers to HDDs, removable magnetic disks, and removable optical media such as CDs or DVDs, those skilled in the art would understand that other types of media, like zip drives, magnetic tapes, flash memory cards, and cartridges, can also be utilized in the exemplary operating environment and may contain computer-executable instructions for executing the disclosed methods.

Numerous program modules, including an Operating System (1130), one or more Application Programs (1132), Other Program Modules (1134), and Program Data (1136), can be stored on the Drive and in RAM (1112). The operating system, applications, modules, and/or data, or parts thereof, can also be cached in the RAM (1112). It is well understood that this disclosure can be implemented in various commercially available operating systems or combinations of operating systems.

Users can input commands and information into the Computer (1102) through one or more wired or wireless input devices, such as a Keyboard (1138) and a Mouse (1140) as a pointing device. Additional input devices (not shown) may include microphones, IR remote controls, joysticks, game pads, stylus pens, touchscreens, and others. These and other input devices typically connect to the Processing Device (1104) via an Input Device Interface (1142) linked to the System Bus (1108), but they can also be connected through various other interfaces, including parallel ports, IEEE 1394 serial ports, game ports, USB ports, IR interfaces, and more.

A Monitor (1144) or another type of display device is connected to the System Bus (1108) through an interface, such as a Video Adapter (1146). In addition to the Monitor (1144), the computer typically includes other peripheral output devices, such as speakers, printers, and others (not shown).

The Computer (1102) can operate in a networked environment by establishing logical connections to one or more remote Computers (1148) through wired and/or wireless communication. These remote Computers (1148) may include workstations, computing device computers, routers, personal computers, portable computers, microprocessor-based entertainment devices, peer devices, or other common network nodes. Typically, they include many or all components similar to those described for the Computer (1102). However, for simplicity, only a Memory Storage Device (1150) is shown. The logical connections depicted include both wired and wireless connections to a Local Area Network (LAN) (1152) and/or a larger network, such as a Wide Area Network (WAN) (1154). These LAN and WAN networking environments are common in office and enterprise settings, facilitating enterprise-wide computer networks, such as intranets, all of which can connect to a global computer network, such as the Internet.

When used in a LAN networking environment, the Computer (1102) is connected to the Local Network (1152) through a wired and/or wireless communication network interface or Adapter (1156). The Adapter (1156) facilitates wired or wireless communication with the LAN (1152), which may include a wireless access point installed to enable communication with the wireless Adapter (1156). In a WAN networking environment, the Computer (1102) may include a Modem (1158), be connected to a communication computing device on the WAN (1154), or use other methods, such as connecting through the Internet, to establish communication over the WAN (1154). The Modem (1158), which may be an internal or external device and can be wired or wireless, connects to the System Bus (1108) via a Serial Port Interface (1142). In a networked environment, program modules or portions of program modules described for the Computer (1102) may be stored in a Remote Memory/Storage Device (1150). It is understood that the network connections illustrated are examples, and other methods for establishing communication links between computers may also be utilized.

The Computer (1102) is capable of operating with any wireless device or object used for wireless communication, such as printers, scanners, desktop and/or portable computers, PDAs (portable data assistants), communication satellites, equipment or locations associated with wireless-detectable tags, and telephones. This functionality includes at least Wi-Fi and Bluetooth wireless technologies. As a result, communication can occur within a predefined structure, as in conventional networks, or as ad hoc communication (communication between at least two devices without a predefined structure).

Wi-Fi (Wireless Fidelity) enables connections to the internet and other networks without the need for wired connections. Wi-Fi is a wireless technology, similar to cellular phones, that allows devices, such as computers, to transmit and receive data both indoors and outdoors—essentially anywhere within the coverage area of a base station. Wi-Fi networks use a wireless technology referred to as IEEE 802.11 (a, b, g, and others) to provide secure, reliable, and high-speed wireless connections. Wi-Fi can be used to connect computers to each other, to the internet, and to wired networks (which use IEEE 802.3 or Ethernet). Wi-Fi networks operate in unlicensed 2.4 GHz and 5 GHz frequency bands, supporting data rates of 11 Mbps (802.11a) or 54 Mbps (802.11b), and can also operate on dual-band products that support both bands.

Those skilled in the art will understand that information and signals can be represented using various technologies and techniques. For example, the data, instructions, commands, information, signals, bits, symbols, and chips referenced in the above description can be represented as voltages, currents, electromagnetic waves, magnetic fields or particles, optical fields or particles, or any combination of these.

Those skilled in the art will understand that the various exemplary logic blocks, modules, processors, means, circuits, and algorithm steps described in connection with the embodiments disclosed herein can be implemented using electronic hardware, various forms of programs or design code (referred to here, for convenience, as software), or a combination of both. To clearly demonstrate the interchangeability of hardware and software, the various exemplary components, blocks, modules, circuits, and steps have been described in terms of their functionality. Whether these functions are implemented as hardware or software depends on the specific application and the design constraints imposed on the overall system. Those skilled in the art will also recognize that the functionality described can be implemented in different ways for each specific application; however, such implementation decisions should not be interpreted as being outside the scope of this disclosure.

The various embodiments presented herein can be implemented as methods, devices, or articles of manufacture using standard programming and/or engineering techniques. The term "article of manufacture" includes a computer program, carrier, or media accessible from any computer-readable storage device. For instance, computer-readable storage media include magnetic storage devices (e.g., hard disks, floppy disks, magnetic strips, etc.), optical disks (e.g., CDs, DVDs, etc.), smart cards, and flash memory devices (e.g., EEPROMs, cards, sticks, key drives, etc.), but are not limited to these examples. In addition, the various storage media described herein may include one or more devices and/or other machine-readable media for storing information. The term "media" shall be understood to refer to a non-transitory medium unless specifically described as a signal per se or other transitory medium.

Environmental Views

Figure 21A:
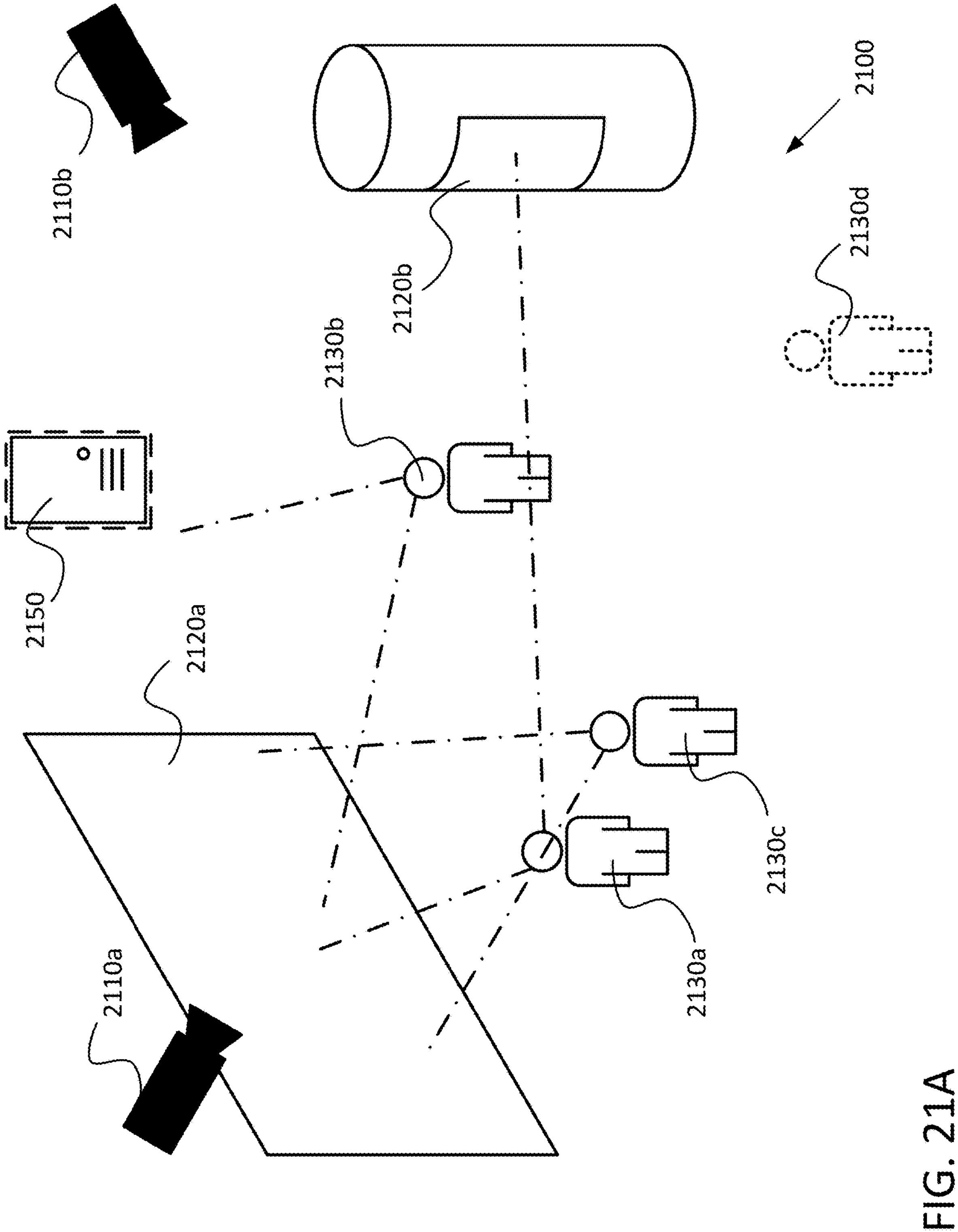
FIGS. 21A-21B illustrate an example environment in which one or more cameras are disposed with respect to one or more content display screens to observe a level of attention for one or more persons to various video content being displayed thereon, according to embodiments of the present disclosure
Figure 21B:
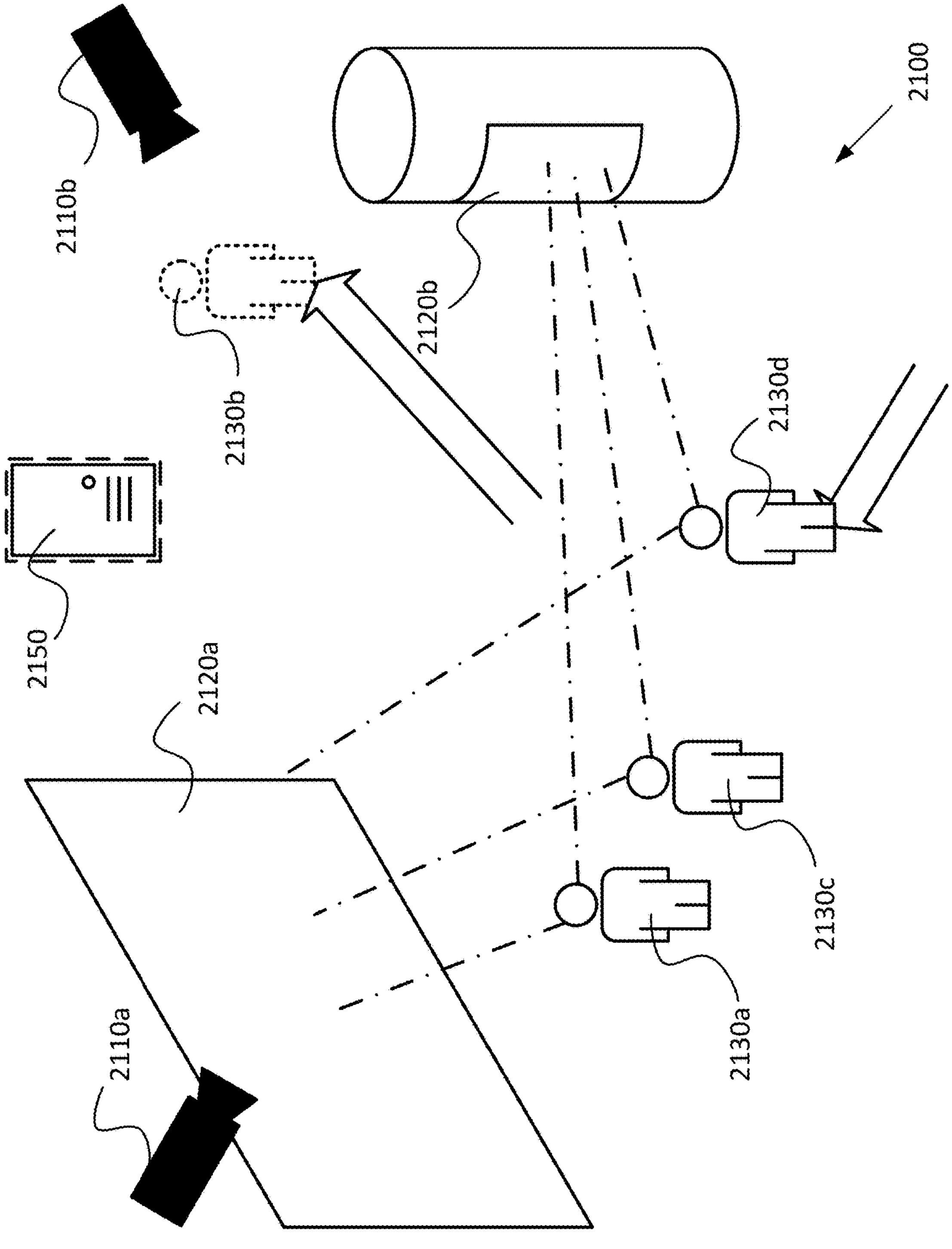

FIGS. 21A-21B illustrate an example environment 2100 in which one or more cameras 2110*a-b* (generally or collectively, cameras 2110) are disposed with respect to one or more content display screens 2120*a-b* (generally or collectively, content display screens 2120) to observe a level of attention for one or more persons 2130*a-d* (generally or collectively, persons 2130) to various video content being displayed via the content display screens 2120 at various times as the persons 2130 move throughout the environment 2100, according to embodiments of the present disclosure. Although illustrated with a given number of cameras 2110, content display screens 2120 and persons 2130 in the examples shown in FIGS. 21A-21B, the present disclosure contemplates that more or fewer cameras 2110, content display screens 2120, and persons 2130 may be present in an environment 2100 in which providing content viewing statistics data is practiced.

Camera Hardware

The cameras 2110 disposed in the environment may be of various types that produce sequences of digital images, including still-image cameras and video cameras. The cameras 2110 may be with range-finders or proximity sensors to identify distances to various objects within a field of view, microphones to record sounds in the environment, motion sensors to identify when objects in the environment are moving, and motor to move where the field of view of the camera is directed in the environment 2100. In various embodiments, the cameras 2110 may generate images using light in the visible spectrum, infrared spectrum, ultraviolet spectrum, and combinations thereof. This sequence of images, may be used as an observation video Multi-camera Systems When using multiple cameras 2110 to monitor an environment 2100, each of the cameras 2110 may be deployed to have a field of view in the environment 2100 that is unique, which may overlap or be separate (e.g., not overlap) from that of the other cameras 2110. Additionally, the cameras 2110 may be of the same or different types, such that a first camera 2110*a* and a second camera 2110*b* may have the same or different, zoom levels, lens types, resolutions (e.g., pixels per square centimeter), color contrasts, f-stop settings, refresh rates/picture taking frequency, timing for when to capture images, reporting frequency, etc. The multiple cameras 2110 may be in communication with a central controller 2150 or centralized database via various wired or wireless networks to collect and compare the images gathered by the multiple cameras 2110 over time. The present disclosure contemplates that in various embodiments the central controller 2150 is variously provided as dedicated hardware or in a virtual computing device offered from a server (e.g., as an edge service), and the hardware used to provide the central controller 2150 shall be understood with reference to the exemplary computing environment discussed with respect to FIG. 20. In various embodiments, one controller 2150 is provided per content item—to control the display and monitor the viewing of a single content item across various display devices 2120. In some embodiments, one controller 2150 is provided per camera 2110 to monitor the various persons 2130 and display screens 2120 visible to that camera 2110. In some embodiments, one controller 2150 is provided per environment 2100 to control the various cameras 2110 and display devices 2120 therein and monitor the viewing of the various content items displayed and viewed by persons 2130 in the environment 2100. The present disclosure contemplates that various controllers 2150 of various types can be used in combination with one another for providing content viewing statistics data as described herein.

Tracking Persons in the Environment

The cameras 2110 are provided to generate one or more observations videos to identify various persons 2130 who may move freely about the environment 2100 and be located at the same or different locations and have the same or different posture and orientation of their respective heads (e.g., as an indicator of a line of sight for that person 2130) at different times. For example, FIG. 21A shows the environment at a first time, in which a first person 2130*a*, a second person 210*b*, and a third person 2130*c* are visible to at least one of the cameras 2110. However, at a second time, shown in FIG. 21B, a fourth person 2130*d* who was previously not visible to the cameras 2110 is now visible to the cameras 2110 (having entered the environment) while the second person 2130*b* is no longer visible to the cameras 2110 (having left the environment), and while the first person 2130*a* and the third person 2130*c* remain in the same location within the environment 2100. Although the third person 2130*c* is in the same location within the environment 2100, the third person 2130*c* is shown with a different field of view (e.g., the area central to the dash-dot lines) between the first and second time, as the third person 2130*c* may have shifted their body or head. These fields of view for the various persons 2130 may be tracked over time with respect to whether (and to what extent) the fields of view overlap or land on the various content display screens 2120 in the environment, examples of which are discussed with respect to FIGS. 22A-22B.

Content Display Screens

The content display screens 2120 disposed in the environment 2100 and are configured to display various video content, and may optionally be associated with one or more audio playback devices to output audio content associated with the video content. In various embodiments, the content display screen 2120 may include projectors and surfaces onto which the video content is displayed, light emitting diode (LED) monitors, or the like. In various embodiments, the display screens 2120 may be substantially planar (e.g., flat), such as the first display screen 2120*a*, or may be curved, such as the second display screen 2120*b*, and may be of various sizes and aspect ratios to allow for persons 2130 in the environment 2100 to interact with video content provided in different form factors. The display screens 2120 are not under the direct control of the persons 2130 in the environment, and are configured to show one or more content items at any given time. For example, a first display screen 2120*a* displaying a first content item also displays a second content item contemporaneously in a picture-in-picture mode, by dividing the real estate of the first display screen 2120 into to independent portions, by superimposing one content item over the other, splicing the two content items together, or the like.

Multi-Display Systems

When using multiple display screens 2120 to output content for consumption in an environment 2100, each of the display screens 2120 may be deployed according to the physical space and size availability for how and where to mount the display screens 2120. Accordingly, the display screens 2120 may be of the same or different types, such that a first display screen 2120*a* and a second display screen 2120*b* may have the same or different absolute sizes, aspect ratios, resolutions (e.g., pixels per square centimeter), color contrasts, brightnesses, refresh rates, timing for when to output video content, reporting frequency, etc. The display screens 2120 may be in communication with a central controller 2150 or centralized database via various wired or wireless networks to receive video content to play back, commands for how or when to play back the video content, collect and compare the images gathered by the multiple cameras 2110 over time. Accordingly, in various embodiments, two or more display screens 2120 are managed independently of each other by a central controller 2150, while in some embodiments, two or more display screens 2120 are managed in coordination with each other by a central controller 2150 so that the content displayed (or observed as being watched) on a first display screen 2120*a* influences the content displayed on a second display screen 2120*b*. In various embodiments, one or more display screens 2120 in a multi-screen system are able to display two or more content items simultaneously, and the display of some of the two or more content items is coordinated across two or more of the display screens 2120. The present disclosure contemplates that one central controller 2150 can manage multiple groupings of independent and coordinated display screens 2120.

Content Considerations Across Multi-Display Systems

Generally, the content displayed by the display screens 2120 is not under the control of the persons 2130 in the environment 2100. The content displayed on a plurality of content display screens 2120 may be collaboratively displayed so that multiple content display screens 2120 display the same content at the same time, different content at the same time, or the same content at different times to coordinate the display of various content items throughout an extended environment or to compete against the display of content from display screens outside of the system (or other instances of the system deployed to the same environment). Additionally or alternatively, one or more content display screens 2120, via split screen control, may simultaneously display more than one content item.

Coordination of Content Displays and Cameras

When deployed as part of a unified system, the various cameras 2110 and content display screens 2120 may be used to display, on at least one display screen 2120, at least one video content item for (potential) consumption by the various persons 2130 in the environment 2100. The cameras 2110, in turn capture, while the content item is being displayed, at least one observation video of the environment 2100 in which the at least one display screen can be seen. The central controller 2150 processes the data from the observation video to identify persons 2130 at least temporarily located in the environment 2100 who can see the display of the at least one video content on at least one display screen, and determine an attentiveness level of the individual persons 2130 or a collective attentiveness of the group or a subgroup of persons 2130 in the environment 2100 at a given time.

Improvements to Underlying Systems and Additional Functionalities

By understanding how persons 2130 react to various video content in an environment 2100, the present disclosure provided for improvements in the efficiency and efficacy of the underlying systems, additional functionalities in the underlying systems, among other benefits. For example, when tracking visually-provided public service announcements in a crowded public space, by knowing how many persons 2130 paid attention to the contents of the visual announcements, the central controller 2150 can determine when to forego an accompanying audio announcements, thereby reducing the amount of noise in the environment 2100, allowing for more pressing audio announcements to be played, persons 2130 to continue conversations, etc. For example, by identifying display screens 2120 with higher or lower attention levels over historic periods, the central controller 2150 can charge higher rates for advertisements on certain display screens 2120, reduce the brightness (and thereby the power consumption) of an overly-attractive display screen 2120 or increase the brightness of under-performing display screens 2120, determine follow-on video content based on what video content has actually been consumed, etc.

Individual Attention

Where the vision of individual person 2130 is focused may be determined based on the physical position of the body of that person 2130. As will be appreciated, giving attention to the visual aspect of a video content item at a given time requires a person 2130 to be able see the visual aspect at the given time, which a person 2130 may achieve by positioning via gross or minor movement of the body, neck, or eye muscles to change where the gaze of the person 2130 is directed. Accordingly, the line of sight of the person 2130 may be determined by analyzing the observation video collected by the cameras 2110 to determine an orientation an posture for persons identified in the observation video. The central controller 2150 then extrapolate a field of view to determine whether a person can see a display screen 2120 at a given time. Although the field of view for the average human is approximately 210 degrees horizontally and 135 degrees vertically, due to the focal field for attention being smaller than the overall field of view, and the ability of a person 2130 to move their eyes (and the challenges associated with eye-tracking through corrective or solar-protective lenses), the present disclosure contemplates that the central controller 2150 may use predetermined angular ranges from the line of site that are greater or less than 210 degrees horizontal and 60 degrees vertical when analyzing whether a display screen 2120 can be seen by a person 2130. This determination may act as a first filter to prevent spending additionally computing resources on determining an attention level for persons 2130 who cannot see the display screen 2130; classifying those persons 2130 as having a level of attention of “no attention”, “not visually attentive”, etc.

Line of Sight as a False Positive for Attention

Identifying which persons 2130 can physically see the content provided on a given display screen 2120 however, is not an accurate measure of whether a person 2130 is giving the video content attention. For example, a person 2130 who is facing a display screen 2120 may have their eyes closed, be focused on a cellphone, be talking to a second person 2130 who is also in their field of view, may be staring into space, or have their attention focused elsewhere for myriad other reasons; providing a false positive for the person 2130 having given attention to the video content. Additionally, a person 2130 may have their attention briefly drawn to the display screen 2120 for an amount of time that is deemed insufficient to have gleaned meaningful information from the video content item. Accordingly, as a second filter to determine whether an individual person 2130 has given a threshold amount of attention to the video content item, the central controller 2150 may monitor persons over a period of time and make multiple determinations before determining a state of attentiveness for a given person 2130.

False Negatives for Attention Determination

Additionally, and particularly in an environment 2100 with multiple display screens 2120 playing back the same video content, removing focus from a given display screen 2120 may be a false negative for loss of attention or no attention; a person may be giving sufficient attention to a content item or have shifted attention from one display screen 2120 to another display screen 2120 to continue watching the content item. For example, a person 2130 in a public space may move from a first location to a second location, and shift attention from a first display screen 2120*a* to a second display screen 2120*b* that are both playing the same video content, and may have a brief loss of focus on the video content when switching focus between the two display screens 2120. However, if the loss of focus is within a threshold amount of time, and the central controller 2150 is able to identify the two display screens 2120 as displaying the same content item, the central controller 2150 should not identify the person 2130 as inattentive, but rather as in a state indicative of attention.

Changes in Gaze for Determining Attention

Due to the potential false positives and false negatives in determining the attentiveness state based solely on line of light, the present disclosure contemplates using changes in line of sight and threshold levels of attentiveness or inattentiveness as additional processing filters for a state determination. Stated differently, by monitoring the line of sight for a person 2130 over time for changes in the line of sight, the central controller 2150 may more readily identify when a person 2130 is actually giving attention to a video content item. For example, when two persons 2130 are facing and talking to each other, when one person 2130 shifts their head to see a display screen 2120 for at least a threshold amount of time, the central controller 2150 can determine that the content item captured the attention of that person 2130. In contrast, a person 2130 may be determined to have line of sight to a display screen 2120 while briefly turning their head to talk to a friend while walking, but turn their head back to focus on where they are walking, and should not be determined to have given attention to the video content item.

Attention Thresholds

Additionally, by monitoring how long a person 2130 remains in a state (e.g., a time until a next change in focus), the central controller 2150 can ignore minor lapses in attention, shifts between different display screens 2120, extraneous body movements, and the like. For example, an attention capture threshold of X milliseconds (ms) (e.g., 100 ms, 200 ms, 300 ms, 400 ms, 500 ms, 1000 ms, etc.) may be set so that a person 2130 must be observed with a line of sight on a display screen 2120 before the central controller 2150 determines that the person 2130 is giving attention to the video content displayed thereon. For example, an attention loss threshold of Y milliseconds (ms) (e.g., 100 ms, 200 ms, 300 ms, 400 ms, 500 ms, etc.) may be set so that a person 2130 must be observed with a line of sight on a display screen 2120 before the central controller 2150 determines that the person 2130 is giving attention to the video content displayed thereon. In various embodiments, the attention capture threshold may be equal to, less than, or greater than the attention loss threshold (e.g., X=Y, X<Y, X>Y). In various embodiments, the thresholds are based on the amount of time that the video content items run for; for example, the thresholds may be set as an even fraction of a length of an entire video content item or a segment thereof (e.g., 1 second (s) for a 30 s video content item, 500 ms for a 15 s video content item, 500 ms for a 15 s portion of a longer video content item).

Group Attention

Although tracking the individual attention of several persons 2130 can provide various insights and functionalities related to video display and tracking for an individual person 2130, tracking the general attentiveness of a group of persons 2130 allows for additional behaviors and functionalities to be offered collectively to the group or to one representative of the group who will inform the behavior of the group. For example, a family navigating an airport may have a first person 2130*a* whose attention is focused on several children who collectively may not be giving attention to any particular display screen 2120, but a second person 2130*b* whose attention is focused on different display screens 2120 showing where baggage can be found, local weather, boarding information, etc., and the central controller 2150 may provide additionally useful information via the display screens 2120 based on the content that the second person 2130*b* is giving attention to. In an additional example, a crowd of persons 2130 waiting to enter a sporting venue via one of several gates may rely on a subset of persons with active attention on one or more display screens 2120 that provide navigational information to the crowd, and if insufficient numbers of persons 2130 in the crowd are determined to be attentive, the central controller 2150 may activate an attention-grabbing feature (e.g., flashing a light/screen, adjusting a brightness of a screen, play an audio alert sound, etc.). Accordingly, group attention sates can be tracked and influenced in addition to induvial attention states as described in the present disclosure.

Exclusion of Some Persons

In addition to tracking persons 2130 to determine the attentive state of those persons 2130, various persons may be excluded from the determinations, thereby conserving computing resources by not calculating the attentive state for at least sometimes for one or more persons 2130. For example, the system may use facial or height recognition to not track persons 2130 identified as minors, time windows to exclude persons 2130 observed during certain times (e.g., to avoid tracking maintenance personnel), counters to avoid tracking persons 2130 who have not been observed for at least a predetermined amount of time (e.g., until a new content item begins after first observing the person 2130), location information (e.g., to exclude persons 2130 in locations that are visible to a camera 2110, but are known to not have line of sight to a display screen 2120 such as due to obstructions known to the central controller 2150). For example, when applying a location information exclusion criteria, the camera 2110 can determine whether a person 2130 is located inside or outside of a polygon or polygonal solid in which the attentiveness of the person 2130 is determined to be of interest for tracking.

Tracking Charts

Figure 22A:
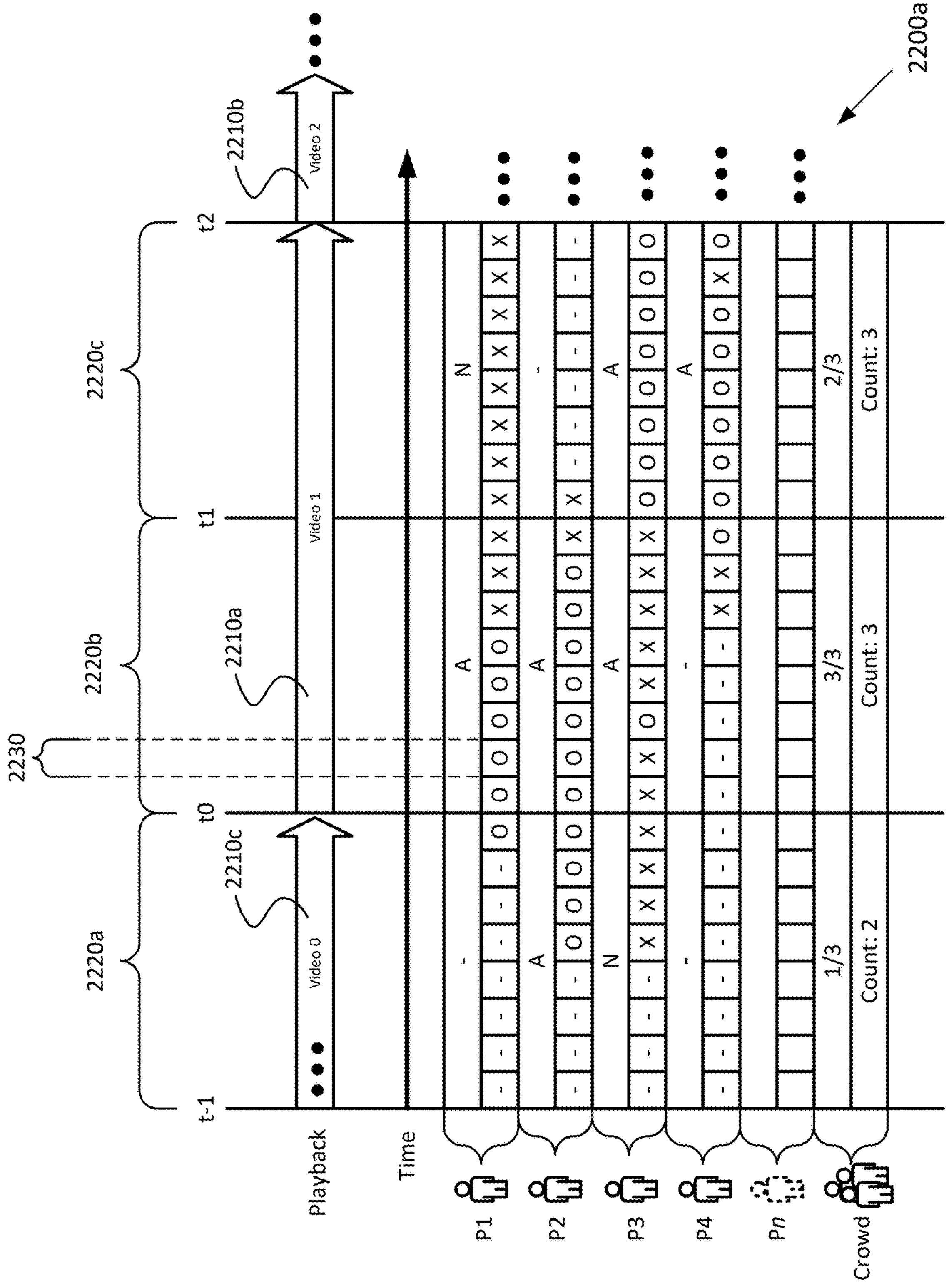
FIGS. 22A-22D illustrate example tracking charts, according to embodiments of the present disclosure.
Figure 22B:
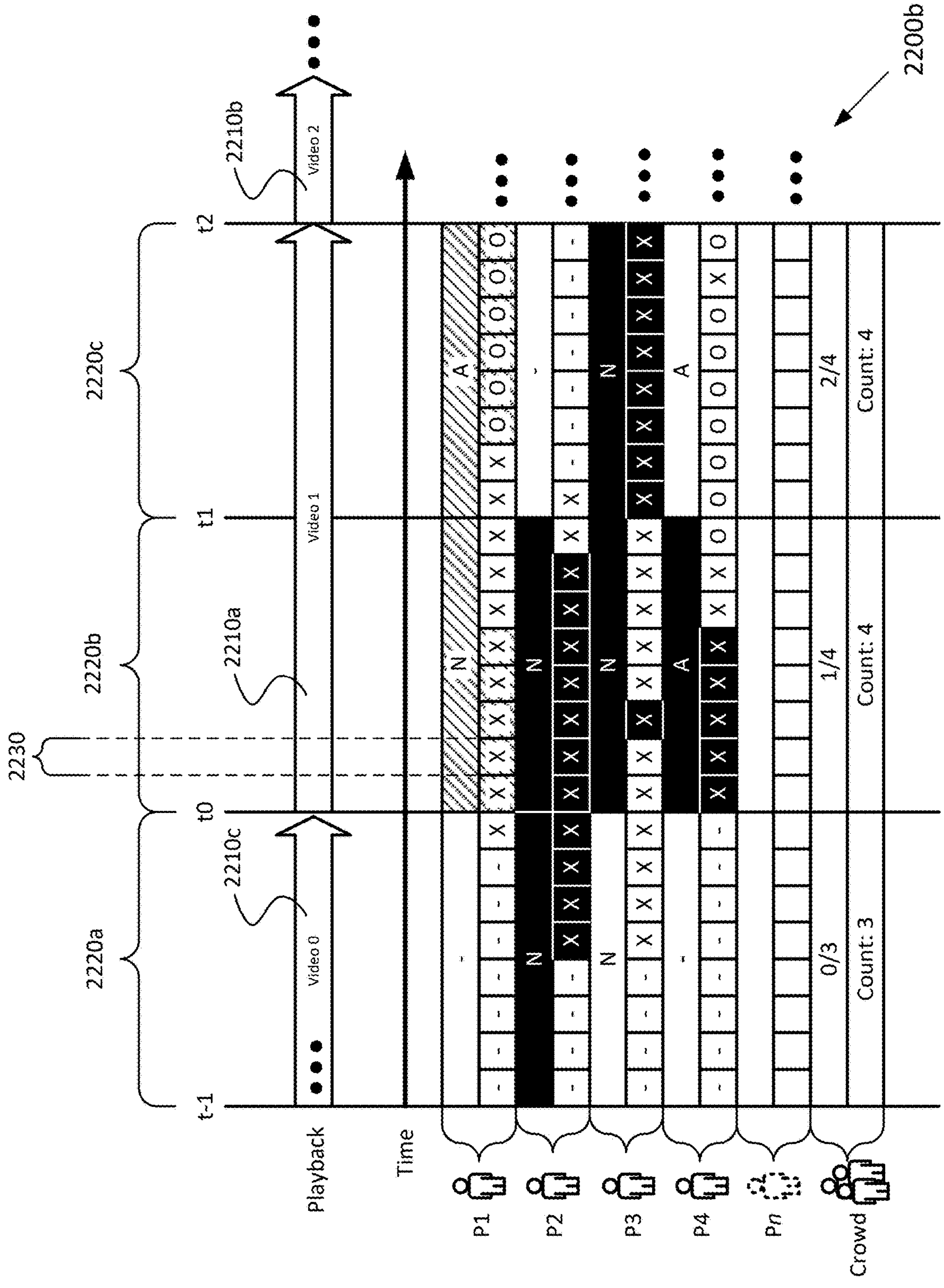
Figure 22C:
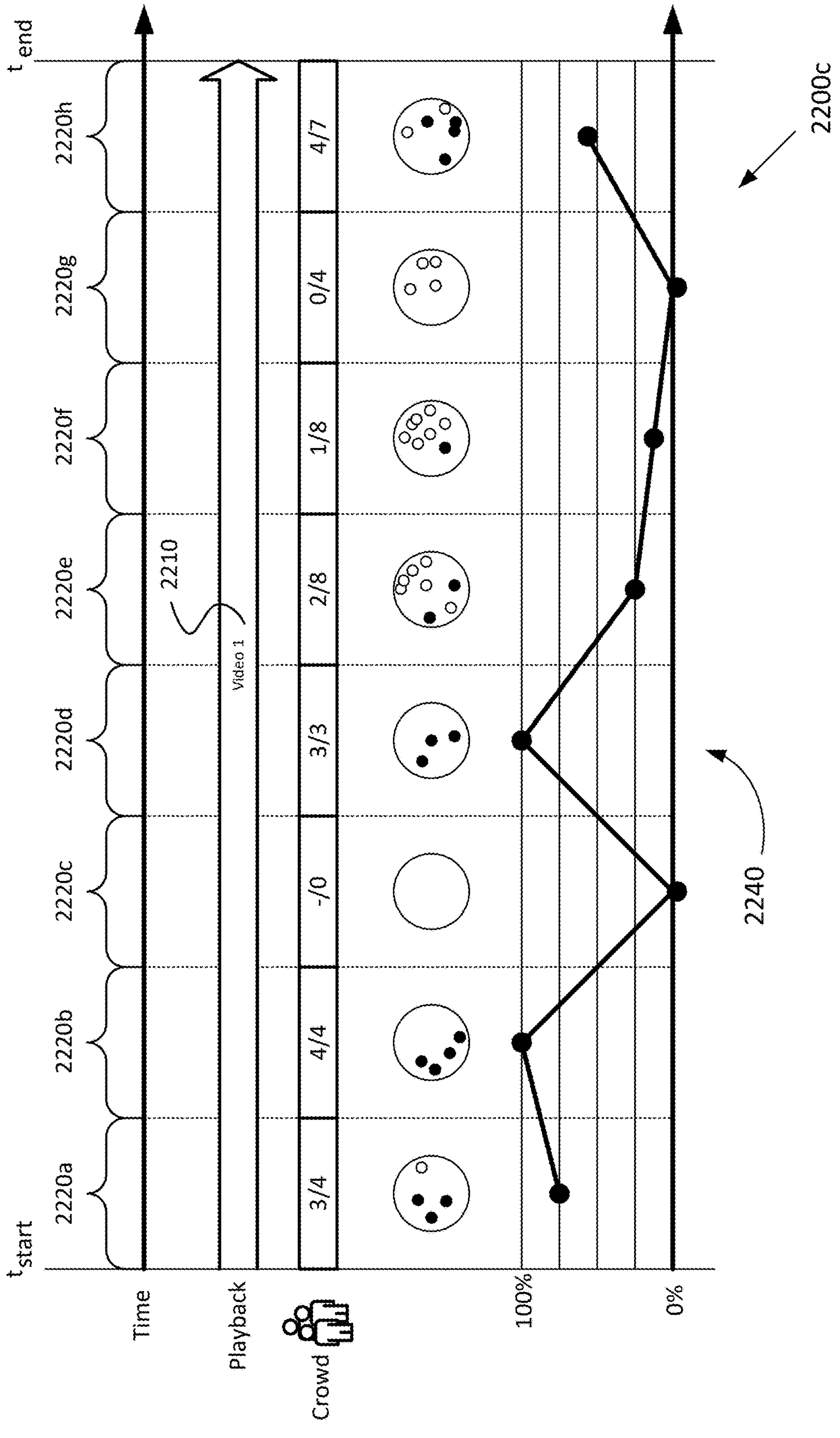
Figure 22D:
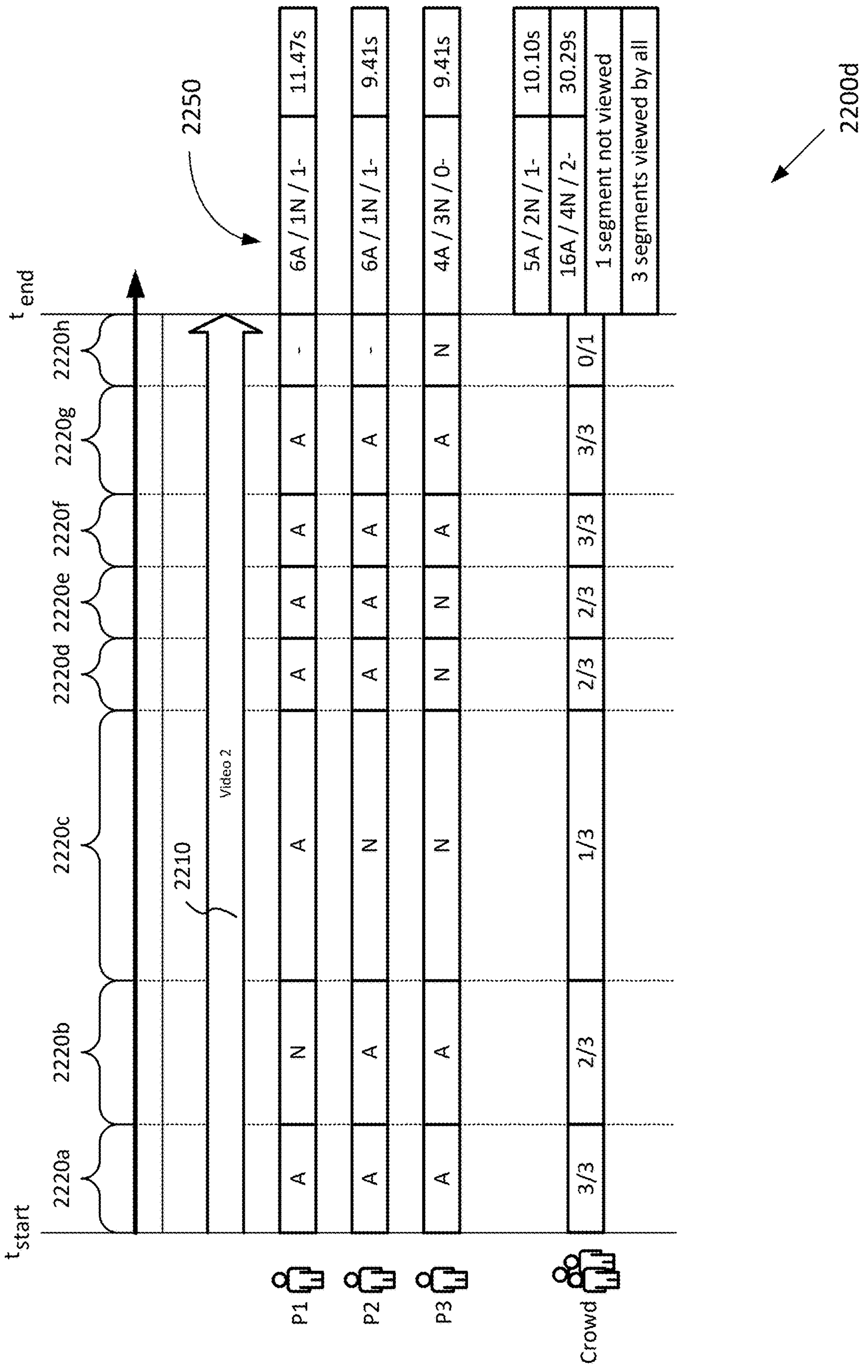

FIGS. 22A-22D illustrate example tracking charts 2200*a-d* (generally or collectively, tracking charts 2200), according to embodiments of the present disclosure. Each tracking chart shown in FIGS. 22A-22B is associated with one pairing of a camera with a content display screen. Each tracking chart shown in FIGS. 22C-22D is associated with the analysis of various statistics gather from the monitoring of persons in the environment. For example, with reference to the examples given in FIGS. 21A-21B, the first tracking chart 2200*a* may be representative of the first camera 2110*a* with respect to the first display screen 2120*a*. Continuing the example, the second tracking chart 2200*b* may be representative of the first camera 2110*a* with respect to the second display screen 2120*b*, the second camera 2110*b* with respect to the first display screen 2120*a*, or the second camera 2110*b* with respect to the second display screen 2120*b*. As will be appreciated, tracking charts 2200 may be made for each pairing of camera-to-screen, and pairings may be included even when the camera cannot directly see the display screen in question, but can see persons who can see that display screen. However, pairings may be omitted when a camera is not able to see persons who can see a given display screen.

Attention Relative to the Content Items

In each of the tracking charts 2200, the line of sight of various persons is tracked over time with respect to various video content items 2210*a-c* (generally or collectively, video content items 2210), which may be divided into segments 2220*a-c* (generally or collectively, segments 2220). These segments 2220 may in turn be divided into various still images (referred to herein as frames 2230) in which the line of sight for a person may analyzed to determine whether the person is in various attentive states. The frame-level determinations for the attentiveness of a given person may be combined according to various thresholds to determine a segment-level determination of an attentiveness of that person, and similarly, the segment-level determinations for a given person may be combined according to various thresholds to determine a content-level determination of an attentiveness of that person.

Example Time Durations

Although the present disclosure contemplates various different lengths of time may be used for the various content items 2210, segments 2220, and frames 2230, the time scale chosen may offer various benefits. For example, when a segment 2220 is selected to be 100 milliseconds (ms) in duration, each frame 2230 may be representative of 10 ms duration, allowing each segment 2220 to be evenly divided into ten frames 2230 of the same duration. Using shorter duration frames 2230 allows for human reaction times to be ignored because if a person cannot change their line of sight within the duration of a frame 2230 to any appreciable degree, any image analyzed within a frame 2230 can be assumed to be equivalent to any other image for purposes of attention determination. However, using longer duration frames 2230 allows for multiple cameras to have less precision in framerates or analyses of the environment relative to one another—any image taken within the duration of the frame 2230 may be representative of the frame 2230 as a whole. For example, a first camera analyzing an image taken at time t1 and a second camera analyzing an image taken at time t2 may be considered as making individual determinations for the same frame 2230 so long as t1 and t2 occur during the duration of that frame 2230 (e.g., when |t1-t2|<frame duration). Accordingly, various operators may tune the durations of the frames 2230 and segments 2220 to provide more or less granular analysis of a content item 2210, adjust for human reaction/movement time, and account for offsets in synchronization between multiple cameras.

Eye Direction and Blinking

Because the frames 2230 are generally set to be shorter in duration that human reaction times, changes in eye position, and whether the eyelid covers the eye (e.g., blinking), can generally be ignored despite the eye position affecting the field of view and the eyelid affecting whether a person can see a particular display screen. The variations in eye contact due to blinking, unconscious eye scanning or twitching, and conscious eye positioning may generally be considered of minor enough effect to be ignored in some embodiments. Accordingly, processing resources can be conserved, and the determination of line of sight may be based on the position of the body and head of a person and not on eye position or state.

Shared Tracking of Persons Across Tracking Charts

Each person identified by the system is uniquely identified (e.g., with a unique identifier) when entering the observable space, and each camera hands off the unique identity to track the individual person across the observable environment. Accordingly, a person designated by a first camera as P1 will continue to be monitored by a second camera, third camera, etc. as P1 so that a shared attention state can be tracked for that person across the observable space. For example, first person P1 can be identified by a first camera, and differentiated from a second person designated as P2 through the various tracking charts 2200. In various embodiments, the camera use facial recognition, range finding devices, object recognition (e.g., for clothing, hair, etc.) and combinations thereof to verify that a given person is associated with a given designation as that person moves throughout the observable space. Accordingly, attention determinations can be made by multiple cameras for one display screen for a given person or by one or more cameras across multiple display screens for the given person.

Reassignment of Unique Identifiers

As will be appreciated, when the presently described system is deployed in a public space, various persons may come and go while various content items 2210 are played back. In some embodiments, the system tracks an individual person and maintains a consistent identifier for that person for as long as the person remains in the observed space, but may assign the same person a different identifier after leaving an re-entering the observable space, and can reassign the same identifier to a new person after the person initially assigned the identifier leaves the observable space. In some embodiments, the system makes a new determination for identifier assignment for each content item 2210 so that the persons present for the playback of a first content item 2210*a* are assigned a first set of identifiers, and then reassigned a set of identifiers when a second content item 2210*b* is played back after the conclusion of the first content item 2210*a*. Accordingly, each person is uniquely identified for each determination so that no two persons are identified as P1 at the same time, but those two persons may be identified as P1 at different times, and one person may be associated with different identifiers (e.g., P1 and P2) at different times.

Explanation of Symbols Used in the Illustrated Examples

Any number of persons (P1-Pn) may be tracked over the time, depending on the number of persons in an observable space for the display devices showing the video content items 2210, and each is associated with various determined states for the respective line of sight. Each person is tracked according to a line of sight determination for each frame 2230 that they are visible in, which in turn allows the system to make an attentiveness determination for each segment 2200 for which the person has been visible for. As illustrated in the charts 2200, the segment-determination is illustrated above the line-of-sight-determination for each person, with each portion aligned in time across the system.

Line of Sight Determination Symbols

As illustrated for each frame 2230, a mark of "O" is indicative of an established line of sight for the indicated person to the display screen associated with the tracking chart 2200 as indicated from the observation video captured by the camera associated with the tracking chart 2200. Similarly, a mark of "X" is indicative of a determination of no line of sight for the indicated person to the display screen associated with the tracking chart 2200 as indicated from the observation video captured by the camera associated with the tracking chart 2200. A mark of "-" is indicative of a determination that no determination could be made for the line of sight for the given person by the camera associated with the tracking chart 2200 for the display device associated with the tracking chart 2200 (e.g., when a person entered a viewable space or left a viewable space, when a confidence of the line of sight is below a determination threshold, etc.).

Attention Determination Symbols

As illustrated for each segment 2220, a mark of "A" is indicative of a determination of attentiveness for the indicated person. Similarly, a mark of "N" is indicative of a determination of no attentiveness for the indicated person. A mark of "-" is indicative of a determination that no determination could be made for the attentiveness for the indicated person. As will be appreciated, different threshold may be used to determine whether a person is attentive, inattentive, or has some other attentiveness state based on the analysis of the lines of sight for each frame 2230.

Determination Counts for Attentiveness State

The determinations for the attentiveness states for each person made from the observation videos are based on a number of frames 2230 within each segment 2220 being at or above a given threshold, which may be multiplied by the number of cameras observing a given person to thereby avoid computationally costly voting schemes and mitigate frequency/timing mismatches between cameras. Because each segment 2220 may be defined as a fixed length of time (e.g., 100 ms, 200 ms, 500 ms, 1 s, 1 s, 5 s, etc.) that is correlated to an even division of a portion of a video content item 2210, each observation video will yield the same number of determinations for a person's line of sight. These determinations may be made at slightly different times, but generally occur between the start and end times for each frame 2230 of the segment 2220. Accordingly, in a system that divides each segment 2220 into eight frames 2230, a determination of four or more times (e.g., a threshold of 50% of a segment 2220) from a single camera may meet a threshold to determine that a person is in an attentive state for that segment 2220. By tracking a number of segments 2220 that a person is attentive for, the system can further determine whether that person is attentive to a video content item 2210 as a whole.

Considerations for Multiple Cameras

Continuing the example of the first observation video from a first camera with segments 2220 divided into eight frames 2230, adding a second observation video from a second camera would then satisfy the 50% threshold when the person is determined to have line of sight to the display screen at least eight times, and adding a third observation video from a third camera would then satisfy the 50% threshold when at least twelve times the person is determined to have line of sight to the display screen; in each case at least 50% of available determinations for a segment 2220 indicate the line of sight from the person to the display screen, which may be spread across the multiple cameras (e.g., the first camera makes an "O" determination A times, the second camera makes a "O" determination B times, and the third camera makes an "O" determination C times, where A+B+C≥50%).

Different States Based on Varying Numbers of Determinations

The system may assign various different thresholds for different states of attentiveness, including full attention, partial attention, divided attention, passing through, peripheral attention, no attention, etc. For example, rather than or in addition to using a 50% threshold, the system may use a threshold of one frame 2230 with line of sight to determine that a person is attentive in a given segment 2220 when any camera indicates that the person had line of sight to the associated display screen in any frame 2230 (e.g., one frame 2230 marked "O" and any number of frames 2230 marked "X" or "-"). In an additional example, the system may treat determinations that no determination could be made in a frame 2230 (e.g., marked as "-") as a lack of confidence in the overall reliability of the other determinations, and adjust a threshold number of "X" or "O" determinations of line of sight in the frames 2230 used to reach a final determination of attentiveness in the segment 2220.

Change in Line of Sight as Factor for Determinations

As will be appreciated, a person may be facing a display screen (e.g., have line of sight to the screen) without necessarily giving the content displayed thereon attention. Accordingly, the system may recognize not only when a person has line of sight to the display screen for at least a threshold number of frames 2230, but also track when the person has a change in their line of sight between segments 2220. Because a person who changes where their gaze lands may be more likely to give attention to a content item that their line of sight encompasses, the system may additionally use a change in line of sight, or lack of change in line of sight, to affect how the attentive state of the person is analyzed across segments 2220.

Example of Shared Tracking of a Display Screen

When multiple cameras monitor attention to one display screen (e.g., the first tracking chart 2200*a* is associated with a first camera and a first display device and the second tracking chart 2200*b* is associated with a second camera and a first display device), each of the cameras may have different views of the person, and come to different conclusions on whether a person has line of sight to the display screen at various times. To highlight these differences, the determinations made in the second tracking chart 2200*b* that differ from those in the first tracking chart 2200*a* in relation to this example are shown in an inverted color scheme (e.g., white text on black background vs. black text on white background). As can be seen, the first camera and the second camera have come to different conclusions in the second segment 2220*b* for the second person P2, the third person P3, and the fourth person P4, and the system can combine these different conclusions in various ways to make an overall determination for each of the persons. For example, if at least one camera comes to the conclusion that a person has at least glanced at the display screen in a given segment 2220 (i.e., a determination of "A" in the present example), the person may be determined to be attentive to during the segment 2220 to the display. Accordingly, in this example, although the first camera could not come to a determination for person P4, because the second camera did come to a conclusion of attentive (e.g., "A"), the overall system may treat person P4 as attentive. Similarly, although the first camera and the second camera disagree on whether person P2 is attentive, because the first camera (in chart 2220*a*) indicates person P2 as attentive, he overall system may treat person P2 as attentive.

Example of Shared Tracking of Video Content Across Multiple Display Screens

When one or more cameras monitor attention to one video content item 2210 displayed across multiple display screens (e.g., the first tracking chart 2200*a* is associated with a first camera and a second display device and the second tracking chart 2200*b* is associated with a first or second camera but a second display device, where both display devices are playing the same video content item 2210), a person can be identified as giving attention to the content item, but shifting attention between the two or more display screens across segments 2220. For example, a venue may place several display screens in different locations so that persons moving about the venue may continue to consume a video content item 2210 as they move about the venue. To highlight these differences, the determinations made in the second tracking chart 2200*b* that differ from those in the first tracking chart 2200*a* in relation to this example are shown with a patterned a background (e.g., black text on a black-striped background vs. black text on a solid white background). For example, a first person P1 may be noted (as in FIG. 22A) as giving attention to a first display screen during a second segment 2220*b*, and as not giving attention during a third segment 2220*c* with respect to a first content item 2210*a* on the first display screen. In contrast, that same first person P1 may be noted (as in FIG. 22B) with respect to a different display screen showing the same first content item 2210*a* as not giving attention during the second segment 2220*b*, and as giving attention the third segment 2220*c*. Accordingly, the system may determine that the person has maintained attention on the first content item 2210 despite not maintaining attention on any one display screen.

Crowd Attentiveness

From the individually tracked attentions for the persons shown in the tracking charts 2200, various crowd metrics for the grouping of the persons can be derived for further analysis to determine and monitor the attention state of the crowd as an entity. For example, as shown in FIG. 22A, counts are taken for the total number of persons identified by the cameras in each segment 2210 and compared to counts of the number of persons identified as attentive (e.g., "A" vs total). Each camera or pairing of camera-display can come to different conclusions on the total number of persons in the location that can be seen or that are determined to be attentive.

Video Analytics

In addition or alternatively to monitoring the various pairings of cameras and display screens, the collated data are aggregable on a per video content item basis to provide analytics for the display of a given content item 2210*a*, for which examples are given in FIGS. 22C-22D.

Graphical Analytics

For example, as shown in the third tracking chart 2200*c*, graphical analytics 2240 are provided as visualizations of the determinations for the crowd in each evenly divided segment 2220*a-h* of a single content item 2210. The illustrated graphical analytics 2240 show a percentage of the crowd identified as attentive from a total composition of the crowd in each segment 2220 in a line chart, and the positioning of the various persons and their statues (attentive in solid black, inattentive in white) in a scatter chart or heatmap. The present disclosure contemplates various additional graphical analytics 2240 can be provided beyond or in addition to the examples shown herein.

Calculated Analytics

In the example shown in FIG. 22D, the fourth tracking chart 2200*d* provides calculated analytics 2250 for the various persons and the crowd over the course of another video content item 2210 divided into eight un-even duration segments 2200*a-h* (e.g., the second segment 2200*b* is four times longer than the fourth segment 2200*d*). Similarly, to the tracking charts 2200*a-b* in FIGS. 22A-22B, the fourth tracking chart 2200*d* displays the determination of attentiveness of each person and a crowd of those persons across the duration of the video content item 2210. The fourth tracking chart 2200*d* provide a count of each attentiveness for each person (and an average and a total for the crowd), a total time of the 15 s long viewed by each person (and an average and a total for the crowd). Additionally, for the crowd, the data provide calculated analytics 2250 of the number of segments viewed by none of the crowd and by all of the crowd. The present disclosure contemplates various additional calculated analytics 2250 can be provided beyond or in addition to the examples shown herein.

Control of Displays Across Environments

Figure 23A:
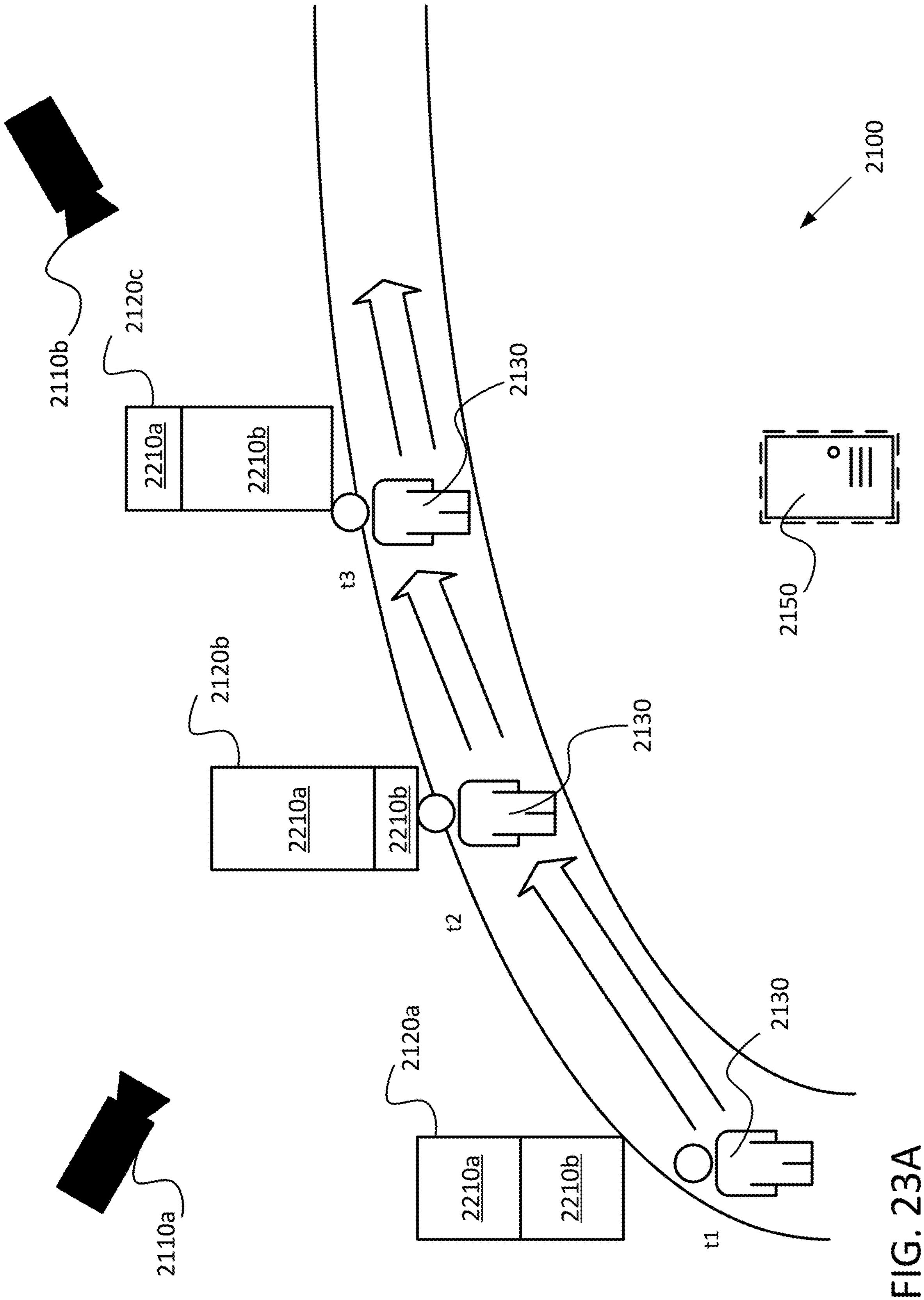
FIGS. 23A-23C illustrate scenarios in which multiple display screens are controlled throughout an environment, according to embodiments of the present disclosure.
Figure 23B:
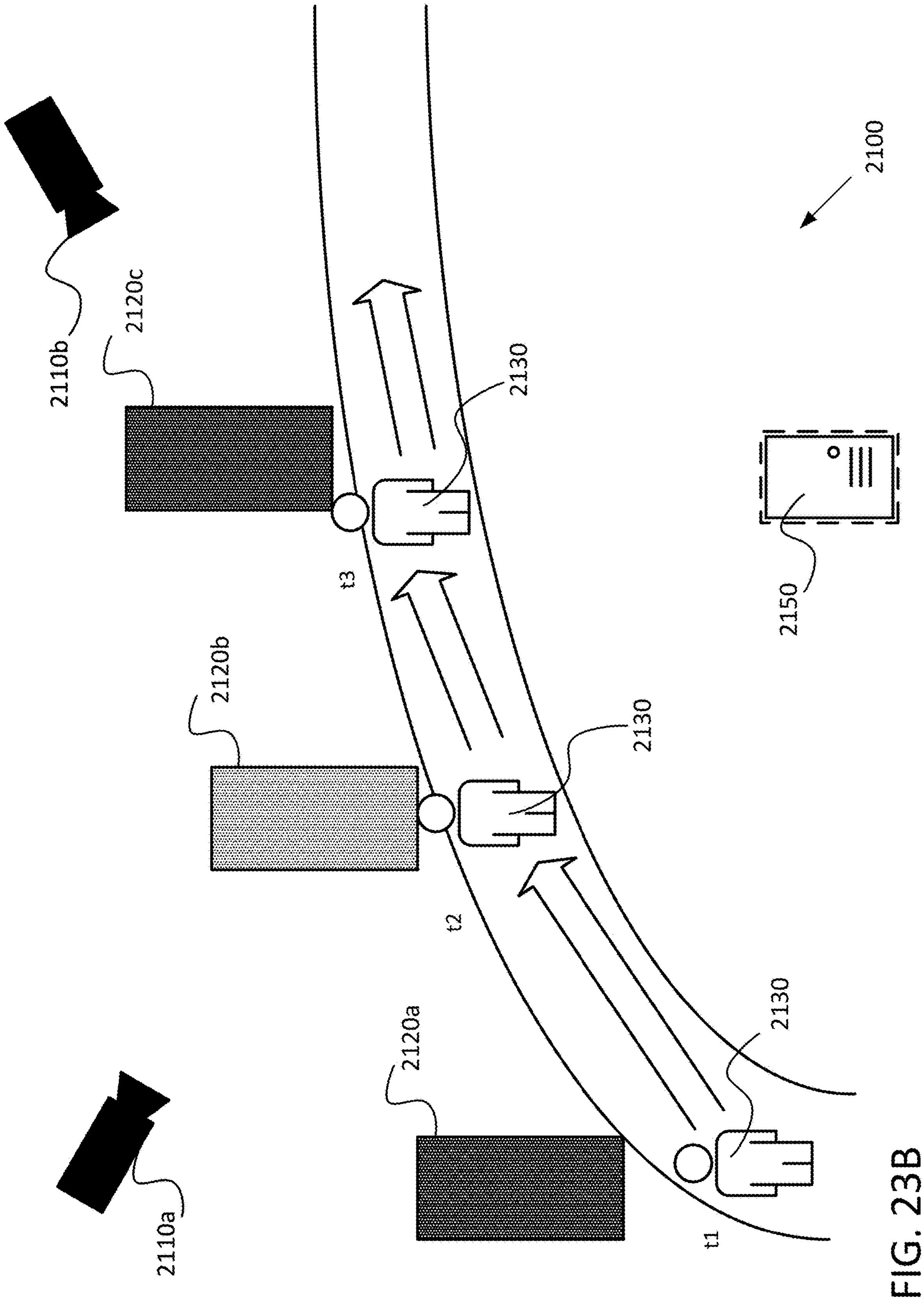
Figure 23C:
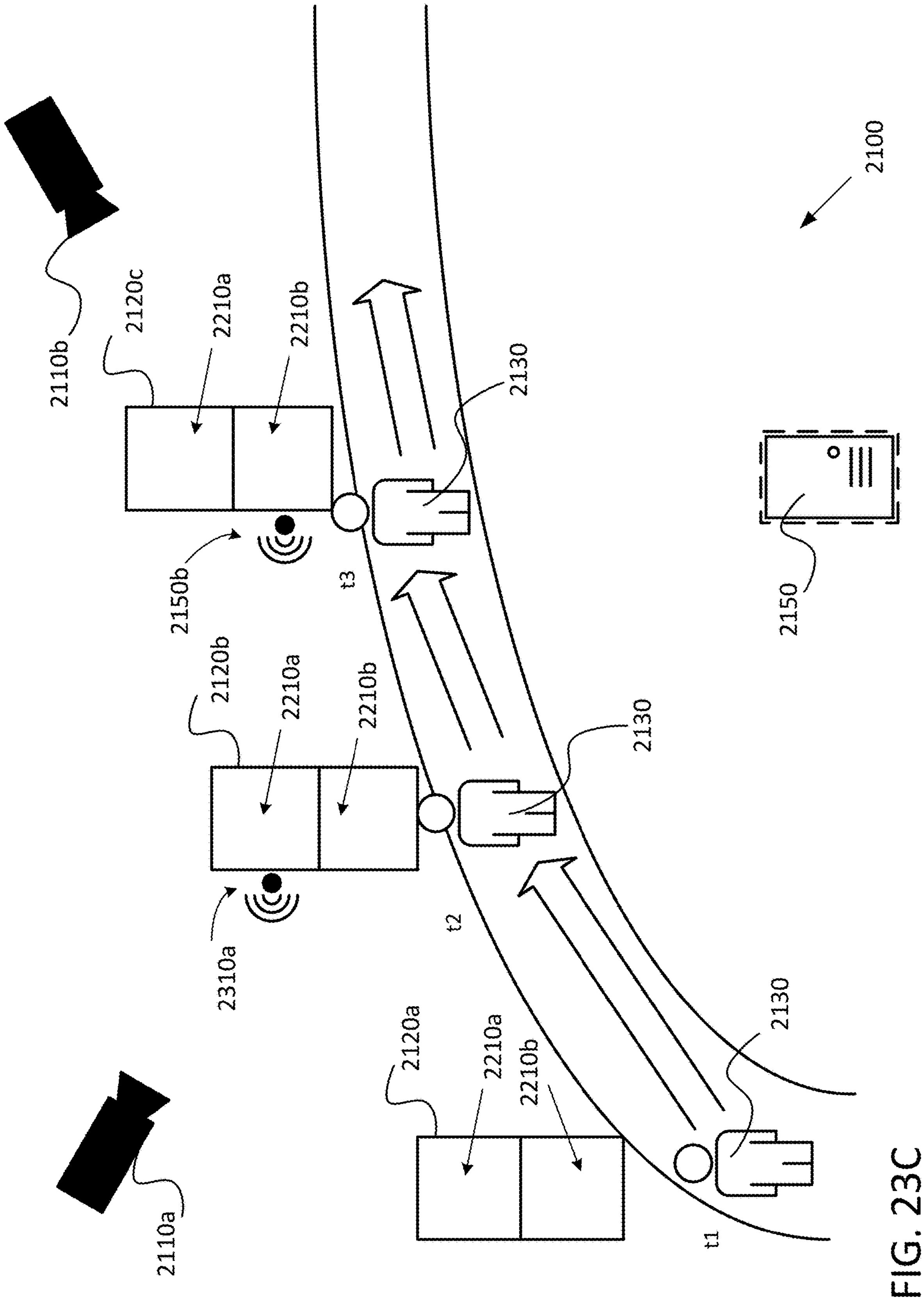

FIGS. 23A-23C illustrate scenarios in which multiple display screens 2120*a-c* are controlled throughout an environment 2100 at different times as a person 2130 (or group of persons 2130) is variously identified as giving attention to different display screens 2120 or video content items 2210 displayed thereon, according to embodiments of the present disclosure. In each of the scenarios, the person 2130 is shown giving attention to a first display screen 2120*a* at a first time t1, to a second display screen 2120*b* at a second time t2, and to a third display screen 2120*c* at a third time t3, and moving through the environment across those times t1-t3, as is monitored by at least two cameras 21110*a-b*. The cameras 2110 and the display screens 2120 are in communication with a central controller 2150 to receive observations videos from the cameras 2110, determine an attentiveness state of the person 2130, and make adjustments to the cameras 2110 or display screens 2120 based on the determined attentiveness.

Content Item Adjustment

As shown in FIG. 23A, the person 2130 is observed giving attention to different content items 2210*a-b* at different times, and the central controller 2150 adjusts a percent of the screen real estate across the different display screens 2120 to provide the content of current interest to the person 2130 with a greater amount of the available space. For example, as a person 2130 walks through the environment 2100, they may initially be interested at time t1 in a first content item 2210*a*, and is therefore provided at time t2 with an expanded view of the first content item 2210*a* (and a correspondingly reduced view of a second content item 2210*b*). Continuing the example, if the person's attention shifts, at time t3 the controller 2150 may adjust the two content items 2210 to offer initial sizes or an expanded view of the second content item 2210*b* (and a correspondingly reduced view of a second content item 2210*b*).

Content Item Selection

In addition or alternatively to adjusting the size of one or more content items 2120 to be displayed, the controller 2150 may select subsequent content items 2200 based on whether a person 2130 or a predetermined amount or percentage of persons 2130 in a group of persons 2130 have given a threshold amount of attention to a content item 2210. For example, in a tunnel or walkway that persons 2130 travel in a given direction down, several display devices 2120 may be arranged sequentially. Once the central controller 2150 has observed a trend in attention given by the person 2130, the central controller 2150 can select different content item 2120 for new or repeated display. For example, a central controller 2150 may observe whether persons 2130 give attention to a first content item 2210*a* of a weather report or a second content item 2210*b* of an advertisement to determine whether and when to replace of playback of the first content item 2210*a* or the second content item 2210*b* with a third content item 2210*c* of a traffic report or a fourth content item 2210*d* of a different advertisement. Accordingly, the persons 2130 may be provided with content items 2210 of greater relevancy and interest, among other benefits Display Screen Visual Setting Adjustment As shown in FIG. 23B, the person 2130 is observed giving various levels attention to different display screens 2120 at different times, and the central controller 2150 adjusts a visual setting across the different display screens 2120 to draw the person's attention, provide additional power to a display screen 2120 that is the center of focus (compared to other display screens 2120 or an earlier power-saving state of that display screen 2120). For example, the various display screens 2120 in the environment 2100 may remain in a power saving mode until a person 2130 is observed to given attention the display screen 2120 at which time the display screen 2120 is signaled to enter a regular display mode (e.g., with greater brightness, enhanced contrast, etc.). Similarly, the display screens 2120 may be signaled to leave the regular display mode and enter a power saving mode when no persons 2130 are determined to be giving attention to the display device 2120. Additionally or alternatively, the display screens 2120 may be signaled to leave the regular display mode and enter an attract mode (e.g., with greater brightness, enhanced contrast, etc.) when no persons 2130 are determined to be giving attention to the display device 2120 to encourage persons 2130 to give attention to the display devices 2120.

Audio Setting Adjustment

As shown in FIG. 23C, the person 2130 is observed giving attention to different content items 2210*a-b* at different times, and the central controller 2150 adjusts the audio output 2350*a-b* of the associated display screens 2120 to output the audio associated with the content item 2210*a-b* that is the current focus of the person 2130. For example, as a person 2130 walks through the environment 2100, they may initially be interested at time t1 in a first content item 2210*a*, and is therefore provided at time t2 with audio 2310*a* associated with the first content item 2210*a*. Continuing the example, if the person's attention shifts, at time t3 the controller 2150 may adjust the audio 2310 to provide the audio 2310*b* of the second content item 2210*b*. Additionally or alternatively, the display screens 2120 output various audio 2310 when no persons 2130 are determined to be giving attention to the display device 2120 to encourage persons 2130 to give attention to the display devices 2120.

It should be understood that the specific order or hierarchy of steps in the presented processes is merely one example of possible approaches. Depending on design priorities, the specific order or hierarchy of steps in the processes may be rearranged within the scope of this disclosure. The appended method claims present elements of various steps in a sample order but are not intended to be limited to the specific order or hierarchy provided.

The descriptions of the presented embodiments are provided to enable any person skilled in the art to utilize or implement this disclosure. Various modifications to these embodiments will be apparent to those skilled in the art, and the general principles defined herein can be applied to other embodiments without departing from the scope of this disclosure. Therefore, this disclosure should not be limited to the embodiments presented here but should instead be interpreted in the broadest scope consistent with the principles and novel features disclosed.

I claim:

1. A method for determining a level of attention to a video, the method comprising:

displaying a video content on at least one display screen at least once, wherein the video content comprises a plurality of segments;

for each time of displaying of the video content, capturing, with at least one camera, at least one observation video featuring persons who are situated to see the video content displayed on the at least one display screen;

processing data comprising the at least one observation video to identify, from the persons featured in the at least one observation video, a plurality of identified persons comprising a first identified person, a second identified person, a third identified person, and a fourth identified person;

processing data comprising the at least one observation video, time information relating to displaying of the video content, and time information relating to capturing of the at least one observation video, to select, from the at least one observation video, at least one image captured during display of one of the plurality of segments of the video content, in which the at least one image is specific to the one segment of the video content such that a first image captured during display of a first segment of the plurality of segments is selected specific to the first segment and such that a second image captured during display of a second segment of the plurality of segments is selected specific to the second segment;

processing the at least one image selected for each of at least part of the plurality of segments to determine line-of-sight information for each identified person of the plurality of identified persons featured in the at least one selected image as specific to that corresponding segment for which the at least one image is selected to thereby indicate whether the at least one display screen is within a predetermined angular range from a line of sight of each identified person of the plurality of identified persons at the time of capturing the at least one image selected for the corresponding one segment of the plurality of segments; and processing the determined line-of-sight information for each identified person of the plurality of identified persons to determine an individual level of attention specific to one segment of the plurality segments for each identified person the plurality of identified persons, wherein the first identified person, the second identified person, and the third identified person are featured in the at least one image selected for the first segment, and the fourth identified person is not featured in the at least one image selected for the first segment, and wherein the first identified person, the second identified person, and the fourth identified person are featured in the at least one image selected for the second segment, and the third identified person is not featured in the at least one image selected for the second segment, and determining, using the determined individual levels of attention specific to one of the plurality of segments, a crowd level of attention specific to the one segment for a crowd as an entity comprising the plurality of identified persons, such that the crowd level of attention for the first segment is determined with processing data comprising the individual level of attention determined for the first identified person specific to the first segment, the individual level of attention determined for the second identified person specific to the first segment, and the individual level of attention determined for the third identified person specific to the first segment, and such that the crowd level of attention for the second segment is determined with processing data comprising the individual level of attention determined for the first identified person specific to the second segment, the individual level of attention determined for the second identified person specific to the second segment, and the individual level of attention determined for the fourth identified person specific to the second segment.

2. The method of claim 1, wherein the line-of-sight information is determined:

such that the determined line-of-sight information for the first identified person featured in the first image is specific to the first segment for which the first image is selected, such that the determined line-of-sight information for the second identified person featured in the first image is specific to the first segment for which the first image is selected, such that the determined line-of-sight information for the third identified person featured in the first image is specific to the first segment for which the first image is selected, such that the determined line-of-sight information for the first identified person featured in the second image is specific to the second segment for which the second image is selected, such that the determined line-of-sight information for the second identified person featured in the second image is specific to the second segment for which the second image is selected, and such that the determined line-of-sight information for the fourth identified person featured in the second image is specific to the second segment for which the second image is selected.

3. The method of claim 2, wherein the line-of-sight information is determined such that the determined line-of-sight information for the first identified person specific to the first segment indicates whether the at least one display screen is within the predetermined angular range from a line of sight of the first identified person at the time of capturing the first image selected for the first segment, such that the determined line-of-sight information for the second identified person specific to the first segment indicates whether the at least one display screen is within the predetermined angular range from a line of sight of the second identified person at the time of capturing the first image selected for the first segment, such that the determined line-of-sight information for the third identified person specific to the first segment indicates whether the at least one display screen is within the predetermined angular range from a line of sight of the third identified person at the time of capturing the first image selected for the first segment, such that the determined line-of-sight information for the first identified person specific to the second segment indicates whether the at least one display screen is within the predetermined angular range from a line of sight of the first identified person at the time of capturing the second image selected for the second segment, such that the determined line-of-sight information for the second identified person specific to the second segment indicates whether the at least one display screen is within the predetermined angular range from a line of sight of the second identified person at the time of capturing the second image selected for the second segment, and such that the determined line-of-sight information for the fourth identified person specific to the second segment indicates whether the at least one display screen is within the predetermined angular range from a line of sight of the fourth identified person at the time of capturing the second image selected for the second segment.

4. The method of claim 3, wherein the individual level of attention is determined such that for the first identified person, the individual level of attention specific to the first segment is determined using the line-of-sight information for the first identified person specific to the first segment, such that for the first identified person, the individual level of attention specific to the second segment is determined using the line-of-sight information for the first identified person specific to the second segment, such that for the second identified person, the individual level of attention specific to the first segment is determined using the line-of-sight information for the second identified person specific to the first segment, such that for the second identified person, the individual level of attention specific to the second segment is determined using the line-of-sight information for the second identified person specific to the second segment, such that for the third identified person, the individual level of attention specific to the first segment is determined using the line-of-sight information for the third identified person specific to the first segment, and such that for the fourth identified person, the individual level of attention specific to the second segment is determined using the line-of-sight information for the fourth identified person specific to the second segment.

5. The method of claim 1, wherein at least part of the steps is performed real time with displaying of the video content, wherein processing of one of the steps involving of one of the plurality of segments is performed later than processing of the same step involving another one of the plurality of segments.

6. The method of claim 1, wherein at least part of the steps is performed subsequent to completion of capturing the at least one observation video.

7. The method of claim 1, wherein each of the plurality of segments of the video content is predetermined at the time of displaying the video content, wherein each segment corresponds to a specific time frame relative to a start of the video content and corresponds to specific information displayed in the specific time frame, wherein each segment extends for a period that may or may not be an equivalent length for the plurality of segments.

8. The method of claim 1, wherein each of the plurality of segments of the video content is undetermined at the time of displaying the video content and is determined while processing data comprising time information relating to displaying of the video content, wherein, once determined, each segment corresponds to a specific time frame relative to a start of the video content and corresponds to specific information displayed in the specific time frame, wherein each segment extends for a period that may or may not be an equivalent length for the plurality of segments.

9. The method of claim 1, wherein the predetermined angular range from the line of sight is horizontally 40-80 degrees to a left and 40-80 degrees to a right for an associated person.

10. The method of claim 1, wherein the predetermined angular range from the line of sight is vertically 40-80 degrees upward and 40-80 degrees downward for an associated person.

11. The method of claim 1, wherein a plurality of observation videos are obtained for displaying the video content at least once, in which each of the plurality of observation videos corresponds to one time displaying of the video content.

12. The method of claim 1, wherein the video content is displayed multiple times, and the at least one observation video comprises a plurality of observation videos, wherein the multiple times of displaying of the video content comprises displaying of the video content on one display screen multiple times or displaying of the video content on more than on display screen.

13. The method of claim 1, further comprising assigning an individual identification code to each identified person of the plurality of identified persons and assigning a segment identification code to each of the plurality of segments.

14. The method of claim 1, wherein determining the line-of-sight information comprises determining either or both of orientation and posture of a head of an associated person featured on at least one image.

15. The method of claim 1, wherein a plurality of images captured during display of one segment is selected from the at least one observation video such that each of the plurality of images is specific to the one segment, wherein each of the plurality of images is processed to determine the line-of-sight information for each identified person of the plurality of identified persons featured in the processed one of the plurality of images.

16. The method of claim 1, wherein the determined line-of-sight information for each identified person of the plurality of identified persons featured in the processed image is specific to the specific image that is specific to the segment, wherein the individual level of attention is determined for each identified person of the plurality of identified persons featured in the processed image with regard to each processed image such that a plurality of individual levels of attention is provided for each identified person of the plurality of identified persons for the segment during which the plurality of images is or was captured.

17. The method of claim 1, wherein the method further comprises processing data comprising the determined individual levels of attention specific to each of the plurality of segments for one identified person of the plurality of identified persons to determine a level of attention to an entirety of the video content by the one identified person.

18. The method of claim 1, wherein the method further comprises processing data comprising the determined individual levels of attention specific to each of the plurality of segments for one identified person of the plurality of identified persons to compute a cumulative time of attention to the plurality of segments by the one identified person of the plurality of identified persons and to determine if the cumulative time of attention is greater or smaller than a predetermined reference period.

19. The method of claim 18, wherein a cumulative time of attention to any segment of the plurality of segments is computed by adding time corresponding to those segments in which the line-of-sight information for the one identified person of the plurality of identified persons indicates that the at least one display screen is within the predetermined angular range from a line of sight of the one identified person of the plurality of identified persons.

20. The method of claim 1, wherein determining the crowd level of attention to one segment comprises:

providing a number of identified persons of the plurality of identified persons featured in the at least one selected image for the segment;

providing a number of identified persons of the plurality of identified persons whose individual level of attention is attention or no attention to the segment based on the individual levels of attention of each identified person of the plurality of identified persons.

21. The method of claim 1, wherein the individual level of attention for one identified person of the plurality of identified persons is "attention" or its equivalent to one of the plurality of segments if the line-of-sight information of the one identified person indicates that the at least one display screen is within the predetermined angular range from a line of sight of the one identified person at the time of capturing the at least one image that is during display of the one segment, wherein the individual level of attention for the one identified person is "no attention" or its equivalent to the one segment if the line-of-sight information of the one identified person indicates that the at least one display screen is outside the predetermined angular range from the line of sight of the one identified person at the time of capturing the at least one image that is during display of the one segment.

22. The method of claim 1, wherein processing the at least one observation video to identify the plurality of identified persons comprises excluding at least one person who is featured in the at least one observation video such that not everyone featured in the at least one observation video is identified as part of the plurality of identified persons.

23. The method of claim 1, wherein at least one identified person of the plurality of identified persons is not featured in the at least one image selected for one of the plurality of segments, wherein processing the at least one image to determine line-of-sight information does not provide line-of-sight information for an identified person of the plurality of identified persons who is not featured in the at least one image.

24. The method of claim 23, wherein for the identified person of the plurality of identified persons who is not featured in the at least one image and no line-of-sight information is provided, the individual level of attention is not determined.

25. The method of claim 1, wherein the first, second and third segments have an equivalent length or substantially equivalent length in time, wherein the second segment and the third segment are not identical to each other such that the second segment does not overlap in time with the third segment or such that a portion of the second segment overlaps in time with a portion of the third segment, wherein the first segment and the third segment are not identical to each other such that the third segment does not overlap in time with the first segment or such that a portion of the third segment overlaps in time with a portion of the first segment.

26. An apparatus comprising:

at least one communication interface configured to:

receive information relating to displaying of a video content on at least one display screen, receive at least one observation video featuring people who are situated to see the video content displayed on the at least one display screen, and receive information relating to capturing of the at least one observation video;

at least one memory storing an executable program;

at least one processor configured to communicate with the at least one communication interface and the at least one memory and further configured to execute the executable program to perform operations of:

processing data comprising the at least one observation video to identify, from persons featured in the at least one observation video, a plurality of identified persons comprising a first identified person, a second identified person, a third identified person, and a fourth identified person;

processing data comprising the at least one observation video, time information relating to displaying of the video content, and time information relating to capturing of the at least one observation video, to select, from the at least one observation video, at least one image captured during display of one of a plurality of segments of the video content, in which the at least one image is specific to the one segment of the video content such that a first image captured during display of a first segment of the plurality of segments is selected specific to the first segment and such that a second image captured during display of a second segment of the plurality of segments is selected specific to the second segment;

processing the at least one image selected for each of at least part of the plurality of segments to determine line-of-sight information for each identified person of the plurality of identified persons featured in the at least one selected image as specific to that corresponding segment for which the at least one image is selected to thereby indicate whether the at least one display screen is within a predetermined angular range from a line of sight of each identified person of the plurality of identified persons at the time of capturing the at least one image selected for the corresponding one segment of the plurality of segments; and processing the determined line-of-sight information for each identified person of the plurality of identified persons to determine an individual level of attention specific to one segment of the plurality segments for each identified person the plurality of identified persons, wherein the first identified person, the second identified person, and the third identified person are featured in the at least one image selected for the first segment, and the fourth identified person is not featured in the at least one image selected for the first segment, and wherein the first identified person, the second identified person, and the fourth identified person are featured in the at least one image selected for the second segment, and the third identified person is not featured in the at least one image selected for the second segment, and determining, using the determined individual levels of attention specific to one of the plurality of segments, a crowd level of attention specific to the one segment for a crowd as an entity comprising the plurality of identified persons, such that the crowd level of attention for the first segment is determined with processing data comprising the individual level of attention determined for the first identified person specific to the first segment, the individual level of attention determined for the second identified person specific to the first segment, and the individual level of attention determined for the third identified person specific to the first segment, and such that the crowd level of attention for the second segment is determined with processing data comprising the individual level of attention determined for the first identified person specific to the second segment, the individual level of attention determined for the second identified person specific to the second segment, and the individual level of attention determined for the fourth identified person specific to the second segment.

27. A system comprising:

the apparatus of claim 26;

at least one display screen configured to display a video content; and at least one camera configured to capture the at least one observation video featuring people who are situated to see the video content displayed on the at least one display screen.

* * * * *